(12) United States Patent
Suzuki

(10) Patent No.: US 8,175,110 B2
(45) Date of Patent: May 8, 2012

(54) SENDING STATION, RECEIVING STATION, AND RADIO COMMUNICATION METHOD

(75) Inventor: Kuniyuki Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1121 days.

(21) Appl. No.: 11/911,424

(22) PCT Filed: Apr. 18, 2005

(86) PCT No.: PCT/JP2005/007393
§ 371 (c)(1),
(2), (4) Date: Oct. 12, 2007

(87) PCT Pub. No.: WO2006/114855
PCT Pub. Date: Nov. 2, 2006

(65) Prior Publication Data
US 2008/0192705 A1    Aug. 14, 2008

(51) Int. Cl.
*H04J 3/16* (2006.01)
*H04J 1/00* (2006.01)
*G06F 11/00* (2006.01)

(52) U.S. Cl. ......... 370/465; 370/480; 714/704; 714/746

(58) Field of Classification Search .................. 370/338, 370/336, 465, 478, 479, 480, 498; 714/704, 714/746
See application file for complete search history.

(56) References Cited

U.S. PATENT DOCUMENTS

| | | | |
|---|---|---|---|
| 2002/0168945 A1* | 11/2002 | Hwang et al. | 455/69 |
| 2003/0098804 A1* | 5/2003 | Ekstrand et al. | 341/107 |
| 2004/0067757 A1 | 4/2004 | Fukui | |
| 2004/0153909 A1* | 8/2004 | Lim et al. | 714/714 |
| 2004/0199846 A1 | 10/2004 | Matsumoto et al. | |
| 2004/0268206 A1* | 12/2004 | Kim et al. | 714/758 |
| 2005/0002421 A1 | 1/2005 | Ito et al. | |
| 2005/0185608 A1* | 8/2005 | Lee et al. | 370/328 |
| 2007/0281624 A1* | 12/2007 | Thomas et al. | 455/67.11 |
| 2009/0067528 A1* | 3/2009 | Loh et al. | 375/267 |

FOREIGN PATENT DOCUMENTS

| CN | 1273732 A | 11/2000 |
|---|---|---|
| CN | 1428948 A | 7/2003 |
| CN | 1481175 A | 3/2004 |

(Continued)

OTHER PUBLICATIONS

ARIB STD-T64-C. S0002-B Physical Layer Standards for cdma2000 Spread Spectrum Systems 3.1.3.1.1.2, pp. 3-25 to 3-37.

(Continued)

*Primary Examiner* — Andrew Lee
(74) *Attorney, Agent, or Firm* — Oblon, Spivak, McClelland, Maier & Neustadt, L.L.P.

(57) ABSTRACT

A transmitting station includes: an error detecting code attachment block that attaches error detecting codes respectively to a plurality of data pieces; a transmitter block that transmits the plurality of data pieces with the error detecting codes attached thereto to a receiving station by using different radio frequencies, respectively; a receiver block that receives, from the receiving station, the results of error detections that the receiving station applies respectively to the plurality of data pieces on the basis of the error detecting codes attached respectively to the plurality of data pieces; and a transmission data managing block that controls retransmission of the data to the receiving station on the basis of the received results of the error detection.

19 Claims, 29 Drawing Sheets

FOREIGN PATENT DOCUMENTS

| | | |
|---|---|---|
| CN | 1541457 A | 10/2004 |
| CN | 1551509 A | 12/2004 |
| EP | 1 011 245 A1 | 6/2000 |
| EP | 1 388 964 A1 | 2/2004 |
| JP | 7 143185 | 6/1995 |
| JP | 9-307528 | 11/1997 |
| JP | 10 190632 | 7/1998 |
| JP | 10 224659 | 8/1998 |
| JP | 11 501185 | 1/1999 |
| JP | 11-234249 | 8/1999 |
| JP | 2000 31944 | 1/2000 |
| JP | 2000 92043 | 3/2000 |
| JP | 2000 216812 | 8/2000 |
| JP | 2000-236282 | 8/2000 |
| JP | 2001 523410 | 11/2001 |
| JP | 2002 26745 | 1/2002 |
| JP | 2002 101036 | 4/2002 |
| JP | 2002 111685 | 4/2002 |
| JP | 2003 9240 | 1/2003 |
| JP | 2003 101473 | 4/2003 |
| JP | 2003 204317 | 7/2003 |
| JP | 2003 304510 | 10/2003 |
| JP | 2004 80140 | 3/2004 |
| JP | 2004 80165 | 3/2004 |
| JP | 2004 135287 | 4/2004 |
| JP | 2004-159303 | 6/2004 |
| JP | 2004 180154 | 6/2004 |
| JP | 2004 187257 | 7/2004 |
| JP | 2004 206814 | 7/2004 |
| JP | 2004-297200 | 10/2004 |
| JP | 2004 349742 | 12/2004 |
| JP | 2004 349763 | 12/2004 |
| JP | 2004 350259 | 12/2004 |
| JP | 2005 27107 | 1/2005 |
| JP | 2005 51712 | 2/2005 |
| WO | 02 065664 | 8/2002 |
| WO | 03 088537 | 10/2003 |
| WO | WO 03/096149 A2 | 11/2003 |
| WO | WO 2004-017555 A1 | 2/2004 |
| WO | WO 2005/022511 A2 | 3/2005 |

OTHER PUBLICATIONS $3^{rd}$ Generation Partnership Project; Technical Specification Group Radio Access Network; Multiplexing and channel coding (FDD) (Release 6) 3GPP TS25.211 V6.3.0, pp. 1-56, 2004. (http://www.3gpp.org/ftp/Specs/2004-12/Rel-6/25_series/25211-630-zip).

$3^{rd}$ Generation Partnership Project; Technical Specification Group Radio Access Network; Multiplexing and channel coding (FDD) (Release 6) 3GPP TS25.212 V6.3.0 , pp. 1-85, 2004. (http://www.3gpp.org/ftp/Specs/2004-12/Rel-6/25_series/25212-630-zip).

$3^{rd}$ Generation Partnership Project; Technical Specification Group Radio Access Network; Multiplexing and channel coding (FDD) (Release 6) 3GPP TS25.214 V6.4.0, pp. 1-67, 2004. (http://www.3gpp.org/ftp/Specs/2004-12/Rel-6/25_series/25214-640-zip).

$3^{rd}$ Generation Partnership Project; Technical Specification Group Radio Access Network; Multiplexing and channel coding (FDD) (Release 6) 3GPP TS25.222 V6.2.0, pp. 1-67,2004. (http://www.3gpp.org/ftp/Specs/2004-12/Rel-6/25_series/25222-620-zip).

Supplementary European Search Report issued on Feb. 15, 2011 in corresponding European Application No. 05 73 0547.

Office Action issued Apr. 4, 2011 in European Patent Application No. 05 730 547.6-1524.

Office Action issued Nov. 8, 2011 in Japanese Application No. 2009-263791 (With English Translation).

$3^{rd}$ Generation Partnership Project; Technical Specification Group Radio Access Network; High Speed Download Packet Access (HSDPA) enhancements, (Release 6), 3GPP TR 25.899 V6.1.0, Sep. 2004, pp. 22, 56, 65, 66.

3rd Generation Partnership Project; Technical Specification Group Radio Access Network; Multiplexing and channel coding (FDD), (Rlease 6), 3GPP TR 25.212 V6.4.0, Mar. 2005, pp. 49-63.

Office Action issued Aug. 1, 2011, in Chinese Patent Application No. 200580049476.3 (with partial English-language translation).

Office Action issued Nov. 3, 2011, in European Patent Application No. 05 730 547.6 filed Apr. 18, 2005.

* cited by examiner

F I G . 4
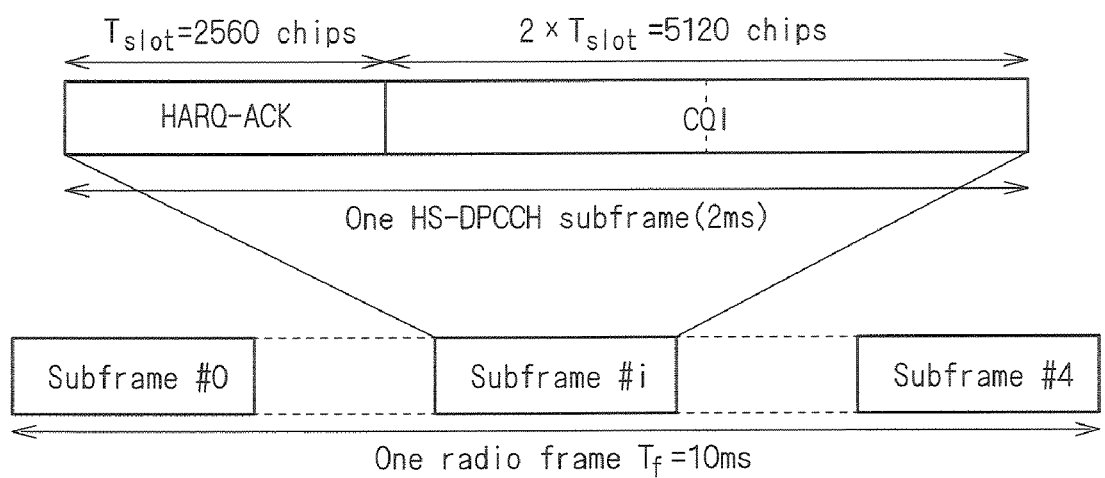

MAPPING FOR HS-DSCH

FIG. 39
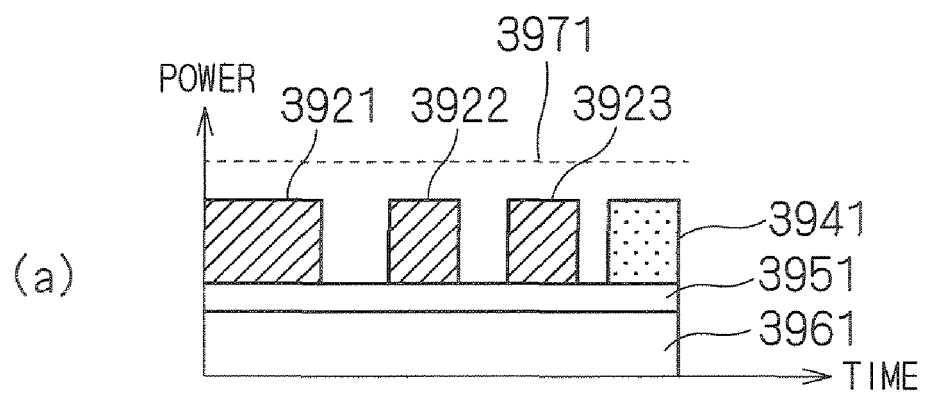
(a)
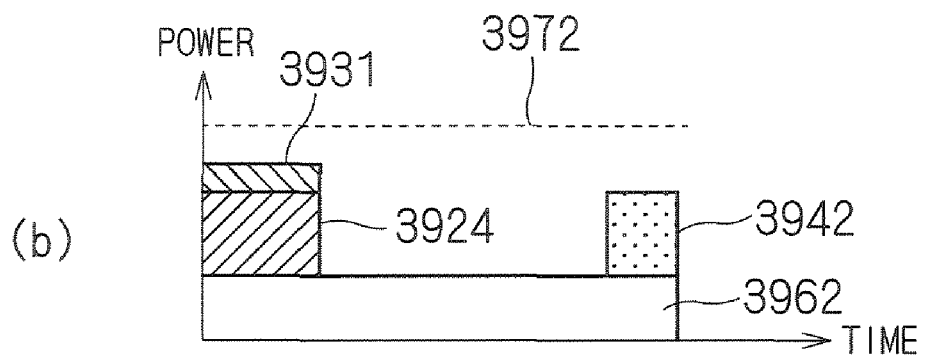
(b)
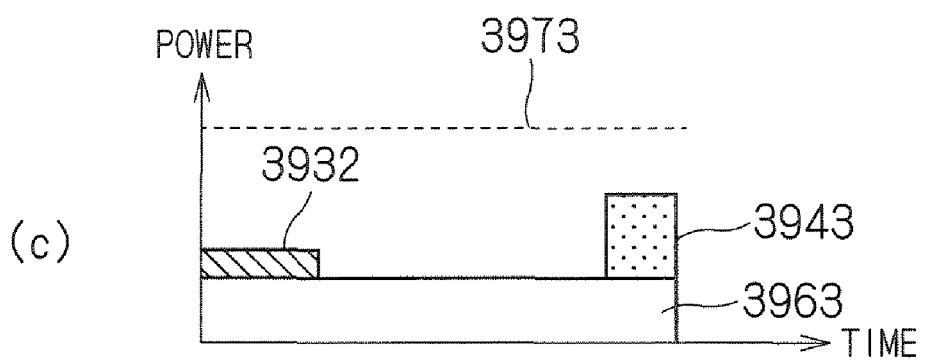
(c)

SENDING STATION, RECEIVING STATION, AND RADIO COMMUNICATION METHOD

TECHNICAL FIELD

The present invention relates to a radio communications method, and particularly to a CDMA radio communications method in which a pair of communication stations perform communication using dedicated and shared physical channels.

BACKGROUND ART

As mobile radio communications techniques typically for cellular phones, a plurality of communication schemes called Third Generation have been adopted as IMT-2000 by the ITU (International Telecommunication Union); among such schemes, commercial services based on W-CDMA (Wideband Code Division Multiple Access) were started in 2001 in Japan.

The W-CDMA was developed for the purpose of obtaining maximum communication speeds around 2 Mbps (bits per second) for each mobile station, and its first version of specifications was defined by Release 99 (Release 1999) provided in 1999 by a standardization organization named 3GPP (3rd Generation Partnership Project).

In communication from a base station to mobile stations in the WCDMA, dedicated physical channels called downlink DPCH (downlink Dedicated Physical Channel) are assigned to individual mobile stations. Data from the higher-layer downlink transport channel DCH (Dedicated Channel) is mapped to the downlink DPCH.

For an expansion of the WCDMA, a communications technique called HSDPA (High speed Downlink Packet Access) is under development. The HSDPA is described in Release 5, Release 6, etc. provided by the standardization organization 3GPP, and its object is to obtain still higher communication speeds (e.g. maximum speed of 14 Mbps).

Compared with the WCDMA, the HSDPA additionally allows the use of physical channels such as the HS-PDSCH (High speed Physical Downlink Shared Channel), the HS-SCCH (HS-DSCH-related Shared Control Channel), and the HS-DPCCH (Dedicated Physical Control Channel (uplink) for HS-DSCH).

The HS-PDSCH is a downlink shared data channel that is used to transmit data from a base station to a mobile station in association with the downlink DPCH from the base station to the mobile station, and the HS-SCCH is a downlink shared control channel used from the base station to the mobile station to transmit control information necessary to receive the HS-PDSCH. The HS-DPCCH is an uplink dedicated control channel used from the mobile station to the base station to transmit information about conditions of the reception of the HS-PDSCH in the mobile station.

Data from the higher-layer transport channel HS-DSCH (High Speed Downlink Shared Channel) is mapped to the physical channel HS-PDSCH. The transport channel HS-DSCH is a downlink transport channel that is shared by a plurality of mobile stations, and the transport channel HS-DSCH is used in association with one downlink DPCH and one or a plurality of HS-SCCHs.

The transport channel HS-DSCH is mapped to one or a plurality of HS-PDSCHs.

Channelization code information about one or a plurality of HS-PDSCHs to which the transport channel HS-DSCH is mapped is included in a HS-SCCH subframe as channelization code set information, and transmitted from the base station to the mobile station. Information about the conditions of reception of the HS-PDSCH in the mobile station is transmitted from the mobile station to the base station by using the dedicated physical control channel HS-DPCCH.

FIGS. 1 to 4 are diagrams respectively illustrating the radio formats for the downlink DPCH, HS-PDSCH, HS-SCCH and HS-DPCCH. Where, the time length of one radio frame is 10 msec, and one radio frame is divided into 15 time slots. The time length of one subframe is 2 msec, and one subframe corresponds to three time slots. One time slot corresponds to 2560 chips of spreading code.

FIG. 1 is a diagram illustrating an example of the radio format for the downlink DPCH. In FIG. 1, the downlink DPCH includes a data channel called downlink DPDCH (Dedicated Physical Data Channel) and/or a control channel called downlink DPCCH (Dedicated Physical Control Channel). The downlink DPCH is a downlink dedicated physical channel individually assigned to mobile stations.

In FIG. 1, Data 1 and Data 2 indicate data mapped from the transport channel DCH to the DPCH, TPC indicates Transmit Power Control information, TFCI indicates Transport Format Combination Indicator, Pilot indicates pilot control information, and slots #0 to #14 are defined by equally dividing one radio frame into 15. One Transmission Time Interval of the DPCH is an integral multiple of 10 msec corresponding to the time length of one frame, for example.

FIG. 2 is a diagram illustrating the radio format for the HS-PDSCH. It is possible to provide a plurality of HS-PDSCHs for one cell of one base station or for one sector, and the individual HS-PDSCHs are code-spread by using different channelization codes. The HS-PDSCH can be shared by a plurality of mobile stations for one base station or one sector.

In FIG. 2, Data indicates data that is mapped to the HS-PDSCH from the transport channel HS-DSCH. One subframe has a time length corresponding to one fifth of one radio frame. Slots #0 to #2 are defined by equally dividing one subframe into three. One transmission time interval of the HS-PDSCH can be 2 msec, corresponding to the time length of one subframe, for example.

It is also possible to perform multi-code transmission by simultaneously utilizing a plurality of HS-PDSCHs for one mobile station in one subframe.

FIG. 3 is a diagram illustrating the radio format for the HS-SCCH. The HS-SCCH is used to transmit information necessary to receive the HS-DSCH. It is possible to provide a plurality of HS-SCCHs for one cell of one base station or for one sector, and the plurality of HS-SCCHs are code-spread by using different channelization codes. One mobile station can simultaneously monitor some of the plurality of HS-SCCHs. Each HS-SCCH transmits, in each subframe, information necessary to receive one or a plurality of HS-PDSCHs for one mobile station.

In FIG. 3, Data indicates information necessary to receive one or a plurality of HS-PDSCHs for one mobile station. One subframe has a time length corresponding to one fifth of one radio frame. Slots #0 to #2 are defined by equally dividing one subframe into three. One transmission time interval of the HS-SCCH can be 2 msec, corresponding to the time length of one subframe, for example.

For instance, one mobile station simultaneously monitors four HS-SCCHs that are spread with different channelization codes, and selects a subframe for that station from among the plurality of subframes transmitted by the four HS-SCCHs. The subframe for that station includes a channelization code set as information about the channelization codes for 15 HS- PDSCHs utilized for that station, and the mobile station receives the 15 HS-PDSCHs for that station on the basis of the channelization code set.

FIG. 4 is a diagram illustrating the radio format for the HS-DPCCH. The HS-DPCCH is used when a mobile station informs a base station about the conditions of reception of the HS-PDSCH. The HS-DPCCH is an uplink dedicated physical channel that is individually assigned to mobile stations.

In FIG. 4, HARQ-ACK indicates an ACK/NAK (Acknowledgement/Negative acknowledgment) signal that corresponds to the conditions of reception of the HS-PDSCH in the mobile station, and CQI indicates Channel-Quality Indication corresponding to the channel quality of the HS-PDSCH that is measured or estimated by the mobile station.

In communication between one base station and one mobile station, the downlink physical channels shown in FIGS. 1 to 3, i.e. the downlink DPCH of FIG. 1, the HS-PDSCH of FIG. 2, and the HS-SCCH of FIG. 3, are code-multiplexed on the same radio frequency.

More specifically, in communication between one base station and one mobile station, the downlink DPCH assigned to that mobile station, all HS-PDSCHs utilized for that mobile station, and all HS-SCCHs monitored by that mobile station, are code-multiplexed on the same radio frequency.

When the WCDMA (HSDPA) communication uses a shared physical channel, such as the HS-PDSCH, to transmit data from one base station to one mobile station, a deterioration of the radio propagation environment at the radio frequency of the shared physical channel deteriorates the throughput of the shared physical channel, and then the data transmission from the base station to the mobile station will be delayed or stopped.

Also, when the communication between one base station and one mobile station uses a dedicated physical channel such as the DPCH and a shared physical channel such as the HS-PDSCH associated with the downlink DPCH, it is necessary to code-multiplex those dedicated and shared physical channels on the same radio frequency; accordingly, a deterioration of the radio propagation environment at the radio frequency of the dedicated physical channel deteriorates the throughputs of the dedicated physical channel and/or the shared physical channel, and then the data transmission from the base station to the mobile station will be delayed or stopped.

Patent Document 1: Japanese Patent Application Laid-Open No. 2003-9240

Non-Patent Document 1: ARIB STD-T64-C.S0002-B Physical Layer Standards for cdma2000 Spread Spectrum Systems 3.1.3.1.1.2

Non-Patent Document 2: 3rd Generation Partnership Project; Technical Specification Group Radio Access Network; Multiplexing and channel coding (FDD) (Release 6) 3GPP TS25.211 V6.3.0 (2004-12) (http://www.3gpp.org/ftp/Specs/2004-12/Rel-6/25_series/25211-630.zip)

Non-Patent Document 3: 3rd Generation Partnership Project; Technical Specification Group Radio Access Network; Multiplexing and channel coding (FDD) (Release 6) 3GPP TS25.212 V6.3.0 (2004-12) (http://www.3gpp.org/ftp/Specs/2004-12/Rel-6/25_series/25212-630.zip)

Non-Patent Document 4: 3rd Generation Partnership Project; Technical Specification Group Radio Access Network; Multiplexing and channel coding (FDD) (Release 6) 3GPP TS25.214 V6.4.0 (2004-12) (http://www.3gpp.org/ftp/Specs/2004-12/Rel-6/25_series/25214-640.zip)

Non-Patent Document 5: 3rd Generation Partnership Project; Technical Specification Group Radio Access Network; Multiplexing and channel coding (FDD) (Release 6) 3GPP TS25.222 V6.2.0 (2004-12) (http://www.3gpp.org/ftp/Specs/2004-12/Rel-6/25_series/25222-620.zip)

DISCLOSURE OF THE INVENTION

Problems to be Solved by the Invention

The present invention has been made by considering the above-described situations, and the present invention provides a transmitting station, a receiving station, and a radio communications method that are less likely to suffer the deterioration of throughput from the transmitting station to the receiving station even when the radio propagation environment on a radio frequency used for data transmission from the transmitting station to the receiving station is deteriorated.

In particular, a transmitting station, a receiving station, and a radio communications method are provided with which, when a plurality of physical channels including one physical channel and another physical channel are used for data transmission from one transmitting station to one receiving station, and even when the radio propagation environment on the radio frequency used for that one physical channel is deteriorated, the throughput of that another physical channel is less likely to be deteriorated.

In particular, a transmitting station, a receiving station, and a CDMA radio communications method are provided with which, when a shared physical channel like the HS-PDSCH is used for data transmission from one transmitting station to one receiving station, and even when the radio propagation environment on the radio frequency of the shared physical channel is deteriorated, the data transmission from the transmitting station to the receiving station is less likely to be delayed.

Means for Solving the Problems

A transmitting station according to the present invention includes: an error detecting code attachment block that attaches error detecting codes respectively to a plurality of data pieces; a transmitter block that transmits the plurality of data pieces with the error detecting codes attached thereto to a receiving station by using different radio frequencies, respectively; a receiver block that receives, from the receiving station, the results of error detections that the receiving station applies respectively to the plurality of data pieces on the basis of the error detecting codes attached respectively to the plurality of data pieces; and a transmission data managing block that controls retransmission of the data pieces to the receiving station on the basis of the received results of the error detection.

A receiving station according to the present invention includes: a receiver block that receives a plurality of data pieces transmitted by respectively using different radio frequencies from one transmitting station, with error detecting codes attached respectively to the plurality of data pieces; an error detecting block that applies error detections respectively to the plurality of data pieces on the basis of the error detecting codes attached respectively to the plurality of data pieces; and a transmitter block that transmits, to the transmitting station, the results of the error detections respectively about the plurality of data pieces.

A radio communications method according to the present invention includes the steps of: in a transmitting station, attaching error detecting codes respectively to a plurality of data pieces; transmitting the plurality of data pieces with the error detecting codes attached thereto, from the transmitting station to a receiving station by using different radio frequencies, respectively; in the receiving station, applying error detections respectively to the plurality of data pieces on the basis of the error detecting codes attached respectively to the plurality of data pieces; transmitting the results of the error detections respectively about the plurality of data pieces, from the receiving station to the transmitting station; and, in the transmitting station, performing data retransmission to the receiving station on the basis of the results of the error detection.

Effects of the Invention

The transmitting station of the present invention includes: an error detecting code attachment block that attaches error detecting codes respectively to a plurality of data pieces; a transmitter block that transmits the plurality of data pieces with the error detecting codes attached thereto to a receiving station by using different radio frequencies, respectively; a receiver block that receives, from the receiving station, the results of error detections that the receiving station applies respectively to the plurality of data pieces on the basis of the error detecting codes attached respectively to the plurality of data pieces; and a transmission data managing block that controls retransmission of the data pieces to the receiving station on the basis of the received results of the error detection, and thus the transmitting station is obtained which is less likely to suffer the deterioration of throughput from the transmitting station to the receiving station due to the radio propagation environment.

The receiving station of the present invention includes: a receiver block that receives a plurality of data pieces transmitted by respectively using different radio frequencies from one transmitting station, with error detecting codes attached respectively to the plurality of data pieces; an error detecting block that applies error detections respectively to the plurality of data pieces on the basis of the error detecting codes attached respectively to the plurality of data pieces; and a transmitter block that transmits, to the transmitting station, the results of the error detections respectively about the plurality of data pieces, and thus the receiving station is obtained which is less likely to suffer the deterioration of throughput from the transmitting station to the receiving station due to the radio propagation environment.

The radio communications method of the present invention includes the steps of: in a transmitting station, attaching error detecting codes respectively to a plurality of data pieces; transmitting the plurality of data pieces with the error detecting codes attached thereto, from the transmitting station to a receiving station by using different radio frequencies, respectively; in the receiving station, applying error detections respectively to the plurality of data pieces on the basis of the error detecting codes attached respectively to the plurality of data pieces; transmitting the results of the error detections respectively about the plurality of data pieces from the receiving station to the transmitting station; and, in the transmitting station, performing data retransmission to the receiving station on the basis of the results of the error detection, and thus the radio communications method is obtained which is less likely to suffer the deterioration of throughput from the transmitting station to the receiving station due to the radio propagation environment.

BRIEF DESCRIPTION OF THE DRAWINGS

FIG. 4 A diagram illustrating the conventional HS-DPCCH radio format.

FIG. 39 A diagram illustrating transmission power in a base station 3801 shown in FIG. 38.

DESCRIPTION OF THE REFERENCE CHARACTERS

1 Base station, 2 Mobile station, 101 Transmission data buffer, 102 Transmission data managing block, 103a First mapping block, and 103b Second mapping block.

BEST MODE FOR CARRYING OUT THE INVENTION

First Preferred Embodiment

Figure 1:
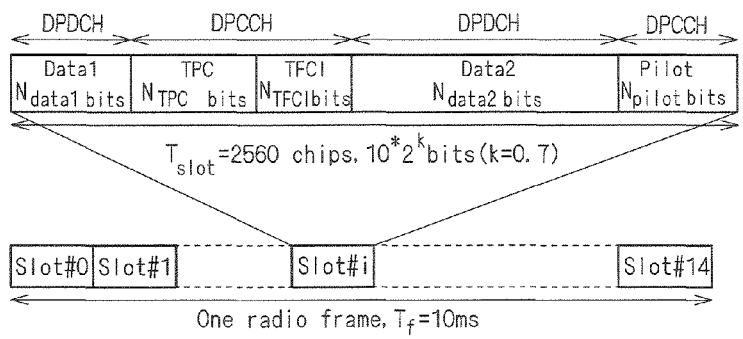
FIG. 1 A diagram illustrating the conventional downlink DPCH radio format.
Figure 2:
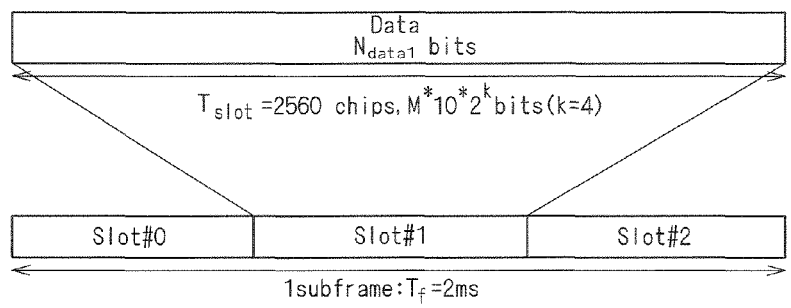
FIG. 2 A diagram illustrating the conventional HS-PDSCH radio format.
Figure 3:
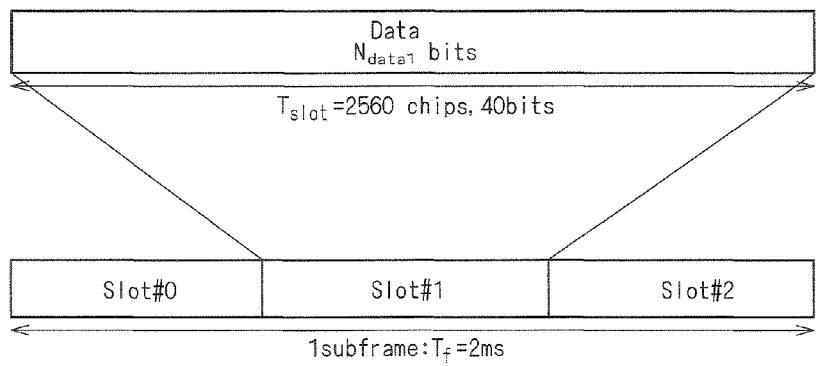
FIG. 3 A diagram illustrating the conventional HS-SCCH radio format.
Figure 5:
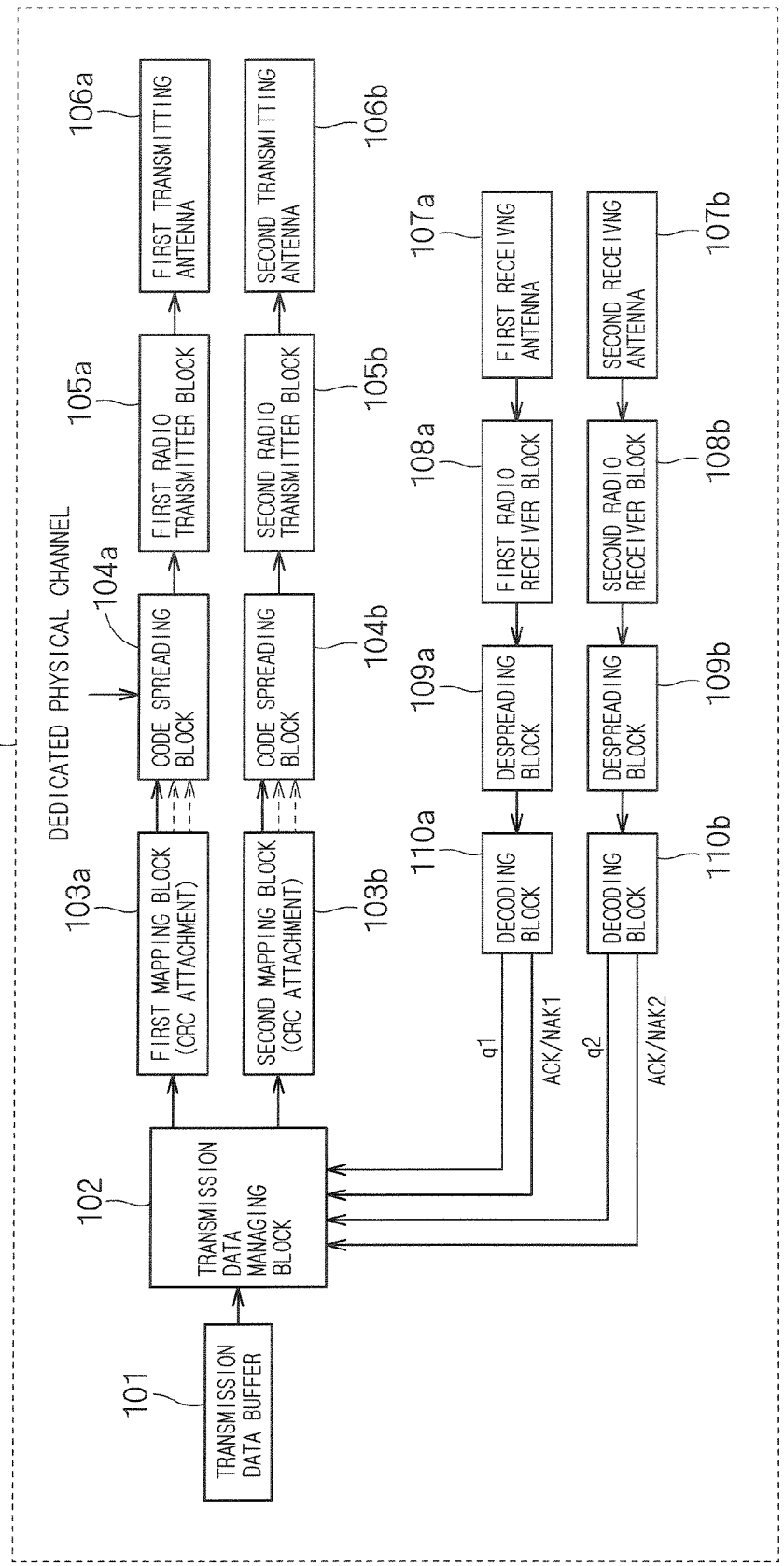
FIG. 5 A diagram illustrating the configuration of a base station according to a first preferred embodiment.
Figure 6:
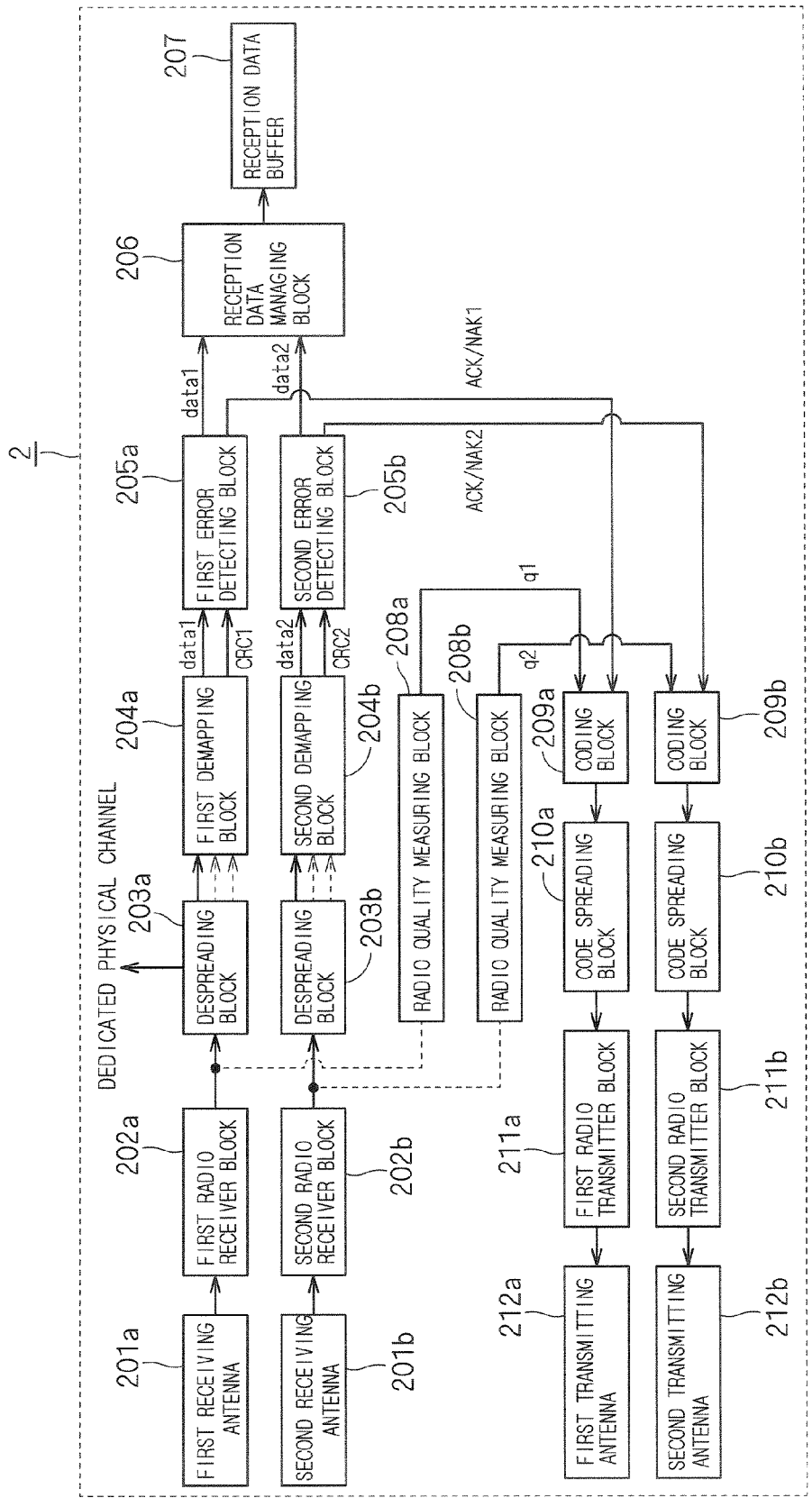
FIG. 6 A diagram illustrating the configuration of a mobile station according to the first preferred embodiment.

FIGS. 5 and 6 are diagrams illustrating the configuration of a CDMA radio communications system according to a first preferred embodiment. In these diagrams, 1 is a base station, and 2 is a mobile station that is located in the communication area (a so-called cell or sector) covered by the base station 1 and that communicates with the base station 1.

The base station 1 includes a transmission data buffer 101, a transmission data managing block 102, first and second mapping blocks 103a and 103b, code spreading blocks 104a and 104b, first and second radio transmitter blocks 105a and 105b, first and second transmitting antennas 106a and 106b, first and second receiving antennas 107a and 107b, first and second radio receiver blocks 108a and 108b, de-spreading blocks 109a and 109b, and decoding blocks 110a and 110b.

The mobile station 2 includes first and second receiving antennas 201a and 201b, first and second radio receiver blocks 202a and 202b, de-spreading blocks 203a and 203b, first and second de-mapping blocks 204a and 204b, first and second error detecting blocks 205a and 205b, a reception data managing block 206, a reception data buffer 207, radio quality measuring blocks 208a and 208b, coding blocks 209a and 209b, code spreading blocks 210a and 210b, first and second radio transmitter blocks 211a and 211b, and first and second transmitting antennas 212a and 212b.

The operation of the CDMA radio communications system shown in FIGS. 5 and 6 will be described. First, data to be transmitted from the base station 1 to the mobile station 2 is stored in the transmission data buffer 101 of the base station 1. For example, the data stored in the transmission data buffer 101 is data that was inputted to the base station 1 from a device other than the mobile station 2 through a radio transmission path or a wired transmission path not shown.

The data stored in the transmission data buffer 101 is read by the transmission data managing block 102, and assigned to a first group and a second group that correspond to different radio frequencies.

The first group of data outputted from the transmission data managing block 102 is inputted to the first mapping block 103a and subjected to a first coding process described later, and the first group of data is then mapped to one or a plurality of shared physical channel(s). This first coding process includes the CRC code attachment to the first group of data.

Also, the second group of data outputted from the transmission data managing block 102 is inputted to the second mapping block 103b and subjected to a second coding process that is the same as or different from the first coding process, and the second group of data is then mapped to one or a plurality of shared physical channel(s). This second coding process includes the CRC code attachment to the second group of data.

The one or plurality of shared physical channel(s) to which the first group of data is mapped by the first mapping block 103a are inputted to the code spreading block 104a together with other channels (e.g. a downlink dedicated physical channel) outputted from a processing block not shown. The code spreading block 104a code-spreads the inputted channels by using different channelization codes for different channels, and outputs them to the first radio transmitter block 105a. The first radio transmitter block 105a up-converts the signal including the code-spread channels to a first radio frequency, and transmits them to the mobile station 2 through the first transmitting antenna 106a.

For example, when this preferred embodiment is applied to the WCDMA, the one or plurality of shared physical channel(s) inputted to the code spreading block 104a can be one or a plurality of HS-PDSCH(s), and the dedicated physical channel inputted to the code spreading block 104a can be the downlink DPCH associated with the transport channel HS-DSCH corresponding to the HS-PDSCH(s).

On the other hand, the one or plurality of shared physical channel(s) to which the second group of data is mapped by the second mapping block 103b are code-spread in the code spreading block 104b with different channelization codes for different channels, and outputted to the second radio transmitter block 105b. The second radio transmitter block 105b up-converts the signal including the one or plurality of shared physical channel(s) provided from the code spreading block 104b, to a second radio frequency that is different from the first radio frequency, and transmits them to the mobile station 2 through the second transmitting antenna 106b.

The signal transmitted from the first radio transmitter block 105a of the base station 1 is received in the first radio receiver block 202a of the mobile station 2, through the first transmitting antenna 106a of the base station 1 and the first receiving antenna 201a of the mobile station 2. The first radio receiver block 202a down-converts the received signal, demodulates it to a baseband signal, and outputs it to the despreading block 203a.

The signal transmitted from the second radio transmitter block 105b of the base station 1 is received in the second radio receiver block 202b of the mobile station 2, through the second transmitting antenna 106b of the base station 1 and the second receiving antenna 201b of the mobile station 2. The second radio receiver block 202b down-converts the received signal, demodulates it to a baseband signal, and outputs it to the despreading block 203b.

The despreading block 203a despreads the signal outputted from the first radio receiver block 202a by using the channelization codes for the individual channels contained in that signal, so as to extract the one or plurality of shared physical channel(s) and the downlink dedicated physical channel included in that signal.

The one or plurality of shaped physical channel(s) extracted by the despreading block 203a are inputted to the first demapping block 204a, which applies a process reverse to that of the first mapping block 103a and restores the first group of data.

Thus, the first demapping block 204a outputs the restored first group of data, and also outputs the CRC code separated from the first group of data during the reverse process in the first demapping block 204a (that is, the CRC code attached to the first group of data in the first mapping block 103a).

The first group of data and the CRC code outputted from the first demapping block 204a are inputted to the first error detecting block 205a, and subjected to an error detection for the first group of data. More specifically, on the basis of the CRC code outputted from the first demapping block 204a, the first error detecting block 205a checks whether the first group of data outputted from the first demapping block 204a has been correctly restored; it then outputs an ACK signal to the coding block 209a when it determines that the data was correctly restored, and it outputs a NAK signal to the coding block 209a when it determines that the data was erroneously restored. Also, when the first error detecting block 205a determines that the first group of data outputted from the first demapping block 204a has no errors, it outputs the first group of data to the reception data managing block 206.

The downlink dedicated physical channel extracted by the despreading block 203a is outputted to a processing block not shown, and subjected to given processing there. For example, the despreading block 203a extracts the downlink dedicated physical channel DPCH, and the processing block not shown extracts voice signal and control signal from the DPCH.

The despreading block 203b despreads the signal outputted from the second radio receiver block 202b by using the channelization codes for the individual channels contained in that signal, so as to extract the one or plurality of shared physical channel(s) included in that signal.

The one or plurality of shaped physical channel(s) extracted by the despreading block 203b are inputted to the second demapping block 204a, which applies an operation reverse to that of the second mapping block 103b and restores the second group of data.

Thus, the second demapping block 204b outputs the restored second group of data, and also outputs the CRC code separated from the second group of data during the reverse operation in the second demapping block 204b (that is, the CRC code attached to the second group of data in the second mapping block 103b).

The second group of data and the CRC code outputted from the second demapping block 204b are inputted to the second error detecting block 205b, and subjected to an error detection for the second group of data. More specifically, on the basis of the CRC code outputted from the second demapping block 204b, the second error detecting block 205b checks whether the second group of data outputted from the second demapping block 204b has been correctly restored; it then outputs an ACK signal to the coding block 209b when it determines that the data was correctly restored, and it outputs a NAK signal to the coding block 209b when it determines that the data was erroneously restored. Also, when the second error detecting block 205b determines that the second group of data outputted from the second demapping block 204b was correctly restored, it outputs the second group of data to the reception data managing block 206.

With the first group of data judged to be correctly restored in the first error detecting block 205a, and with the second group of data judged to be correctly restored in the second error detecting block 205b, the reception data managing block 206 combines the first group of data and the second group of data by considering their order, and outputs the data to the reception data buffer 207.

The radio quality measuring block 208a measures, for example, the reception power of a signal received through the first receiving antenna 201a, so as to measure the radio propagation environment of the first radio frequency between the base station 1 and the mobile station 2, and it then converts the measurement to a radio quality information signal of a given format and outputs it to the coding block 209a.

For example, the base station 1 provides a reference signal obtained by code-spreading a known bit string with a known channelization code, and the reference signal is code-multiplexed on the first radio frequency and transmitted to the mobile station 2. In the mobile station 2, the radio quality measuring block 208a measures the reception power of the reference signal in the mobile station 2, and a given bit string corresponding to the measurement is outputted as a radio quality information signal q1 from the radio quality measuring block 208a to the coding block 209a. When this preferred embodiment is applied to the WCDMA, the reference signal can be the CPICH (Common Pilot Channel) transmitted as a reference signal from the base station 1, and the radio quality information signal q1 can be the CQI (Channel Quality indicator) value estimated from the reception power of the CPICH in the mobile station 2.

Like the radio quality measuring block 208a, the radio quality measuring block 208b measures, for example, the reception power of a signal received through the second receiving antenna 201b, so as to measure the radio propagation environment of the second radio frequency between the base station 1 and the mobile station 2, and it then converts the measurement to a given format and outputs it as a radio quality information signal q2 to the coding block 209a.

The radio quality measuring blocks 208a and 208b of the mobile station 2 may measure the SINR or SIR on the basis of a signal, before Rake combining or after Rake combining, obtained by despreading a pilot signal contained in the DPCCH sent from the base station 1, and then the radio quality measuring blocks 208a and 208b generate and output the radio quality information signals q1 and q2 on the basis of the measurements. That is, the radio quality measuring blocks 208a and 208b of the mobile station 2 may generate the radio quality information signals q1 and q2 on the basis of the results of despreading in the despreading blocks 203a and 203b.

Also, the radio quality measuring blocks 208a and 208b of the mobile station 2 may receive a known bit string from the base station 1 and count the number of bit errors in the mobile station 2, and then they can generate the radio quality information signals q1 and q2 on the basis of the counts.

Also, the radio quality measuring blocks 208a and 208b of the mobile station 2 may count the numbers of bits that required error correction in the reverse operations of convolutional coding or turbo coding in the demapping blocks 204a and 204b, and then they can generate the radio quality information signals q1 and q2 on the basis of the counts.

The ACK/NAK signal outputted from the first error detecting block 205a, and the radio quality information signal outputted from the radio quality measuring block 208a, are outputted to the coding block 209a, and coded with the same coding scheme or different coding schemes.

The ACK/NAK signal outputted from the second error detecting block 205*b*, and the radio quality information signal outputted from the radio quality measuring block 208*b*, are outputted to the coding block 209*b*, and coded with the same coding scheme or different coding schemes.

The ACK/NAK signal outputted from the first error detecting block 205*a*, and the radio quality information signal outputted from the radio quality measuring block 208*a*, do not always have to be inputted as a set to the coding block 209*a*; the input of the radio quality information signal from the radio quality measuring block 208*a* to the coding block 209*a* may be absent in periods in which the input of the ACK/NAK signal from the first error detecting block 205*a* to the coding block 209*a* is present. Similarly, the ACK/NAK signal outputted from the second error detecting block 205*b*, and the radio quality information signal outputted from the radio quality measuring block 208*b*, do not always have to be inputted as a set to the coding block 209*b*. Also, the timing of input to the coding block 209*a* and the timing of input to the coding block 209*b* do not always have to be the same; the input to one of the coding block 209*a* and the coding block 209*b* can be absent in periods when the input to the other is present.

The coded ACK/NAK signal and the coded radio quality information signal outputted from the coding block 209*a* are code-spread with the same channelization code or different channelization codes in the code spreading block 210*a*, and outputted to the first radio transmitter block 211*a*. The first radio transmitter block 211*a* up-converts the code-spread ACK/NAK signal and radio quality information signal to a third radio frequency, and transmits them to the base station 1 through the first transmitting antenna 212*a*.

The coded ACK/NAK signal and the coded radio quality information signal outputted from the coding block 209*b* are code-spread with the same channelization code or different channelization codes in the code spreading block 210*b*, and outputted to the second radio transmitter block 211*b*. The second radio transmitter block 211*b* up-converts the code-spread ACK/NAK signal and radio quality information signal to a fourth radio frequency, and transmits them to the base station 1 through the second transmitting antenna 212*b*.

The channelization codes used in the code spreading block 210*a* and the code spreading block 210*b* may be the same or different.

Also, when this preferred embodiment is applied to the WCDMA, the HS-DPCCH may be used as the physical channel of the third radio frequency for transmitting the coded ACK/NAK and radio quality information signals.

In FIGS. 5 and 6, the first radio frequency used in the first radio transmitter block 105*a*, the second radio frequency used in the second radio transmitter block 105*b*, the third radio frequency used in the first radio transmitter block 211*a*, and the fourth radio frequency used in the second radio transmitter block 211*b*, may differ from each other, or the third radio frequency and the fourth radio frequency may be the same respectively as the first radio frequency and the second radio frequency.

The signal transmitted from the first transmitting antenna 212*a* of the mobile station 2 is received in the first radio receiver block 108*a* of the base station 1 through the first receiving antenna 107*a* of the base station 1. The first radio receiver block 108*a* down-converts the received signal, demodulates it to a baseband signal, and outputs it to the despreading block 109*a*.

The signal transmitted from the second transmitting antenna 212*b* of the mobile station 2 is received in the second radio receiver block 108*b* of the base station 1 through the second receiving antenna 107*b* of the base station 1. The second radio receiver block 108*b* down-converts the received signal, demodulates it to a baseband signal, and outputs it to the despreading block 109*b*.

The despreading block 109*a* despreads the signal outputted from the first radio receiver block 108*a* with one or a plurality of channelization code(s) that are the same as that or those used in the code spreading block 210*a* of the mobile station 2, and outputs it to the decoding block 110*a*.

The despreading block 109*b* despreads the signal outputted form the second radio receiver block 108*b* with one or a plurality of channelization code(s) that are the same as that or those used in the code spreading block 210*b* of the mobile station 2, and outputs it to the decoding block 110*b*.

The decoding block 110*a* decodes the output signal from the despreading block 109*a* to restore the ACK/NAK signal corresponding to the output from the first error detecting block 205*a* of the mobile station 2, and the radio quality information signal q1 corresponding to the output from the radio quality measuring block 208*a* of the mobile station 2, and outputs the decoded signals to the transmission data managing block 102.

The decoding block 110*b* decodes the output signal from the despreading block 109*b* to restore the ACK/NAK signal corresponding to the output from the second error detecting block 205*b*, and the radio quality information signal q2 corresponding to the output from the radio quality measuring block 208*b*, and outputs the decoded signals to the transmission data managing block 102.

On the basis of the ACK/NAK signals inputted from the decoding block 110*a* and the decoding block 110*b*, the transmission data managing block 102 determines whether the pieces of data respectively corresponding to the ACK/NAK signals need retransmission; when data is to be retransmitted, the transmission data managing block 102 re-reads the data from the transmission data buffer 101, and outputs it to the first mapping block 103*a* and/or the second mapping block 103*b*. When data does not need retransmission, the transmission data managing block 102 erases the data from the transmission data buffer 101.

The data re-read from the transmission data buffer 101 for retransmission may be outputted from the transmission data managing block 102 to the same mapping block that was used in the previous transmission, or may be outputted to the different mapping block.

For example, when data outputted to the first mapping block 103 a in the previous transmission needs retransmission, the transmission data managing block 102 may re-read that data from the transmission data buffer 101 and output it only to the first mapping block 103*a*, or only to the second mapping block 103*b*, or dividedly to both of the first mapping block 103*a* and the second mapping block 103*b*.

Preferably, the transmission data managing block 102 checks the radio propagation environment(s) at the first radio frequency and/or the second radio frequency on the basis of one or a plurality of radio quality information signal(s) inputted from the decoding block 110*a* and/or the decoding block 110*b*; then, on the basis of the result of check, it assigns data read from the transmission data buffer 101 to the first mapping block 103*a* and/or the second mapping block 103*b*.

Also, preferably, the transmission data managing block 102 checks the radio propagation environment(s) at the first radio frequency and/or the second radio frequency on the basis of one or a plurality of ACK/NAK signal(s) inputted from the decoding block 110*a* and/or the decoding block 110*b*; then, on the basis of the result of check, it assigns data read from the transmission data buffer 101 to the first mapping block 103a and/or the second mapping block 103b.

Also, preferably, the transmission data managing block 102 checks the radio propagation environment(s) at the first radio frequency and/or the second radio frequency on the basis of both of the ACK/NAK signal(s) and the radio quality information signal(s) inputted from the decoding block 110a and/or the decoding block 110b; then, on the basis of the result of check, it assigns data read from the transmission data buffer 101 to the first mapping block 103a and/or the second mapping block 103b.

As to the assignment of data between the first mapping block 103a and the second mapping block 103b, the amount of data assigned to the first group or the amount of data assigned to the second group can be temporarily zero.

Also, for the sake of simplicity, the operation described herein assigns data read from the transmission data buffer 101 between the two mapping blocks 103a and 103b corresponding to different radio frequencies, but the read data may be assigned among three or more mapping blocks.

For example, in the configuration of the base station shown in FIG. 5, data read from the transmission data buffer 101 may be assigned to the first mapping block 103a, the second mapping block 103b, and another mapping block, in which case the first mapping block 103a, the second mapping block 103b, and that another mapping block may map the assigned data to physical channels on different radio frequencies.

Figure 7:
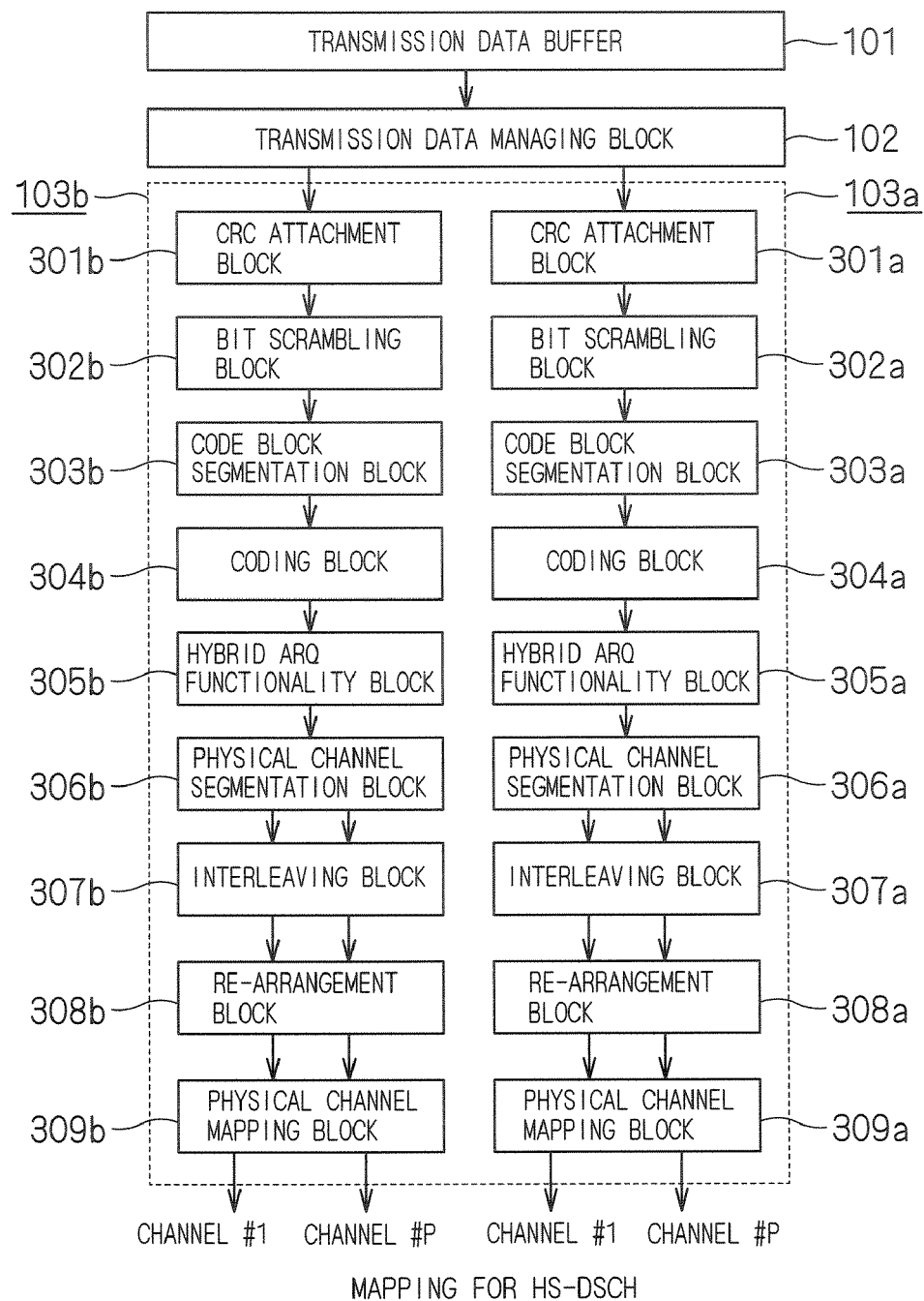
FIG. 7 A diagram illustrating the configuration of first and second mapping blocks shown in FIG. 5.

FIG. 7 is a diagram illustrating the details of the first mapping block 103a and the second mapping block 103b of the base station 1 shown in FIG. 5. In FIG. 7, the first mapping block 103a includes blocks from a CRC attachment block 301a to a re-arrangement block 308a for the first coding process mentioned earlier, and also includes a physical channel mapping block 309a for the mapping process mentioned earlier. Also, the second mapping block 103b includes blocks from a CRC attachment block 301b to a re-arrangement block 308b for the second coding process mentioned earlier, and also includes a physical channel mapping block 309b for the mapping process mentioned earlier. The first mapping block 103a and the second mapping block 103b can be configured as software.

The operations of the first mapping block 103a and the second mapping block 103b shown in FIG. 7 will be described. First, data to be transmitted to the mobile station 2 is stored in the transmission data buffer 101 of the base station 1. The transmission data managing block 102 reads the data stored in the transmission data buffer 101 on the basis of the order of priorities, and assigns the data between the first group and the second group.

For example, the transmission data managing block 102 preferentially reads data to be retransmitted from the transmission data buffer 101, and reads other data from the transmission data buffer 101 according to the order of transmission. The read data is assigned to the first group and the second group for each given transmission time interval.

Data assigned to the first group is mapped to one or a plurality of downlink shared physical channel(s) provided on the first radio frequency by the processing shown below, for example.

Data assigned to the first group is inputted to the CRC attachment block 301a as one or a plurality of data block(s) for each one transmission time interval. The CRC attachment block 301a attaches a given number (a fixed number or a variable number) of CRC parity bits (Cyclic Redundancy Check bits) to each inputted data block, and then outputs it to a bit scrambling block 203a described below. The CRC bits added in the CRC attachment block 301a are calculated, e.g. with a cyclic generator polynomial.

When a plurality of data blocks are inputted to the CRC attachment block 301a for each one transmission time interval, the CRC attachment block 301a may add CRC bits to each of the data blocks inputted in one transmission time interval, and then combine the data blocks to output one data block.

The data block with the CRC added in the CRC attachment block 301a is next inputted to the bit scrambling block 302a and bit-scrambled there. The bit scrambling is achieved, e.g. by calculating Expression (1) below with a bit string $b_1, b_2, \ldots, b_B$ inputted to the bit scrambling block 302a and a given bit string $y_1, y_2, \ldots, y_B$, and outputting the calculated bit string $d_1, d_2, \ldots, d_B$. Where B is the number of bits inputted to the bit scrambling block 302a.

$$d_k = (b_k + y_k) \bmod 2_{k=1, 2, \ldots, B} \qquad \text{Expression (1)}$$

The bit string outputted from the bit scrambling block 302a is inputted to a code block segmentation block 303a, which performs bit string segmentation as a preparation for coding. For example, when turbo coding is performed in a coding block 304a described below, the bit string is segmented such that the number of bits of the bit string does not exceed a given number.

Figure 8:
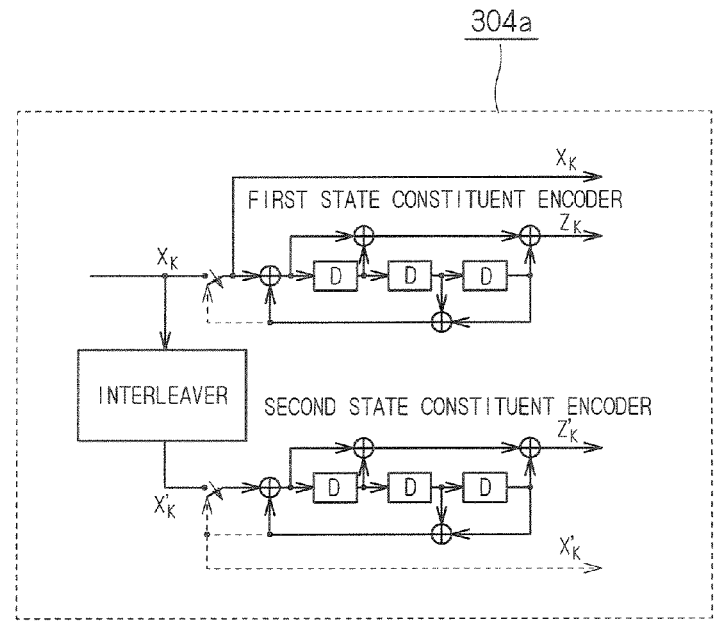
FIG. 8 A diagram illustrating the configuration of a coding block 304a shown in FIG. 7.

The bit string outputted from the code block segmentation block 303a is coded in the coding block 304a. For example, the coding block 304a shown in FIG. 8 performs turbo coding. The turbo coding block 304a shown in FIG. 8 illustrates turbo coding with a rate of 1/3, which includes two 8-state constituent encoders and one interleaver. In FIG. 8, $x_k$ indicates the input bit string to the turbo coding block 304a ($x_k = \{x_1, x_2, \ldots, x_k\}$), $z_k$ indicates the output bit string from the 1st constituent encoder ($z_k = \{z_1, z_2, \ldots, z_k\}$), and $z_k'$ indicates the output bit string from the 2nd constituent encoder ($z_k' = \{z_1', z_2', \ldots, z_k'\}$). K is the number of input bits to the turbo coding block 304a. Dotted lines in FIG. 8 apply for trellis termination.

The operation of the turbo coding block 304a shown in FIG. 8 will be described. When the bit string $x_k$ is inputted, the turbo coding block 304a of FIG. 8 generates a coded bit string $\{x_1, z_1, z_1', x_2, z_2, z_2', \ldots, x_k, z_k, z_k'\}$ and outputs the generated coded bit string with a plurality of tail bits added thereto for Trellis termination for Turbo Coder.

The output from the coding block 304a is inputted to a hybrid ARQ (Hybrid Automatic Repeat Request) functionality block 305a of FIG. 7, which performs processing for hybrid ARQ. For hybrid ARQ, the hybrid ARQ block applies puncturing and/or bit repetition to the output from the coding block 304a.

Figure 9:
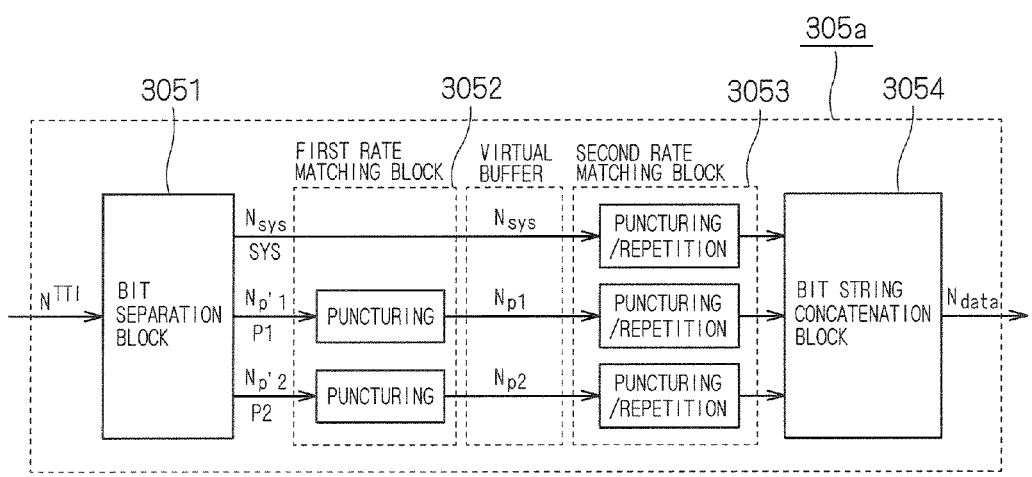
FIG. 9 A diagram illustrating the configuration of a hybrid ARQ functionality block shown in FIG. 7.

FIG. 9 shows an example of the configuration of the hybrid ARQ functionality block 305a used when the coding block 304a performs turbo coding. In FIG. 9, the bit string inputted to the hybrid ARQ functionality block 305a is separated by a bit separation block 3051 into three bit strings: an information bit string (systematic bits) sys, a first parity bit string (1st Parity bits) p1 and a second parity bit string (2nd Parity bits) p2.

For example, the bit string $x_k$ outputted from the turbo coding block 304a of FIG. 8 is included in the information bit string sys, the bit string $z_k$ outputted from the turbo coding block 304a of FIG. 8 is included in the first parity bit string p1, and the bit string $z_k'$ outputted from the turbo coding block 304a of FIG. 8 is included in the second parity bit string p2.

In FIG. 9, $N_{SYS}$, $N_{P1}'$, $N_{P2}'$ respectively indicate the numbers of bits of the information bit string sys, the first parity bit string p1, and the second parity bit string p2.

The three bit strings outputted from the bit separation block 3051 are inputted to a first rate matching block 3052. The first rate matching block 3052 compares the number of input bits $N^{TTI}$ to the bit separation block 3051 in one transmission time interval and the number of bits $N_{IR}$ specified by higher layers; then, when $N^{TTI} > N_{IR}$, it applies puncturing to the first parity bit string p1 and the second parity bit string p2 such that the total number of bits $N^{TTI}$ becomes smaller than or equal to $N_{IR}$.

For example, when $N^{TTI} > N_{IR}$, the first rate matching block 3052 outputs the information bit string sys not punctured, the first parity bit string p1 punctured, and the second parity bit string p2 punctured. When $N^{TTI} \leq N_{IR}$, the first rate matching block 3052 transparently outputs the three bit strings without applying puncturing to any bit string.

The three bit strings outputted from the first rate matching block 3052 are inputted to a second rate matching block 3053. The second rate matching block 3053 compares the numbers of bits, $N_{sys}$, $N_{p1}$, $N_{p2}$, of the bit strings outputted from the first rate matching block with a given number of bits $N_{data}$; then, it performs puncturing when $N_{data} < N_{sys} + N_{p1} + N_{p2}$, and it performs bit repetition when $N_{data} > N_{sys} + N_{p1} + N_{p2}$.

Where, $N_{sys}$ is the number of bits of the information bit string sys outputted in one transmission time interval from the first rate matching block 3052, $N_{p1}$ is the number of bits of the first parity bit string p1 outputted in one transmission time interval from the first rate matching block 3052, and $N_{p2}$ is the number of bits of the second parity bit string p2 outputted in one transmission time interval from the first rate matching block 3052.

The three bit strings sys, p1 and p2 outputted from the second rate matching block 3053 are collected in a bit string collection block 3054 and outputted from the hybrid ARQ functionality block 305a.

The output from the hybrid ARQ functionality block 305a of FIG. 7 is inputted to a physical channel segmentation block 306a of FIG. 7. When a plurality of shared physical channels are used for the mobile station 2 on the first radio frequency, the physical channel segmentation block 306a divides the output from the hybrid ARQ functionality block 305a into a plurality of bit strings corresponding to the plurality of shared physical channels. The physical channel segmentation block 306a may divide the output from the hybrid ARQ functionality block 305a to generate bit strings of equal numbers of bits, or of different numbers of bits.

Figure 10:
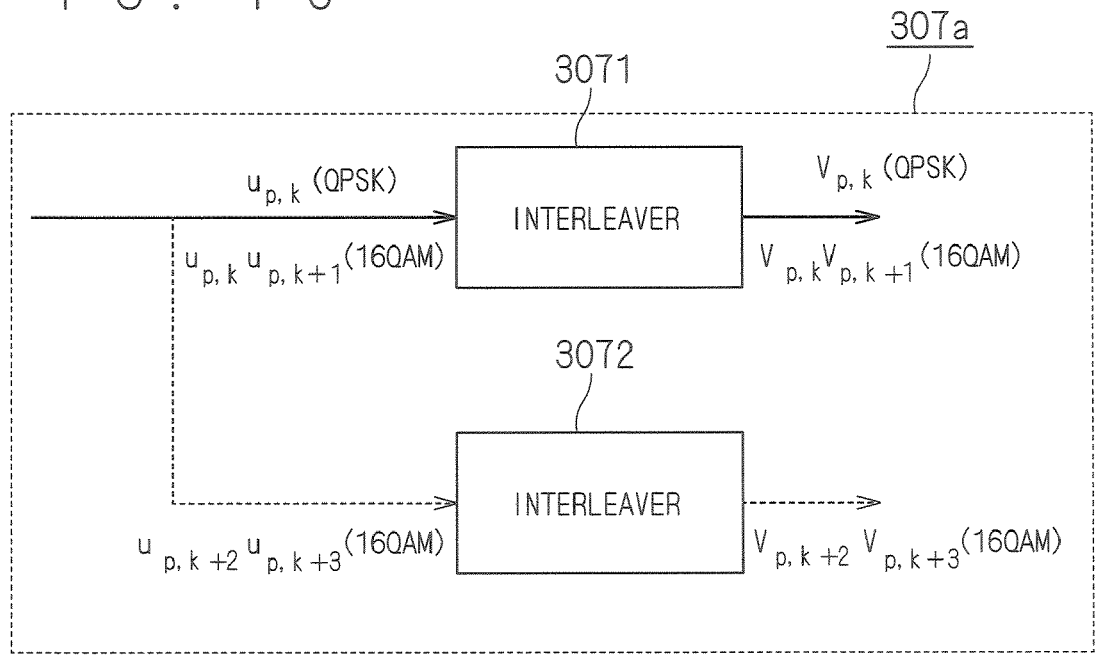
FIG. 10 A diagram illustrating the configuration of an interleaving block 307a shown in FIG. 7.

The one or plurality of bit string(s) outputted from the physical channel segmentation block 306a are outputted to an interleaving block 307a. The interleaving block 307a interleaves each bit string outputted from the physical channel segmentation block 306a for each bit string. FIG. 10 is a diagram illustrating the configuration of the interleaving block 307a. In FIG. 10, when QPSK is used for transmission of bit strings, the interleaving block 307a interleaves each input bit string with one interleaver 3071 for each bit string. When 16QAM is used for the transmission of bit strings, it interleaves each input bit string with two interleavers 3071 and 3072 for each bit string. In FIG. 10, u indicates the input bits to the interleaving block 307a, the subscript p of u indicates the bit string number, and the subscript k of u indicates the bit number.

Each bit string outputted from the interleaving block 307a of FIG. 7 is provided to a 16QAM re-arrangement block (Constellation re-arrangement for 16 QAM) 308a of FIG. 7. For transmission by 16QAM, the 16QAM re-arrangement block 308a applies bit re-arrangement and/or bit inversion to the bit strings outputted from the interleaving block 307a. When QPSK is used for transmission, the 16QAM re-arrangement block transparently outputs the input bit strings without processing.

Each bit string outputted from the 16QAM re-arrangement block 308a is outputted to the physical channel mapping block 309a. The physical channel mapping block 309a maps the bit strings from the 16QAM re-arrangement block 308a to different shared physical channels.

When this preferred embodiment is applied to the WCDMA, each data block inputted to the CRC attachment block 301a can be a WCDMA transport block, for example, and one transmission time interval for which data blocks are inputted to the CRC attachment block 301a can be 2 msec, corresponding to one transmission time interval of the HS-PDSCH.

The data assigned to the second group in the transmission data managing block 102 shown in FIG. 7 is mapped to one or a plurality of downlink shared physical channel(s) provided on the second radio frequency through the processing below, for example.

The data assigned to the second group by the transmission data managing block 102 is inputted to the CRC attachment block 301b as one or a plurality of data blocks for each one transmission time interval (for example, for every 2 msec). The data block(s) inputted to the CRC attachment block 301b are assigned a given number of (e.g. a fixed number, 24) CRC bits for each data block. The attached CRC bits are calculated according to a calculation expression that is the same as, or different from, that used in the CRC attachment block 301a.

The total number of bits of data inputted to the CRC attachment block 301b in one transmission time interval may be equal to, or different from, the total number of bits of data inputted to the CRC attachment block 301a in one transmission time interval.

One transmission time interval for the CRC attachment block 301b may have an equal time length to, or a different time length from, one transmission time interval for the CRC attachment block 301a.

The timing of start of one transmission time interval in the CRC attachment block 301b may be the same as, or different from, the timing of start of one transmission time interval in the CRC attachment block 301a.

The timing of start of one transmission time interval in the CRC attachment block 301b may be synchronous or asynchronous to the timing of start of one transmission time interval in the CRC attachment block 301a.

The number of CRC bits added to each data block in the CRC attachment block 301b may be equal to, or different from, the number of CRC bits added to each data block in the CRC attachment block 302a.

The number of CRC bits added to each data block in the CRC attachment block 301b may be a fixed number or a variable number.

The data blocks inputted to the CRC attachment block 301b may be of the same format as, or a different format from, that of the data blocks inputted to the CRC attachment block 301a.

When a plurality of data blocks are inputted to the CRC attachment block 301b for each one transmission time interval, the CRC attachment block 301b may attach CRC to each of the data blocks inputted in one transmission time interval and combine the data blocks to output one data block.

The data block with the CRC bits attached in the CRC attachment block 301b is next inputted to a bit scrambling block 302b and bit-scrambled there. The bit scrambling in the bit scrambling block 302b may be performed with the same calculation expression, e.g. Expression (1), as that for the bit scrambling in the bit scrambling block 302a, or with a different calculation expression. Alternatively, the bit scrambling block 302b may be omitted, while the bit scrambling block 302a is present.

The bit string outputted from the bit scrambling block 302b (or from the CRC attachment block 301b when the bit scrambling block 302b is absent) is inputted to a code block segmentation block 303b, which segments the bit string as a preparation for coding.

That is, while the code block segmentation block 303a segments a bit string outputted from the bit scrambling block 302a into a plurality of bit strings that do not exceed a number of bits "m", the code block segmentation block 303b segments a bit string outputted from the bit scrambling block 302b into a plurality of bit strings that do not exceed a number of bits "n".

The upper limit number of bits "m" in the code block segmentation block 303a, and the upper limit number of bits "n" in the code block segmentation block 303b, may be equal to or different from each other. For example, when the coding block 304a and a coding block 304b described below use different coding schemes, the upper limit number of bits "m" and the upper limit number of bits "n" can be set to be different from each other by considering characteristics of the respective coding schemes. For example, when the coding block 304a performs turbo coding and the coding block 304b performs LDPC (Low-Density Parity-Check) coding, the upper limit number of bits "n" can be larger than the upper limit number of bits "m". The code block segmentation block 303b may be absent, while the code block segmentation block 303a is present.

The bit strings outputted from the code block segmentation block 303b are coded in the coding block 304b. The coding block 304b codes the output from the code block segmentation block 303b with the same coding as, or a different coding from, that applied to the output of the code block segmentation block 303a in the coding block 304a.

For example, the coding block 304b may be a turbo coder having the same configuration as, or a different configuration from, the turbo coder illustrated in FIG. 8 as the configuration of the coding block 304a. Also, the coding block 304b may perform LDPC coding, while the coding block 304a performs turbo coding. The coding rate in the coding block 304a and the coding rate in the coding block 304b may be equal or different.

When both of the coding blocks 304a and the coding block 304b perform turbo coding, the algorithm of the turbo coding in the coding block 304a and the algorithm of the turbo coding in the coding block 304b may differ from each other. For example, the turbo coding in the coding block 304a may use m-state constituent encoders (m is an integer), while the turbo coding in the coding block 304b uses n-state constituent encoders (n is an integer different from m). The interleaving scheme performed for the turbo coding in the coding block 304a may be different from the interleaving scheme performed for the turbo coding in the coding block 304b. In particular, the depth of interleaving for the turbo coding in the coding block 304a may be different from the depth of interleaving for the turbo coding in the coding block 304b. The coding block 304b may be absent, while the coding block 304a is present.

The output from the coding block 304b is inputted to a hybrid ARQ functionality block 305b, which performs puncturing and/or bit repetition for hybrid ARQ.

The same configuration as that illustrated in FIG. 9 as the configuration of the hybrid ARQ functionality block 305a may be used as the hybrid ARQ functionality block 305b, for example. In this case, the upper limit value $N_{IR}$ of the number of bits in the first rate matching block shown in FIG. 9 may be the same or different between the hybrid ARQ functionality block 305a and the hybrid ARQ functionality block 305b. Also, the number of bits $N_{data}$ shown in FIG. 9 may be the same or different between the hybrid ARQ functionality block 305a and the hybrid ARQ functionality block 305b. The hybrid ARQ functionality block 305b may be absent, while the hybrid ARQ functionality block 305a is present.

The output from the hybrid ARQ functionality block 305b is inputted to a physical channel segmentation block 306b. When a plurality of shared physical channels are used for the mobile station 2 on the second radio frequency, the physical channel segmentation block 306b divides the output from the hybrid ARQ functionality block 305b among a plurality of bit strings corresponding to the plurality of shared physical channels.

The physical channel segmentation block 306b may divide the output from the hybrid ARQ functionality block 305b to generate a plurality of bit strings of equal numbers of bits, or of different numbers of bits.

The number of bit strings generated by the physical channel segmentation block 306b by segmenting the output from the hybrid ARQ functionality block 305b, may be equal to or different from, the number of bit strings generated by the physical channel segmentation block 306a by segmenting the output from the hybrid ARQ functionality block 305a.

The number of bits of each bit string generated by the physical channel segmentation block 306a by segmenting the output from the hybrid ARQ functionality block 305a, may be equal to or different from, the number of bits of each bit string generated by the physical channel segmentation block 306b by segmenting the output from the hybrid ARQ functionality block 305b.

The one or plurality of bit string(s) outputted from the physical channel segmentation block 306b are outputted to an interleaving block 307b. The interleaving block 307b interleaves each bit string outputted from the physical channel segmentation block 306b. The interleaving block 307b may use the same interleaving scheme as, or a different interleaving scheme from, the interleaving block 307a.

The interleaving block shown in FIG. 10 uses one interleaver 3071 when QPSK is used for transmission, and uses two interleavers 3071 and 3072 when 16QAM is used for transmission, but the interleaving block 307b may include just one interleaver 3071 when interleaving for 16QAM is not necessary. The interleaving block 307b may be absent, while the interleaving block 307a is present.

Each bit string outputted from the interleaving block 307b is outputted to a 16QAM re-arrangement block 308b. When 16QAM is used for transmission, like the 16QAM re-arrangement block 308a, the 16QAM re-arrangement block 308b applies bit re-arrangement and/or bit inversion to the bit strings outputted from the interleaving block 308b. When QPSK is used for transmission, the 16QAM re-arrangement block 308b transparently outputs the input bit strings without processing. The 16QAM re-arrangement block 308b may be absent, while the 16QAM re-arrangement block 308a is present.

Each bit string outputted from the 16QAM re-arrangement block 308b is outputted to the physical channel mapping block 309b. The physical channel mapping block maps the bit strings from the 16QAM re-arrangement block 308b to different shared physical channels.

While the physical channel mapping block of the first preferred embodiment maps input bit strings from the 16QAM re-arrangement block 308b to different shared physical channels, it may map the bit strings not to shared physical channels but to different physical channels other than shared physical channels.

Figure 11:
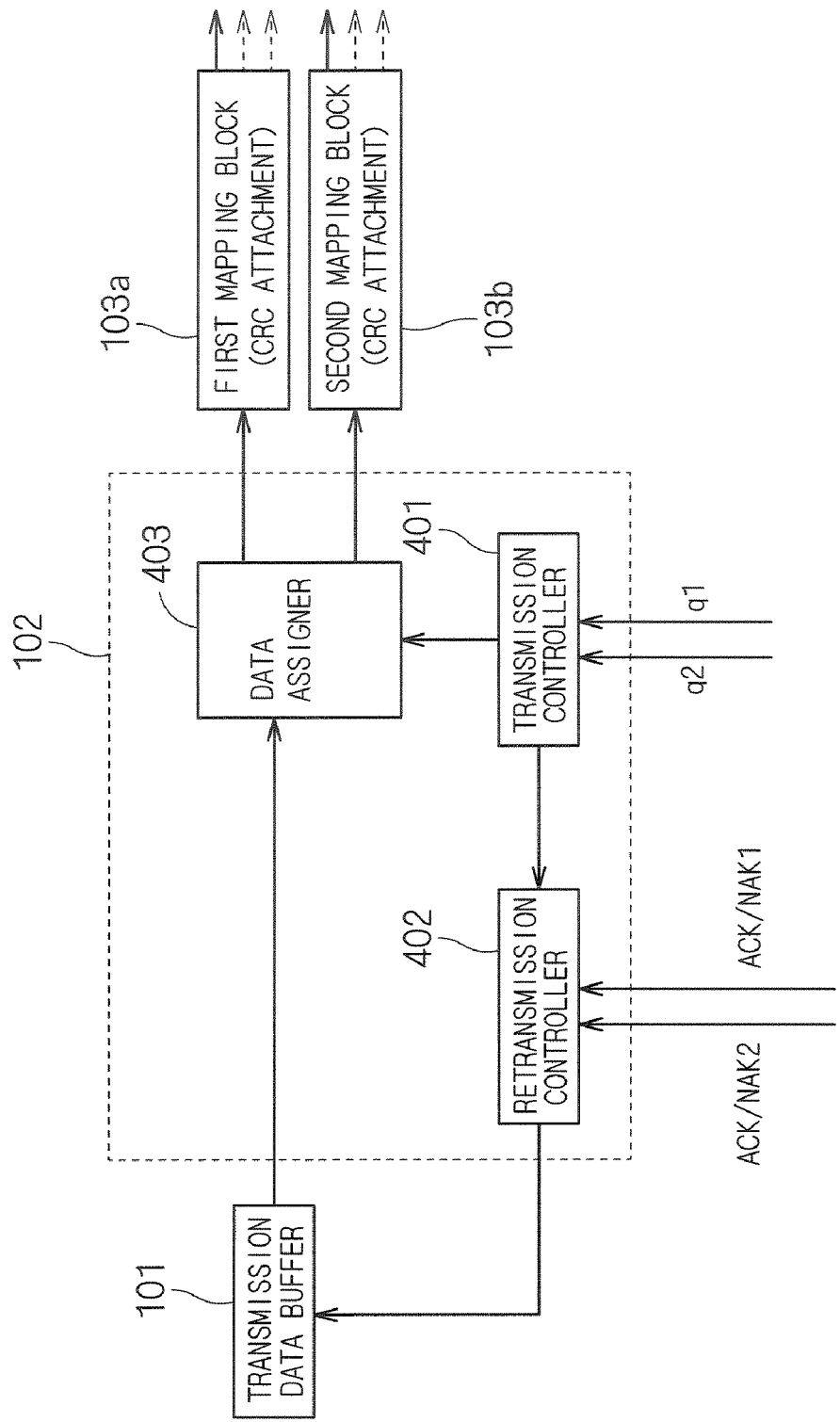
FIG. 11 A diagram illustrating the configuration of a transmission data managing block 102 shown in FIG. 5.

Next, the operation of the transmission data managing block 102 shown in FIG. 5 will be described. FIG. 11 is a diagram exemplifying the detailed configuration of the transmission data managing block 102 of FIG. 5.

In FIG. 11, 401 is a transmission controller, 402 is a re-transmission controller, and 403 is a data assigner.

The radio quality information signal(s) q1 and/or q2 from the decoding block 110a and/or the decoding block 110b shown in FIG. 5 are inputted to the transmission controller 401 of FIG. 11. On the basis of the inputted radio quality information signal(s) q1 and/or q2, the transmission controller 401 controls the amount of data inputted to the first mapping block 103a for one transmission time interval and/or the amount of data inputted to the second mapping block 103b for one transmission time interval.

For example, on the basis of the inputted radio quality information signals q1 and q2, when the transmission controller 401 decides that the radio propagation environment of the first radio frequency corresponding to the first mapping block 103a is deteriorated and the radio propagation environment of the second radio frequency corresponding to the second mapping block 103b is good, then the transmission controller 401 provides control to reduce the amount of data inputted to the first mapping block 103a for one transmission time interval and to increase the amount of data inputted to the second mapping block 103a for one transmission time interval.

The retransmission controller 402 shown in FIG. 11 receives the ACK/NAK signal corresponding to the first group of data and the ACK/NAK signal corresponding to the second group of data that are outputted from the decoding block 110a and the decoding block 110b shown in FIG. 5. The retransmission controller 402 controls the data output from the transmission data buffer 101 on the basis of the inputted ACK/NAK signals and an instruction signal from the transmission controller 401.

Data outputted from the transmission data buffer 101 is inputted to the data assigner 403. On the basis of an instruction signal from the transmission controller 401, the data assigner 403 assigns the data from the transmission data buffer 101 between the first mapping block 103a and the second mapping block 103b.

A further detailed example of the operation of the transmission data managing block 102 shown in FIG. 5 will be described. The transmission controller 401 determines the amount of data to be inputted to the first mapping block 103a for one transmission time interval, and the amount of data to be inputted to the second mapping block 103b for one transmission time interval, on the basis of the inputted radio quality information signals q1 and q2. The transmission controller 401 outputs instruction signals to inform the retransmission controller 402 and the data assigner 403 about the determined amounts of data.

The retransmission controller 402 checks whether the first group of data and the second group of data have been received in the mobile station 2 without errors, on the basis of the corresponding ACK/NAK signals. When deciding that the first group of data and the second group of data have both been correctly received in the mobile station 2, the retransmission controller 402 requests the transmission data buffer 101 to erase the correctly received data from the buffer 101, and also requests the transmission data buffer 101 to output new data.

On the other hand, when the retransmission controller 402 decides that at least one of the first group of data and the second group of data has been erroneously received in the mobile station 2, the retransmission controller 402 requests the transmission data buffer 101 to re-output the erroneously received data.

The retransmission controller 402 thus controls the data output from the transmission data buffer 101 (the output of new data and the re-output of data) on the basis of the instruction signal from the transmission controller 401 so that data corresponding to the amounts of data specified by the instruction signal is outputted from the transmission data buffer 101 to the data assigner 103.

When the retransmission controller 402 requests the transmission data buffer 101 to re-output data erroneously received in the mobile station 2, it may request the re-output of the erroneously received data only, or may request the re-output of all data that follows the erroneously received data. That is, the scheme of re-output requested from the retransmission controller 402 to the transmission data buffer 101 can be SR (selective-Repeat) or GTN (Go-to-N).

The data assigner 403 assigns the input data from the transmission data buffer 101 between the first mapping block 103a and the second mapping block 103b, according to the instruction signal from the transmission controller 401.

The data re-outputted from the transmission data buffer 101 may be assigned to the same mapping block to which the data was assigned in the first output operation, or may be assigned to the different mapping block. For example, when certain data was assigned to the first mapping block 103a in the first output operation and re-outputted from the transmission data buffer 101 for retransmission, the data assigner 403 may assign the data to the second mapping block 103b unlike for the first transmission operation.

Figure 12:
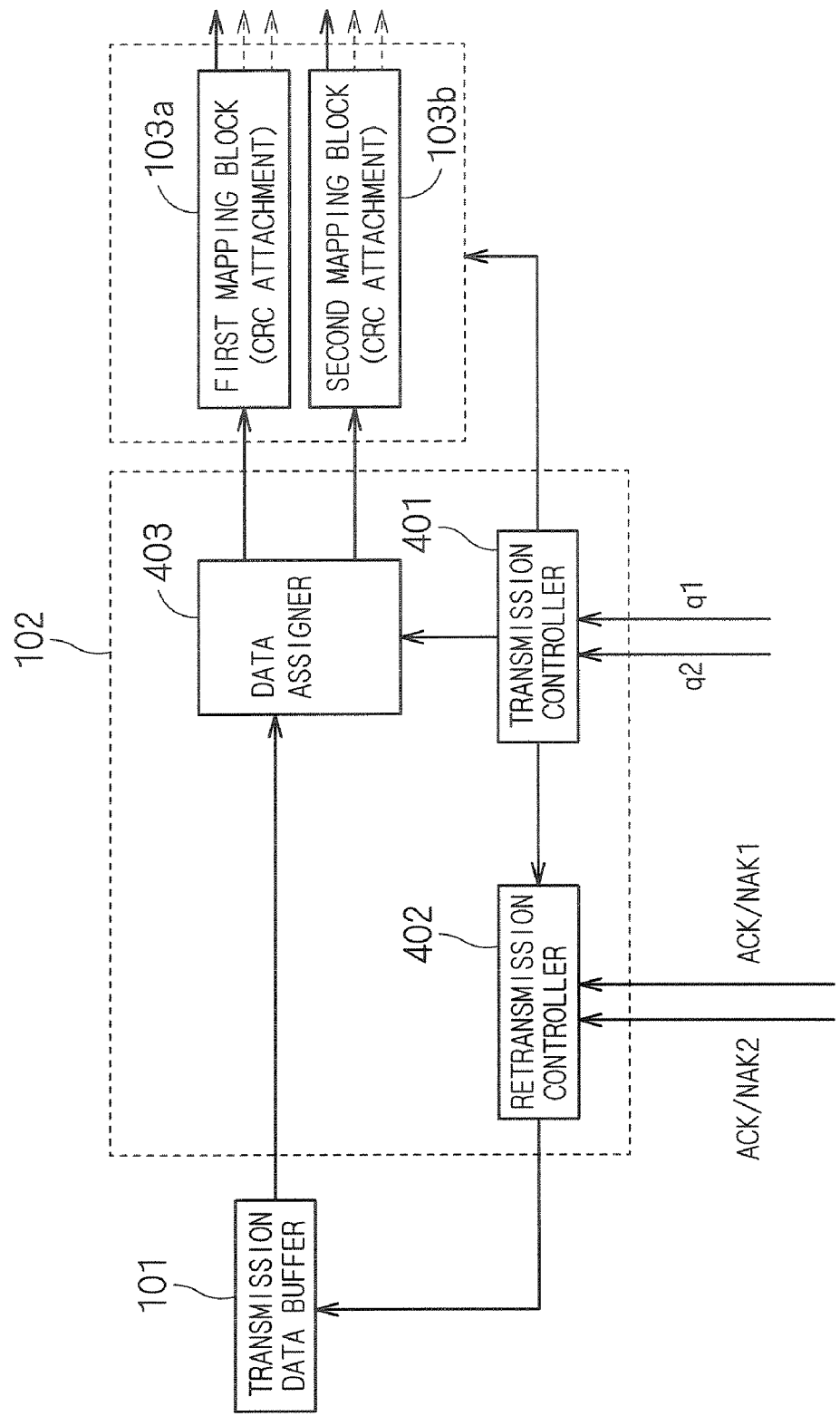
FIG. 12 A diagram illustrating another configuration of the transmission data managing block 102 shown in FIG. 5.

FIG. 11 shows an example in which the transmission controller 401 controls the amounts of data inputted to the first mapping block 103a and the second mapping block 103b on the basis of the inputted radio quality information signal(s) q1 and/or q2, but, as shown in FIG. 12, the transmission controller 401 may also control various parameters used in the first mapping block 103a and/or the second mapping block 103b, as well as the amounts of data inputted to the first mapping block 103a and the second mapping block 103b, on the basis of the inputted radio quality information signal(s) q1 and/or q2.

For example, on the basis of the inputted radio quality information signal(s), the transmission controller 401 of FIG. 12 may vary the number of attached CRC bits and/or the generator polynomial for the CRC bits in the CRC attachment block(s) 301a and/or 301b, as well as varying the amount of data inputted to the first mapping block 103a for one transmission time interval and the amount of data inputted to the second mapping block 103b for one transmission time interval.

Also, on the basis of the inputted radio quality information signal(s), the transmission controller 401 of FIG. 12 may vary the bit scrambling scheme(s) in the bit scrambling block(s) 302a and/or 302b shown in FIG. 7.

Also, on the basis of the inputted radio quality information signal(s), the transmission controller 401 of FIG. 12 may vary the upper limit number(s) of bits of bit strings outputted from the code block segmentation block(s) 303a and/or 303b shown in FIG. 7.

Also, on the basis of the inputted radio quality information signal(s), the transmission controller 401 of FIG. 12 may vary the coding scheme(s), coding rate(s), etc. in the coding block(s) 304a and/or 304b shown in FIG. 7.

Also, on the basis of the inputted radio quality information signal(s), the transmission controller 401 of FIG. 12 may vary the coding scheme(s), coding rate(s), etc. in the physical channel coding block(s) 304a and/or 304b shown in FIG. 7.

Also, on the basis of the inputted radio quality information signal(s), the transmission controller 401 of FIG. 12 may vary the upper limit value(s) $N_{IR}$ for the virtual buffer(s) in the hybrid ARQ functionality block(s) 305a and/or 305b shown in FIG. 7.

Also, on the basis of the inputted radio quality information signal(s), the transmission controller 401 of FIG. 12 may vary the number(s) $N_{data}$ of output bits of the hybrid ARQ functionality block(s) 305a and/or 305b shown in FIG. 7.

Also, on the basis of the inputted radio quality information signal(s), the transmission controller 401 of FIG. 12 may vary the number(s) of segmentations in the physical channel segmentation block(s) 306a and/or 306b shown in FIG. 7.

Also, on the basis of the inputted radio quality information signal(s), the transmission controller 401 of FIG. 12 may vary the interleaving scheme(s) in the interleaving block(s) 307a and/or 307b shown in FIG. 7.

Also, on the basis of the inputted radio quality information signal(s), the transmission controller 401 of FIG. 12 may vary the contents of processing in the re-arrangement block(s) 308a and/or 308b shown in FIG. 7.

Also, on the basis of the inputted radio quality information signal(s), the transmission controller 401 of FIG. 12 may vary, or keep unvaried, the number(s) of shared physical channels for mapping in the physical channel mapping block(s) 309a and/or 309b.

Also, on the basis of the inputted radio quality information signal(s), the transmission controller 401 of FIG. 12 may vary the modulation scheme(s) (QPSK, 16QAM) of the shared physical channels for mapping in the physical channel mapping block(s) 309a and/or 309b.

Also, for the transmission of the channelization code information about one or a plurality of shared physical channel(s) on the first radio frequency to which the first group of data is mapped, and for the transmission of the channelization code information about one or a plurality of shared physical channel(s) on the second radio frequency to which the second group of data is mapped, the transmission controller 401 of FIG. 12 may determine, on the basis of the inputted radio quality information signal(s), which of the physical channels of which of the first and second radio frequencies should be used to transmit the information from the base station 1 to the mobile station 2.

Now, for example, suppose that the radio propagation environment on the first radio frequency for transmitting data inputted to the first mapping block 103a is deteriorated, and the radio propagation environment on the second radio frequency for transmitting data inputted to the second mapping block 103b is good; then, when the amount of data inputted to the first mapping block 103a for one transmission time interval is reduced and the amount of data inputted to the second mapping block 103b for one transmission time interval is increased, and when the parameters for the first mapping block 103a and the second mapping block 103b are all kept unchanged (particularly, when the upper limit values $N_{IR}$ for the virtual buffers in the hybrid ARQ functionality blocks 305a and 305b of FIG. 7 are not changed), then the number of parity bits that are punctured for one transmission time interval in the hybrid ARQ functionality block 305a is reduced, and the number of parity bits punctured for one transmission time interval in the hybrid ARQ functionality block 305b is increased (when $N^{TTI} > N_{IR}$), which enhances the error correcting capability of the mobile station 2 with respect to the data inputted to the first mapping block 103a, and enables effective utilization of the second radio frequency for transmitting data inputted to the second mapping block 103b.

Thus, the transmission controller 401, as illustrated in FIG. 11 and FIG. 12, controls the amount of data inputted to the first mapping block 103a for one transmission time interval, the amount of data inputted to the second mapping block for one transmission time interval, and various parameters used in the mapping blocks 103a and 103b, on the basis of the radio quality information signal(s) from the decoding block 110a and/or decoding block 110b of FIG. 5; however, the transmission controller 401 may provide similar control by utilizing other information instead, or by additionally utilizing other information.

Figure 13:
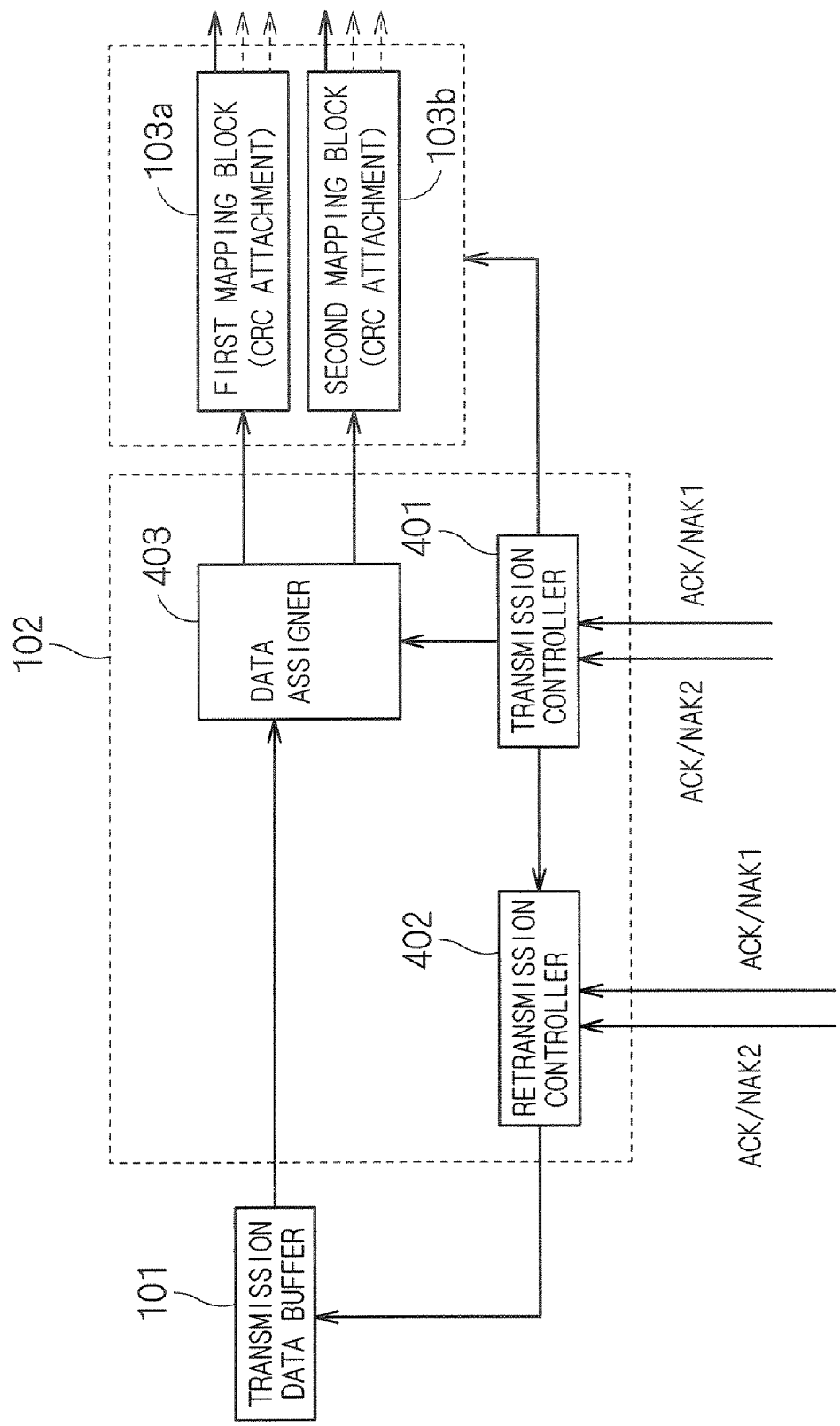
FIG. 13 A diagram illustrating another configuration of the transmission data managing block 102 shown in FIG. 5.

For example, as shown in FIG. 13, the transmission controller 401 may control the amount of data inputted to the first mapping block 103a for one transmission time interval, the amount of data inputted to the second mapping block for one transmission time interval, and various parameters used in the mapping blocks 103a and 103b, on the basis of the ACK/NAK signal(s) from the decoding block 110a and/or the decoding block 110b, in place of the radio quality information signal(s) from the decoding block 110a and/or the decoding block 110b.

Figure 14:
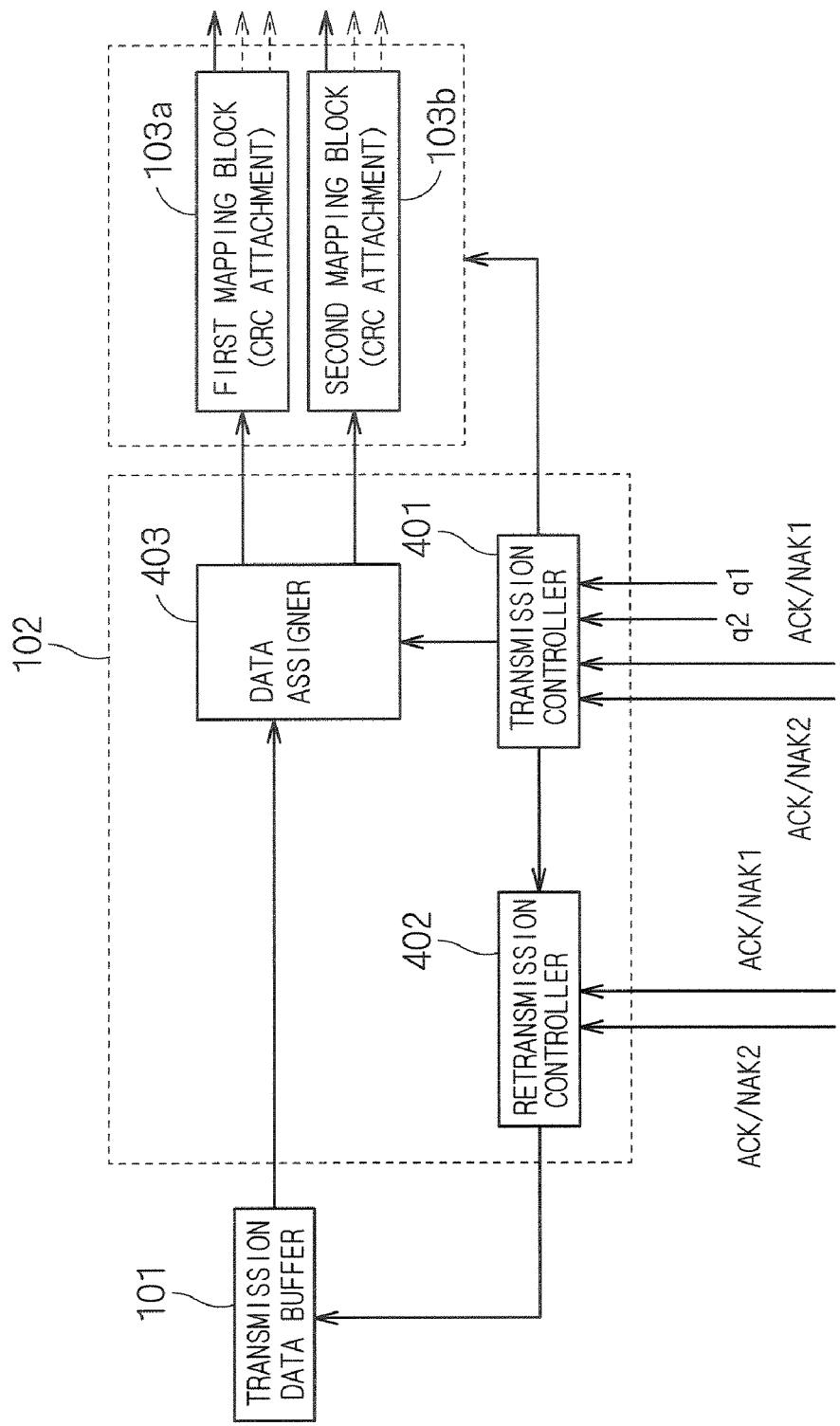
FIG. 14 A diagram illustrating another configuration of the transmission data managing block 102 shown in FIG. 5.

Alternatively, as shown in FIG. 14, the transmission controller 401 may provide similar control on the basis of the ACK/NAK signal(s) from the decoding block 110a and/or the decoding block 110b, in addition to the radio quality information signal(s) from the decoding block 110a and/or the decoding block 110b.

In FIGS. 12 to 14, the same reference characters as those of FIG. 11 indicate the same or corresponding components.

The code spreading factor of at least one shared physical channel of the first radio frequency to which the first group of data is mapped, and the code spreading factor of at least one shared physical channel of the second radio frequency to which the second group of data is mapped, may be equal to or different from each other. For example, the code spreading factors of shared physical channels to which the first group of data is mapped may be all equal, and the code spreading factors of shared physical channels to which the second group of data is mapped may be all equal, and the code spreading factors of the shared physical channels used to map the first group of data and the code spreading factors of the shared physical channels used to map the second group of data may be equal to each other, or different from each other.

Also, the channelization code of at least one shared physical channel of the first radio frequency to which the first group of data is mapped, and the channelization code of at least one shared physical channel of the second radio frequency to which the second group of data is mapped, may be the same, or different from each other.

Also, the first radio frequency of the shared physical channels to which the first group of data is mapped, and the second radio frequency of the shared physical channels to which the second group of data is mapped, may be determined by selecting two radio frequencies with as wide a frequency interval as possible, from among a plurality of radio frequency candidates. This reduces the possibility of interference occurring between channels, about both of the first radio frequency and the second radio frequency.

Also, the channelization code information about one or a plurality of shared physical channel(s) on the first radio frequency to which the first group of data is mapped, and the channelization code information about one or a plurality of shared physical channel(s) on the second radio frequency to which the second group of data is mapped, may be transmitted from the base station 1 to the mobile station 2 through the same physical channel, or through different physical channels.

For example, in WCDMA, the channelization code information about a plurality of shared physical channels on the first radio frequency may be transmitted by using the HS-SCCH on the first radio frequency, and the channelization code information about a plurality of shared physical channels of the second radio frequency may be transmitted by using the same HS-SCCH, or by using a physical channel other than the HS-SCCH on the first radio frequency, or by using a physical channel on the second radio frequency different from the first radio frequency.

Also, the first preferred embodiment uses shared physical channels provided on different two radio frequencies for one mobile station 2, but more radio frequencies may be used; data for one mobile station may be assigned for transmission to shared physical channels respectively provided on three or more radio frequencies.

Also, the first preferred embodiment has shown an example in which one base station 1 and one mobile station 2 communicate with each other, but one base station 1 may communicate with a plurality of mobile stations, in which case the base station 1 may simultaneously communicate with mobile stations of a first type that are capable of receiving a plurality of shared physical channels on different radio frequencies, and with mobile stations of a second type that are incapable of receiving a plurality of shared physical channels on different radio frequencies.

Also, mobile stations that attempt to communicate with the base station 1 may transmit signals to the base station 1 to indicate whether they are the first type or the second type.

Also, when the mobile station 2 is the second type, the data assigner 403 illustrated in FIGS. 11 to 14 may assign all input data from the transmission data buffer 101 to the first mapping block 103*a*.

Also, when the mobile station 2 is the first type, the data assigner 403 illustrated in FIGS. 11 to 14 may assign all input data from the transmission data buffer 101 to the second mapping block 103*a*.

Also, the first preferred embodiment has described shared physical channels as physical channels to which data is mapped by the mapping blocks 103*a* and 103*b*, but other physical channels may be used.

Also, while the base station 1 and the mobile station 2 of the first preferred embodiment have different antennas (7*a*, 7*b*, 8*a*, 8*b*), (11*a*, 11*b*, 18*a*, 18*b*) for individual radio frequencies, a plurality of radio frequencies may share one antenna. Each antenna may be configured with a multi-beam antenna.

Also, the first preferred embodiment has described an application of the present invention to the downlink from the base station 1 to the mobile station 2, but, needless to say, the present invention is applicable also to the uplink from a mobile station to a base station, and to inter-mobile communication from a mobile station to a mobile station.

Second Preferred Embodiment

In the CDMA radio communications system illustrated in FIGS. 5 and 6, the ACK/NAK signals respectively from the first error detecting block 205*a* and the second error detecting block 205*b* are transmitted to the base station 1 through different radio frequencies. In a second preferred embodiment, the ACK/NAK signals respectively from the first error detecting block 205*a* and the second error detecting block 205*b* are transmitted to the base station 1 through a same radio frequency.

Figure 15:
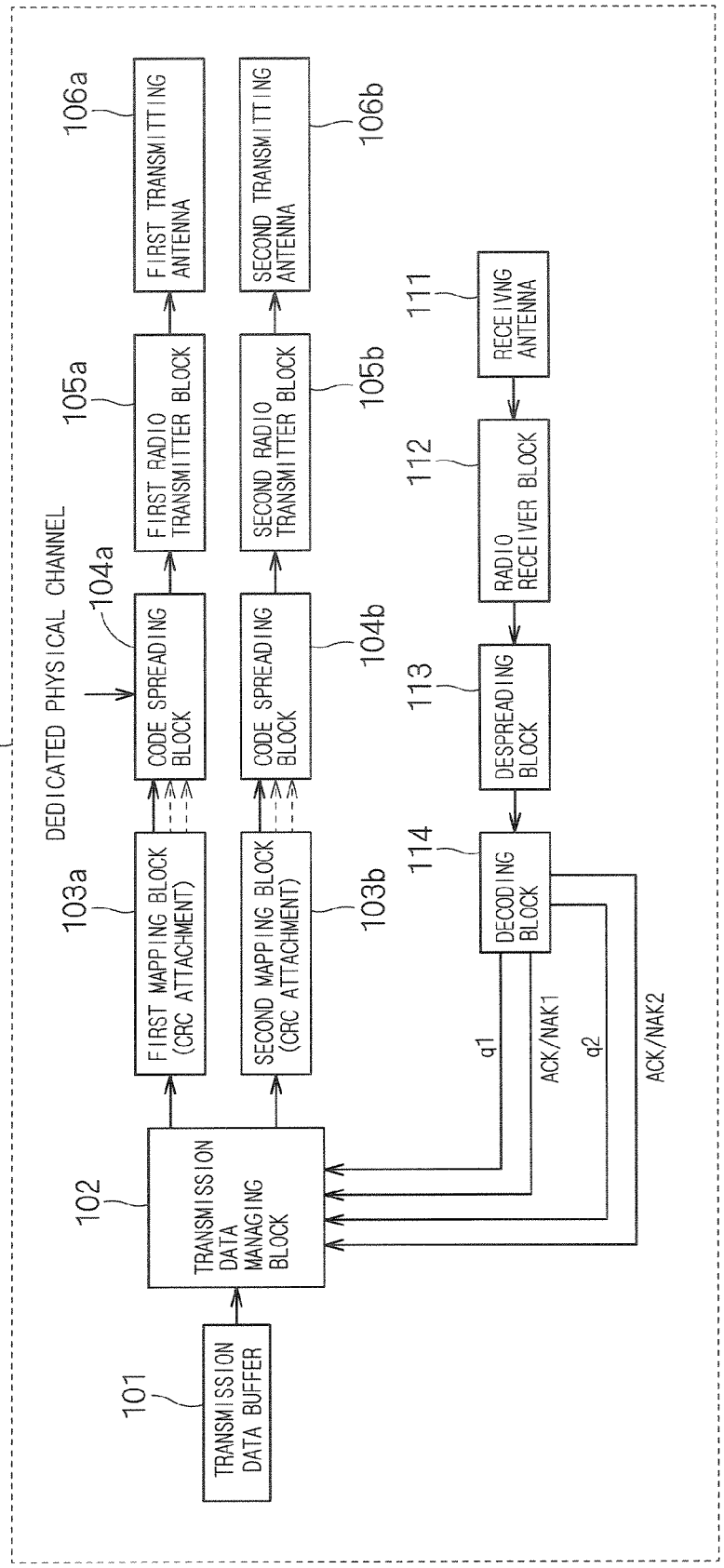
FIG. 15 A diagram illustrating the configuration of a base station according to a second preferred embodiment.
Figure 16:
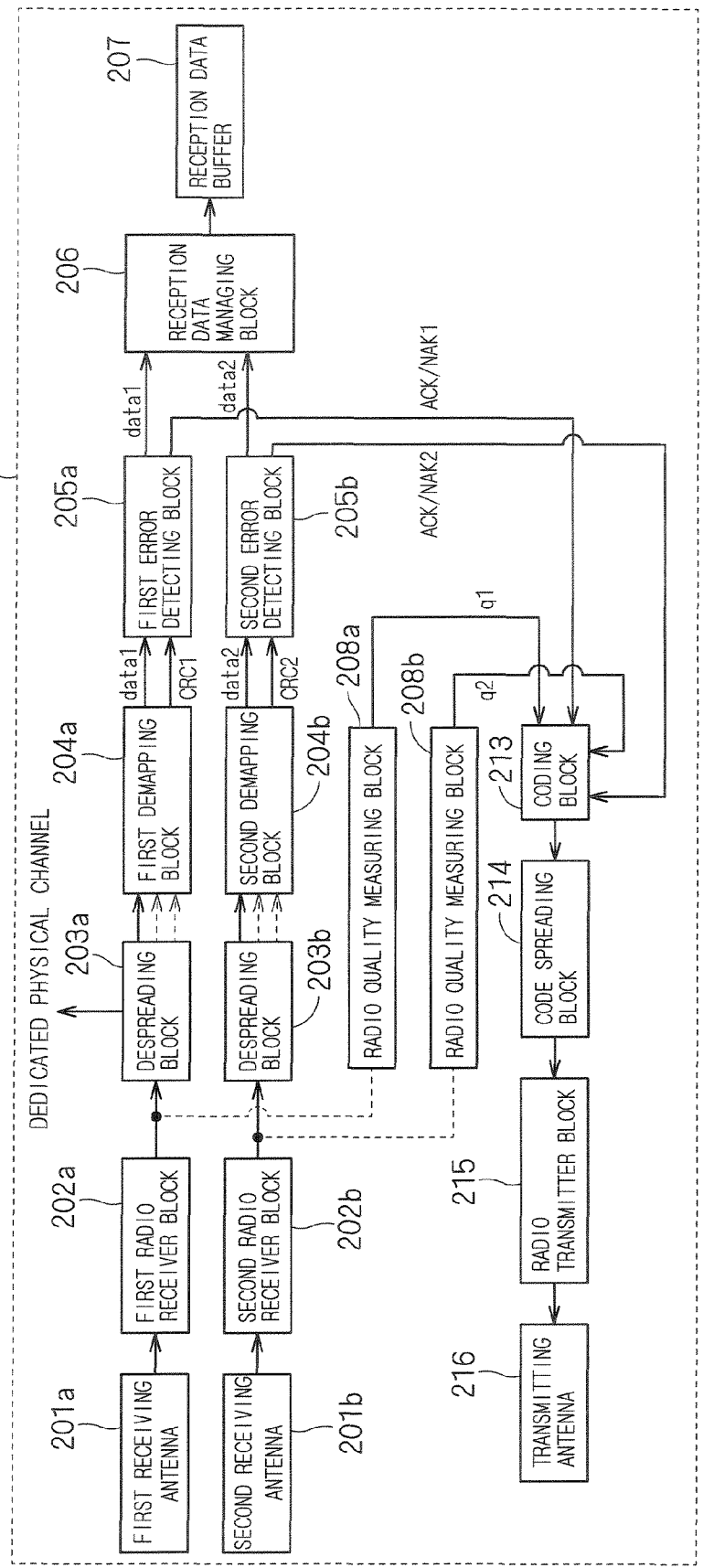
FIG. 16 A diagram illustrating the configuration of a mobile station according to the second preferred embodiment.

FIGS. 15 and 16 are diagrams illustrating the configuration of a CDMA radio communications system according to the second preferred embodiment. In FIGS. 15 and 16, the same reference characters as those of FIGS. 5 and 6 indicate the same or corresponding components.

In FIG. 15, 111 is a receiving antenna, 112 is a radio receiver block, 113 is a de-spreading block, and 114 is a decoding block.

In FIG. 16, 213 is a coding block, 214 is a code spreading block, 215 is a radio transmitter block, and 216 is a transmitting antenna.

The operation of the CDMA radio communications system shown in FIGS. 15 and 16 will be described.

In FIG. 16, the ACK/NAK signal from the first error detecting block 205*a*, the ACK/NAK signal from the second error detecting block 205*b*, the radio quality information signal q1 from the radio quality measuring block 208*a*, and the radio quality information signal q2 from the radio quality measuring block 208*b*, are inputted to the coding block 213, and coded with the same coding scheme or different coding schemes.

The four kinds of signals coded in the coding block 213 (i.e. the ACK/NAK signal from the first error detecting block 205*a*, the ACK/NAK signal from the second error detecting block 205*b*, the radio quality information signal q1 from the radio quality measuring block 208*a*, and the radio quality information signal q2 from the radio quality measuring block 208*b*) are inputted to the code spreading block 214 and code-spread with a same channelization code or different channelization codes.

For example, the code spreading block 214 multiplexes the four kinds of signals coded in the coding block 213, and code-spreads the multiplexed signals with the same channelization code.

Alternatively, the code spreading block 214 code-spreads the four kinds of signals coded in the coding block 213 with different channelization codes.

Alternatively, among the four kinds of signals coded in the coding block 213, the code spreading block 214 may multiplex the two kinds of signals corresponding to the ACK/NAK signals, multiplex the two kinds of signals corresponding to the radio quality information signals, and code-spread the individual multiplexed signals with different channelization codes.

Alternatively, among the four kinds of signals coded in the coding block 213, the code spreading block 214 may multiplex the two kinds of signals corresponding to the first radio frequency, multiplex the two kinds of signals corresponding to the second radio frequency, and code-spread the individual multiplexed signals with different channelization codes.

The signals code-spread in the code spreading block 214 are inputted to the radio transmitter block 215, up-converted to a third radio frequency, and transmitted to the base station 1 through the transmitting antenna 216.

The third radio frequency can be a ratio frequency that is different from the first radio frequency and the second radio frequency used for transmission from the base station 1 to the mobile station 2, a radio frequency that is different from the first radio frequency and the second radio frequency, or a radio frequency that is the same as one of the first radio frequency and the second radio frequency.

The signal transmitted from the transmitting antenna 216 of the mobile station 2 is received in the radio receiver block 112 of the base station 1 through the receiving antenna 111 of the base station 1 of FIG. 15. The radio receiver block 112 down-converts the received signal, demodulates it to a baseband signal, and outputs it to the despreading block 113.

The despreading block 113 despreads the signal outputted from the radio receiver block 112 with one or a plurality of channelization code(s) that are the same as that or those used in the code spreading block 214 of the mobile station 2 shown in FIG. 16, and outputs it to the decoding block 114.

The decoding block 114 decodes the output signal from the despreading block 113 to restore the four kinds of signals (i.e. the ACK/NAK signal from the first error detecting block 205a, the ACK/NAK signal from the second error detecting block 205a, the radio quality information signal q1 from the radio quality measuring block 208a, and the radio quality information signal q2 from the radio quality measuring block 208b), and outputs the decoded signals to the transmission data managing block 102.

In other respects, the operations are the same as those of the base station 1 of FIG. 5 and the mobile station 2 of FIG. 6 described in the first preferred embodiment.

Third Preferred Embodiment

In the first preferred embodiment, the retransmission controller 402 shown in FIG. 11 checks the ACK/NAK signals inputted thereto to see whether the data corresponding to the ACK/NAK signals needs retransmission to the mobile station 2. This preferred embodiment illustrates the method by which the retransmission controller 402 specifies the data corresponding to the inputted ACK/NAK signals. That is, this preferred embodiment describes a method by which the retransmission controller 402 decides to which data pieces the inputted ACK/NAK signals correspond.

In this preferred embodiment, the base station 1 specifies the data corresponding to the ACK/NAK signals on the basis of the timing of transmission of the ACK/NAK signals from the mobile station 2.

For example, in FIG. 6, the first radio transmitter block 211a of the mobile station 2 is controlled such that, when one unit (one frame, one subframe, one slot, or the like) of a shared physical channel is received in the first radio receiver block 202a, the first radio transmitter block 211a transmits, to the base station 1, the ACK/NAK signal corresponding to that one unit when a predetermined first period passed from the reception of that one unit.

In the same way, the second radio transmitter block 211b of FIG. 6 is controlled such that, when one unit of a shared physical channel is received in the second radio receiver block 202b, the second radio transmitter block 211b transmits, to the base station 1, the ACK/NAK signal corresponding to that one unit when a predetermined second period passed from the reception of that one unit.

This allows the retransmission controller 402 of FIG. 11 to identify the data pieces corresponding to the ACK/NAK signals on the basis of the timing of data transmission from the base station 1 and the timing of reception of the ACK/NAK signals in the base station 1.

The first period and the second period used to determine the timings of transmission of the ACK/NAK signals may have equal time lengths or different time lengths.

Also, the timing of transmission of the ACK/NAK signal from the first radio transmitter block 211a and the timing of transmission of the ACK/NAK signal from the second radio transmitter block 211b may be the same or different.

Also, the detection of the timing of reception of shared physical channels in the mobile station 2 can be achieved in an arbitrary component part of the mobile station 2, and the control of timings of transmission of the ACK/NAK signals from the mobile station 2 can be achieved in an arbitrary component part of the mobile station 2.

Also, in the WCDMA, for example, when the shared physical channel is the HS-PDSCH, the one unit can be one subframe corresponding to one transmission time interval of the HS-PDSCH.

The operation will be described more specifically. FIG. 17(a) is a diagram illustrating the timing of transmission of data pieces from the first radio transmitter block 105a of the base station 1 shown in FIG. 5. In this diagram, 1711 to 1713 are one-unit transmission signals respectively for transmitting data 1 to data 3. FIG. 17(b) illustrates the timing of transmission of ACK/NAK signals from the first radio transmitter block 211a of the mobile station 2 shown in FIG. 6. FIG. 17(c) illustrates the timing of reception of the ACK/NAK signals in the first radio receiver block 108a of the base station 1 shown in FIG. 5. In the diagrams, 1721 to 1723 are the ACK/NAK signals that respectively correspond to the data 1 to data 3, and T1 is a time interval.

Figure 17:
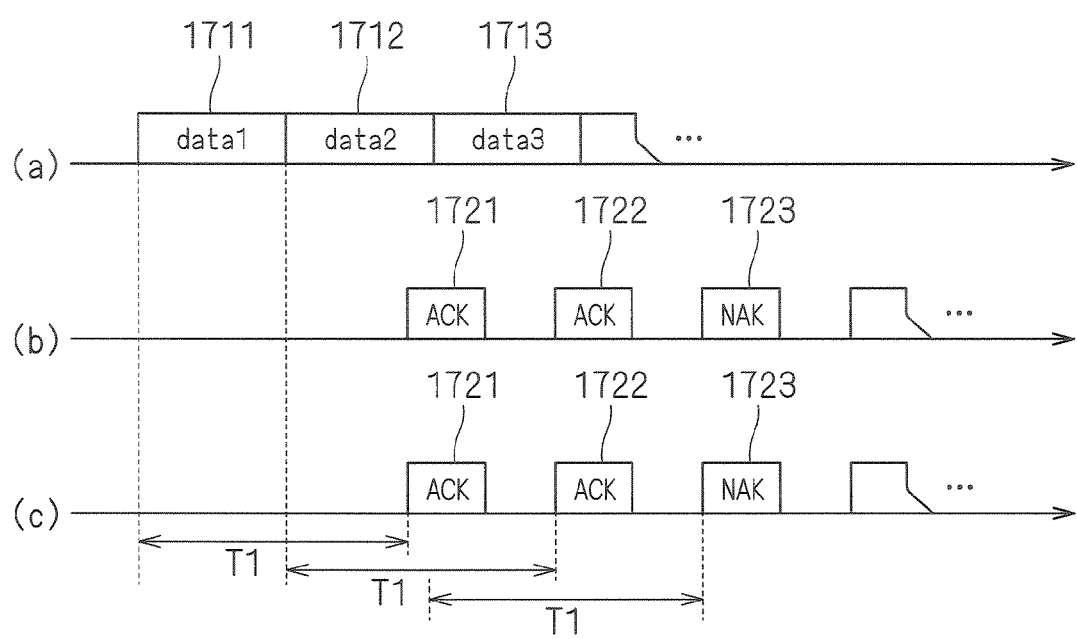
FIG. 17 A diagram illustrating a method of transmitting ACK/NAK signals according to a third preferred embodiment.

For the sake of simplicity, FIG. 17 assumes that the signal propagation time is zero from the first radio transmitter block 105a of the base station 1 of FIG. 5 to the first radio receiver block 202a of the mobile station 2 of FIG. 6, and the signal propagation time is zero from the first radio transmitter block 211a of the mobile station 2 of FIG. 6 to the first radio receiver block 108a of the base station 1 of FIG. 5.

In FIG. 17, the time intervals between the times of transmission of the individual data pieces in the first radio transmitter block 105a of the base station 1, and the times of reception of the ACK/NAK signals corresponding to those data pieces in the first radio receiver block 108a of the mobile station 2, are all T1, and thus constant for individual data pieces.

This provides certain regularity between the timing of data transmission in the first radio transmitter block 105a of the base station 1 of FIG. 5 and the timing of reception of the ACK/NAK signals in the first radio receiver block 108a of the base station 1, allowing the base station 1 to specify the data pieces corresponding to the individual received ACK/NAK signals on the basis of the regularity.

Next, an example will be described in which, as shown in FIGS. 15 and 16, the ACK/NAK signals respectively from the first error detecting block 205a and the second error detecting block 205b are transmitted to the base station 1 through the same radio frequency.

In FIG. 16, the radio transmitter block 215 of the mobile station 2 is controlled such that, when one unit of a shared physical channel is received in the first radio receiver block 202a of the mobile station 2, the radio transmitter block 215 transmits, to the base station 1, the ACK/NAK signal corresponding to that one unit when a predetermined third period passed from the reception of that one unit.

Also, in FIG. 16, the radio transmitter block 215 of the mobile station 2 is controlled such that, when one unit of a shared physical channel is received in the second radio receiver block 202b of the mobile station 2, the radio transmitter block 215 transmits, to the base station 1, the ACK/NAK signal corresponding to that one unit when a predetermined fourth period passed from the reception of that one unit.

It is preferred that the third period and the fourth period be different from each other when the timing of reception of one unit of a shared physical channel in the first radio receiver block 202a of the mobile station 2 coincides with the timing of reception of one unit of a shared physical channel in the second radio receiver block 202b of the mobile station 2, and the ACK/NAK signals for those one-units are transmitted in the same uplink physical channel.

This provides certain regularity between the timing of data transmission in the first radio transmitter block 105a of the base station 1 of FIG. 15 and the timing of reception of the ACK/NAK signals in the radio receiver block 112 of the base station 1, and between the timing of data transmission in the second radio transmitter block 105b of the base station 1 of FIG. 15 and the timing of reception of the ACK/NAK signals in the radio receiver block 112 of the base station 1, allowing the base station 1 to specify the data pieces corresponding to the individual received ACKNAK signals on the basis of the regularity. In WCDMA, the uplink HS-DPCCH may be controlled to have a given offset with respect to the uplink DPCH.

Fourth Preferred Embodiment

In the third preferred embodiment, the retransmission controller 402 shown in FIG. 11 specifies the data pieces that correspond to individual inputted ACK/NAK signals on the basis of the timing of reception of the ACK/NAK signals in the base station 1.

This preferred embodiment describes an example in which the retransmission controller 402 specifies the data pieces that correspond to individual inputted ACK/NAK signals on the basis of identifiers, such as serial numbers, attached to the individual ACK/NAK signals.

Figure 18:
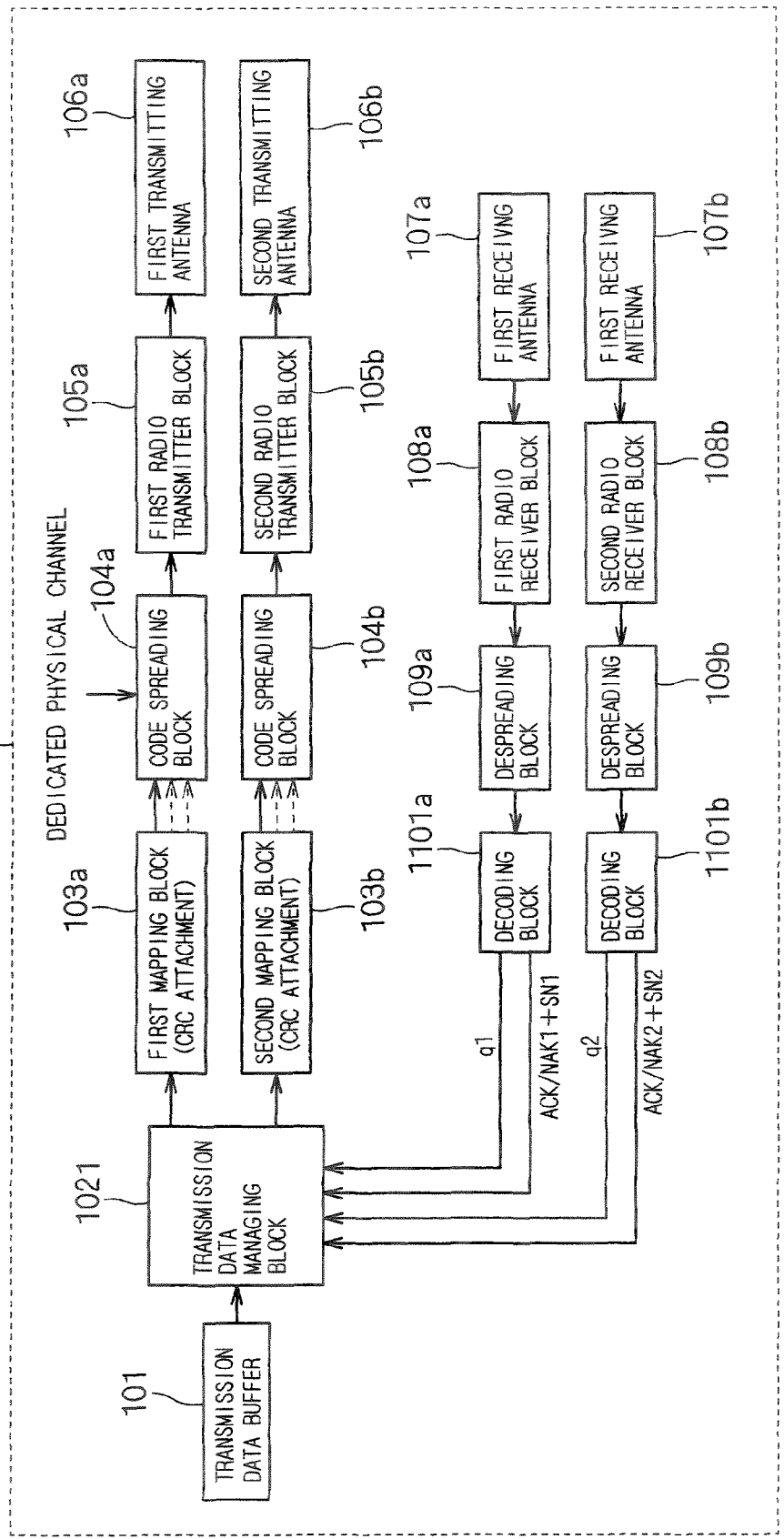
FIG. 18 A diagram illustrating the configuration of a base station according to a fourth preferred embodiment.
Figure 19:
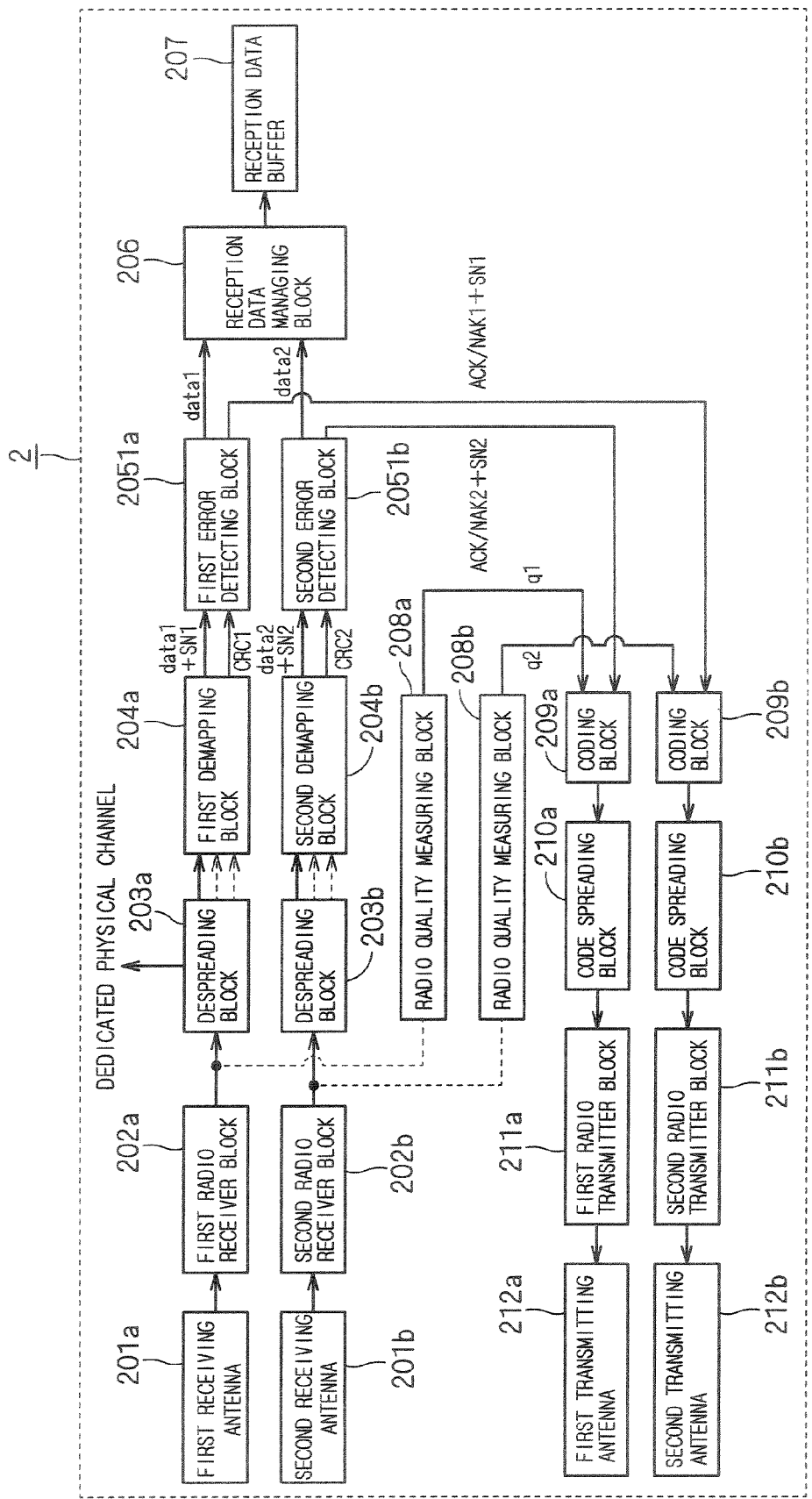
FIG. 19 A diagram illustrating the configuration of a mobile station according to the fourth preferred embodiment.
Figure 20:
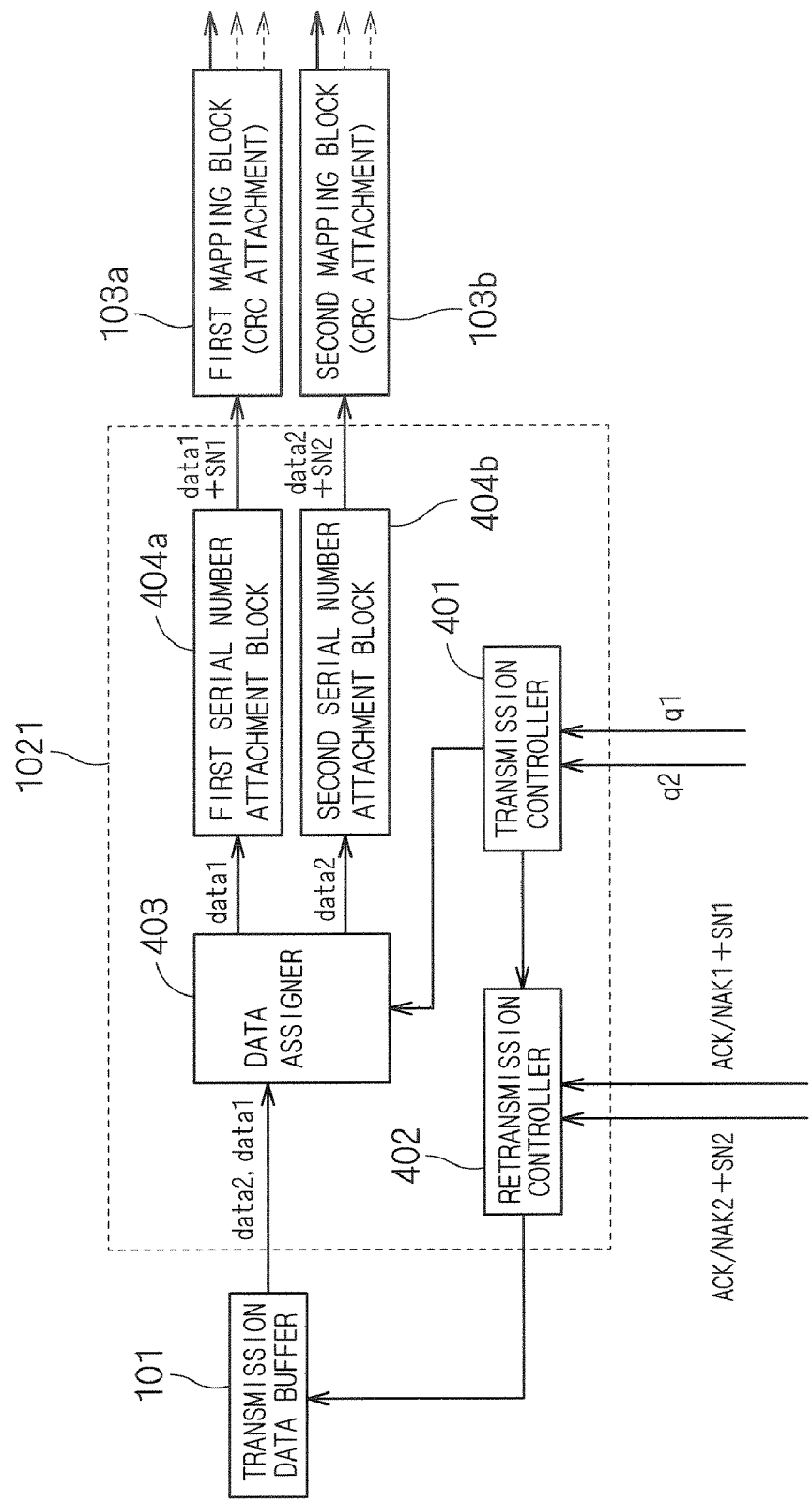
FIG. 20 A diagram illustrating the configuration of a transmission data managing block 1021 shown in FIG. 18.

FIGS. 18 to 20 are diagrams illustrating a CDMA radio communications system according to a fourth preferred embodiment.

FIG. 18 is a diagram illustrating the configuration of a base station 1 of the fourth preferred embodiment. In FIG. 18, the same reference characters as those of FIG. 5 indicate the same or corresponding components. The base station 1 of FIG. 18 differs from the base station 1 of FIG. 5 in that its decoding block 1101a and decoding block 1101b respectively output serial numbers SN for identification of the data pieces corresponding to the individual ACK/NAK signals, and in that the transmission data managing block 102 is replaced by a transmission data managing block 1021.

FIG. 19 is a diagram illustrating the configuration of a mobile station 2 of the fourth preferred embodiment. In FIG. 19, the same reference characters as those of FIG. 6 indicate the same or corresponding components. The mobile station 2 of FIG. 19 differs from the mobile station 2 of FIG. 6 in that its first error detecting block 2051a and second error detecting block 2051b respectively output the serial numbers SN for identification of the data pieces corresponding to the individual ACK/NAK signals.

FIG. 20 is a diagram illustrating the transmission data managing block 1021 shown in FIG. 18. In FIG. 20, the same reference characters as those of FIG. 11 indicate the same or corresponding components. The transmission data managing block 1021 of FIG. 20 differs from the transmission data managing block 102 of FIG. 11 in that it includes a first serial number attachment block 404a and a second serial number attachment block 404b, and in that its retransmission controller 402 receives the serial numbers SN for identification of the data pieces corresponding to the individual ACK/NAK signals.

The operation of the transmission data managing block 1021 of FIG. 20 will be described. The first serial number attachment block 404a attaches one serial number, for each data block or for each one transmission time interval, to one or a plurality of data blocks inputted from the data assigner 403, and outputs them to the first mapping block 103a.

For example, the first serial number attachment block 404a adds one serial number SN1 to one data block data1 inputted from the data assigner 403, and outputs them as one data block (data1+SN1) to the first mapping block 103a.

Also, the second serial number attachment block 404b attaches one serial number, for each data block or for each one transmission time interval, to one or a plurality of data blocks inputted from the data assigner 403, and outputs them to the second mapping block 103b.

For example, the second serial number attachment block 404b adds one serial number SN2 to one data block data2 inputted from the data assigner 403, and outputs them as one data block (data2+SN2) to the second mapping block 103b.

The serial numbers used in the first serial number attachment block 404a and the second serial number attachment block 404b can be cyclic numbers such as 0 to 63. The first serial number attachment block 404a and the second serial number attachment block 404b may use the same cyclic numbers or different cyclic numbers. That is, the first serial number attachment block 404a and the second serial number attachment block 404b may use the same serial numbers in the same periods, or not.

The serial number SN1 added in the first serial number attachment block 404a is extracted in the first error detecting block 2051a of the mobile station 2 shown in FIG. 19, and outputted to the coding block 209a together with the ACK/NAK signal indicating the result of error detection in the first error detecting block 2051a.

The serial number SN1 inputted to the coding block 209a is decoded in the decoding block 1101a of the base station 1 shown in FIG. 18, and outputted to the transmission data managing block 1021 together with the decoded ACK/NAK signal.

The serial number SN1 and the ACK/NAK signal inputted to the transmission data managing block 1021 are provided to the retransmission controller 402 shown in FIG. 20, and the retransmission controller 402 identifies the data corresponding to the inputted ACK/NAK signal on the basis of the serial number SN1 inputted together with the ACK/NAK signal.

In the same way, the serial number SN2 added in the second serial number attachment block 404b of the transmission data managing block 1021 of FIG. 20 is extracted in the second error detecting block 2051b of the mobile station 2 shown in FIG. 19, and outputted to the coding block 209b together with the ACK/NAK signal indicating the result of error detection in the second error detecting block 2051b.

The serial number SN2 inputted to the coding block 209b is decoded in the decoding block 1101b of the base station 1 shown in FIG. 18, and outputted to the transmission data managing block 1021 together with the decoded ACK/NAK signal.

The serial number SN2 and the ACK/NAK signal inputted to the transmission data managing block 1021 are provided to the retransmission controller 402 shown in FIG. 20, and the retransmission controller 402 identifies the data corresponding to the inputted ACK/NAK signal on the basis of the serial number SN2 inputted together with the ACK/NAK signal.

In other respects, the operations of the base station 1 and the mobile station 2 can be the same as those illustrated in FIGS. 5, 6 and 11.

Figure 21:
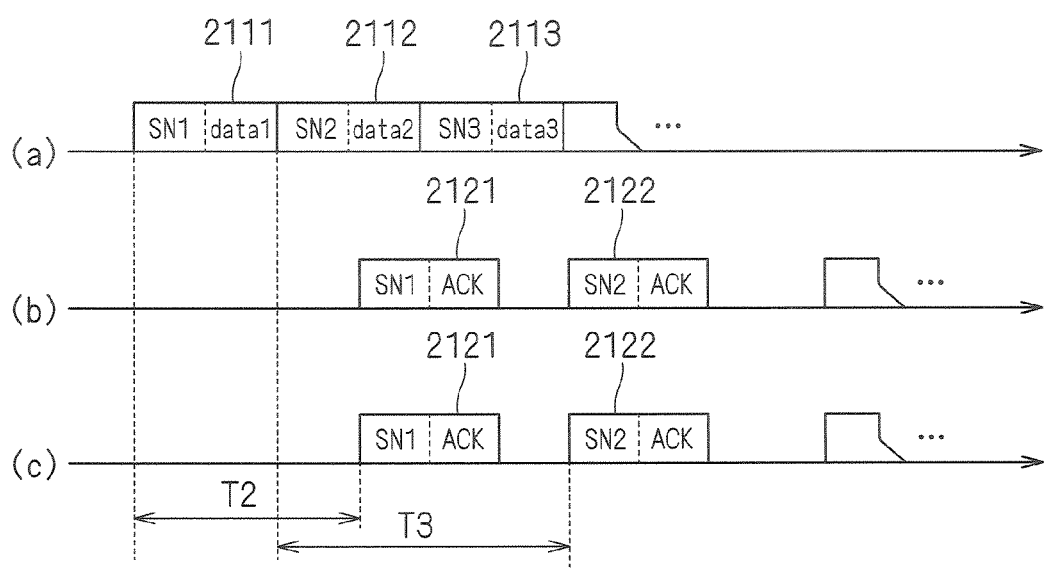
FIG. 21 A diagram illustrating a method of transmitting ACK/NAK signals according to the fourth preferred embodiment.

FIG. 21(a) is a diagram illustrating the timing of transmission of data pieces from the first radio transmitter block 105a of the base station 1 shown in FIG. 18. In this diagram, each of 2111 to 2113 is a one-unit transmission signal (frame, subframe, slot, or the like). Each one-unit transmission signal includes data to be transmitted from the base station 1 to the mobile station 2 and the serial number corresponding to that data. FIG. 21(b) illustrates the timing of transmission of ACK/NAK signals from the first radio transmitter block 211a of the mobile station 2 shown in FIG. 19. FIG. 21(*c*) illustrates the timing of reception of the ACK/NAK signals in the first radio receiver block 108*a* of the base station 1 shown in FIG. 18. In the diagrams, 2121 and 2122 are the ACK/NAK signals respectively corresponding to the data 1 and data 2, and SN1 and SN2 are the serial numbers respectively corresponding to the data 1 and data 2. T2 and T3 are different time intervals.

For the sake of simplicity, FIG. 21 assumes that the signal propagation time is zero from the first radio transmitter block 105*a* of the base station 1 of FIG. 18 to the first radio receiver block 202*a* of the mobile station 2 of FIG. 19, and the signal propagation time is zero from the first radio transmitter block 211*a* of the mobile station 2 of FIG. 19 to the first radio receiver block 108*a* of the base station 1 of FIG. 18.

In this way, in FIG. 21, each ACK/NAK signal transmitted from the mobile station 2 to the base station 1 has a serial number added thereto for specifying the data piece corresponding to that ACK/NAK signal, and therefore the base station 1 can specify the data piece that corresponds to the received ACK/NAK signal on the basis of the serial number.

Figure 22:
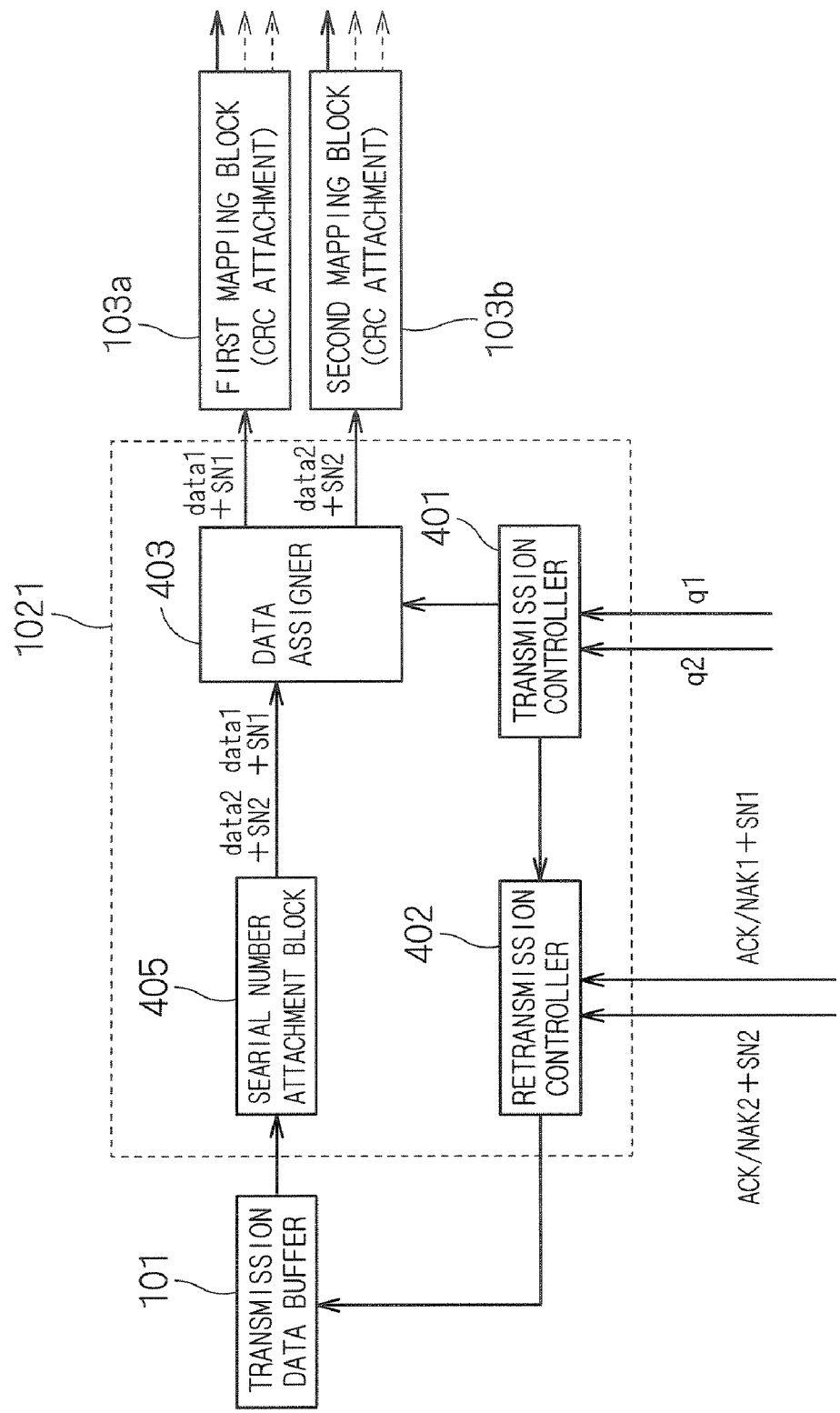
FIG. 22 A diagram illustrating another configuration of the transmission data managing block 1021 shown in FIG. 20.

In FIG. 20, the data assigner 403 is followed by the serial number attachment blocks 404*a* and 404*b* for adding serial numbers to data pieces, but, as shown in FIG. 22, the data assigner may be preceded by a serial number attachment block 405 for adding serial numbers to data pieces. In FIG. 22, the same reference characters as those of FIG. 20 indicate the same or corresponding components.

Figure 23:
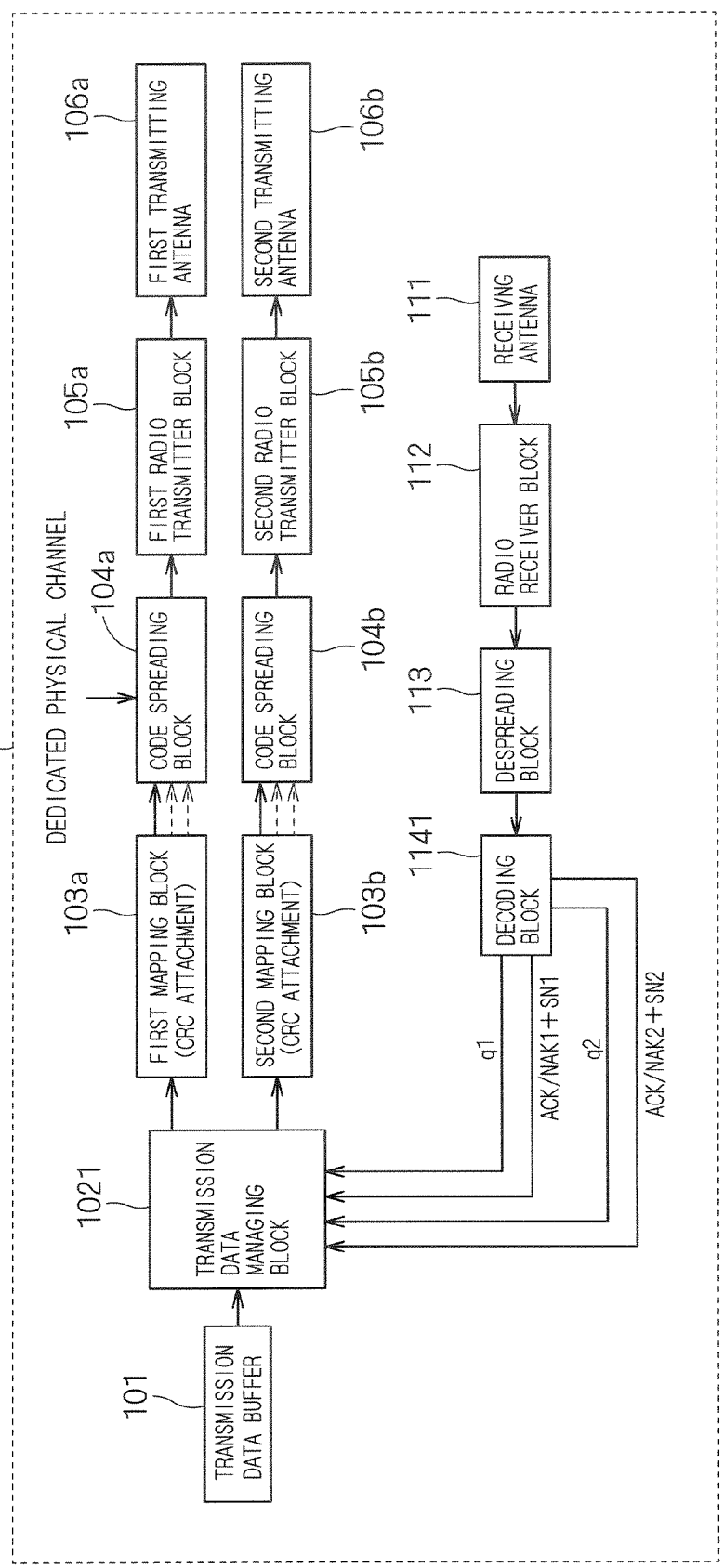
FIG. 23 A diagram illustrating another configuration of the base station of the fourth preferred embodiment.
Figure 24:
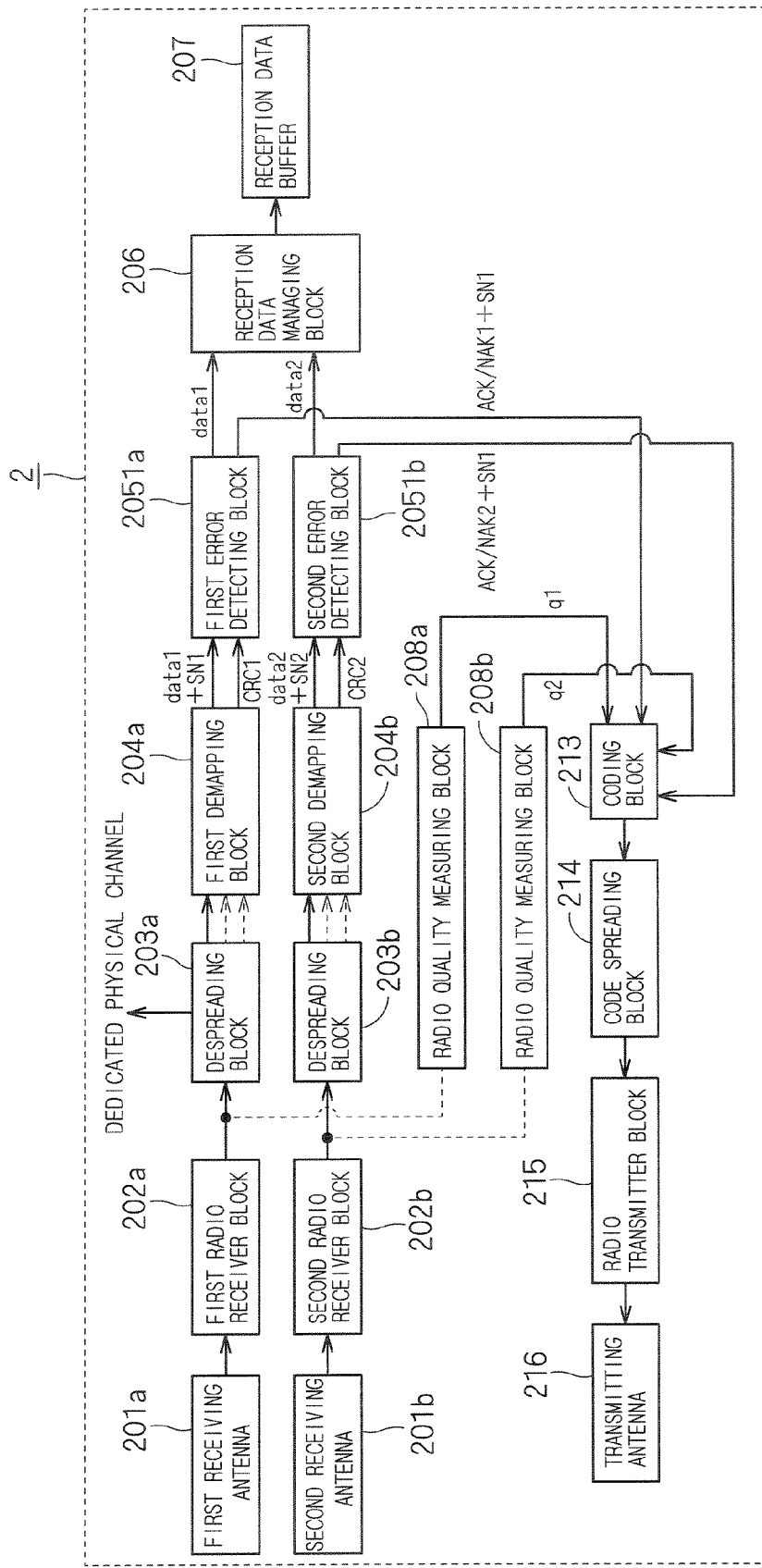
FIG. 24 A diagram illustrating another configuration of the mobile station of the fourth preferred embodiment.

Also, FIGS. 18 and 19 illustrate an example in which the outputs respectively from the first error detecting block 2051*a* and the second error detecting block 2051*b* of the mobile station 2 are transmitted to the base station 1 through different radio frequencies; however, as shown in FIGS. 23 and 24, their outputs may be transmitted to the base station 1 through the same radio frequency. In FIGS. 23 and 24, the same reference characters as those of FIGS. 15, 16, 18 and 19 indicate the same or corresponding components.

The base station 1 shown in FIG. 23 differs from the base station 1 of FIG. 15 in that its decoding block 1141 outputs the serial numbers SN for identification of data pieces corresponding to individual ACK/NAK signals, and in that the transmission data managing block 102 is replaced by the transmission data managing block 1021. The transmission data managing block 1021 has the same configuration as the transmission data managing block 1021 illustrated in FIG. 20 or 22.

The mobile station 2 shown in FIG. 24 differs from the mobile station 2 of FIG. 16 in that its first error detecting block 2051*a* and second error detecting block 2051*b* respectively output the serial numbers SN for identification of data pieces corresponding to the ACK/NAK signals. The first error detecting block 2051*a* and the second error detecting block 2051*b* are configured in the same way as those illustrated in FIG. 19.

That is, the ACK/NAK signals outputted respectively from the first error detecting block 2051*a* and the second error detecting block 2051*b* shown in FIG. 24 are inputted to the coding block 213 together with the serial numbers for identification of the data pieces corresponding to those ACK/NAK signals. The ACK/NAK signals and serial numbers inputted to the coding block 213 are decoded in the decoding block 1141 of the base station 1 of FIG. 23 and outputted to the transmission data managing block 1021.

In other respects, the operations can be the same as those illustrated in FIGS. 15, 16, 18 and 19.

Fifth Preferred Embodiment

This preferred embodiment will illustrate the operations of the radio quality measuring blocks 208*a* and 208*b* of the mobile station 2 shown in FIG. 6, and the operation of the transmission controller 401 shown in FIG. 11, by describing an example of the operation of the radio quality measuring block 208*a* shown in FIG. 6.

In this fifth preferred embodiment, the first radio quality measuring block 208*a* of the mobile station 2 measures thermal noise and interference waves from other devices in a first radio frequency band received in the first radio receiver block 202*a*, and also measures the radio propagation loss from the first radio transmitter block 105*a* of the base station 1 to the first radio receiver block 202*a* of the mobile station 2.

More specifically, the first radio quality measuring block 208*a* measures the reception power value due to thermal noise and interference waves from other devices in the first radio frequency band, by integrating reception power values in the first radio frequency band in the absence of data reception in the first radio receiver block 202*a*. On the other hand, in the presence of data reception in the first radio receiver block 202*a*, it excludes the signal components of that data from the integration. For example, it performs integration after re-modulating the demodulated signal obtained from the data reception and subtracting it from the entire reception signal to be integrated.

The radio propagation loss from the first radio transmitter block 105*a* of the base station 1 to the first radio receiver block 202*a* of the mobile station 2 is obtained by calculating "the transmission power value of a given signal in the first radio transmitter block 105*a* of the base station 1"–"the reception power value of that given signal in the first radio receiver block 202*a* of the mobile station 2". The transmission power value of that given signal in the first radio transmitter block 105*a* of the base station 1 is previously informed from the base station 1 to the mobile station 2. The reception power value of that given signal in the first radio receiver block 202*a* of the mobile station 2 can be calculated, for example, by subtracting the reception power value due to thermal noise and interference waves from other devices from the reception power value in the first radio frequency band.

The information about the reception power value due to thermal noise and interference from other devices in the first radio frequency band, and about the radio propagation loss from the first radio transmitter block 105*a* to the first radio receiver block 202*a*, which are measured in the first radio quality measuring block 208*a*, is transmitted from the mobile station 2 to the base station 1, and inputted as the radio quality information signal q1 to the transmission controller 401 shown in FIG. 11.

Similarly, the second radio quality measuring block 208*b* of the mobile station 2 shown in FIG. 6 measures the reception power value due to thermal noise and interference from other devices in a second radio frequency band received in the second radio receiver block 202*b*, and also measures the radio propagation loss from the second radio transmitter block 105*b* to the second radio receiver block 202*b*; the information about the measurements is then transmitted from the mobile station 2 to the base station 1, and inputted as the radio quality information signal q2 to the transmission controller 401 shown in FIG. 11.

On the basis of the inputted radio quality information signal(s) q1 and/or q2, the transmission controller 401 shown in FIG. 11 determines the amount of data inputted to the first mapping block 103*a*, and/or the amount of data inputted to the second mapping block 103*b*.

The transmission controller 401 may determine the amount of data inputted to the first mapping block 103*a*, and/or the amount of data inputted to the second mapping block 103*b*, not only on the basis of these inputted radio quality information signals, but also on the basis of other information, such as the maximum transmittable power values of the radio transmitter blocks 105a and 105b of the base station 1, the amount of data accumulated in the transmission data buffer 101, the presence/absence of transmission diversity, the number of transmitting antennas, the error correction scheme, interleaving scheme, puncturing/repetition rate, the capacity of the reception data buffer 207, modulation scheme (16QAM/QPSK, etc.), Eb/No required for transmitted data, etc. The Eb/No required for transmitted data is energy required for each bit of transmitted data.

The radio quality information signals q1 and q2 inputted to the transmission controller 401 of FIG. 11 may be the measurements themselves obtained by the radio quality measuring blocks 208a and 208b, or they can be formed of an arbitrary parameter determined on the basis of the measurements. For example, the radio quality measuring blocks 208a and 208b may each determine a parameter like the CQI of WCDMA on the basis of the measurements, and the parameter is provided as the radio quality information signal to the transmission controller 401.

The values measured in the radio quality measuring blocks 208a and 208b can be the SIR (signal to interference ratio) or SINR (signal to noise plus interference ratio). For example, when the base station 1 transmits a data sequence with known transmission power on the first or second radio frequency, the radio quality measuring block 208a or 208b may measure the SIR or SINR of that data sequence.

Sixth Preferred Embodiment

In this sixth preferred embodiment, the transmission data buffer 101 of FIG. 11 divides data to be transmitted and stores the data as fixed-length data blocks. When some data is below the fixed length, a given bit or bits are added thereto to form a fixed-length data block, and the fixed-length data block is stored.

More specifically, the transmission controller 401 of FIG. 11 determines the numbers of data blocks to be inputted respectively to the first mapping block 103a and the second mapping block 103b, and informs the data assigner 403 and the retransmission controller 402 about the determined numbers of data blocks. The retransmission controller 402 controls the transmission data buffer 101 so that data blocks of the numbers specified by the transmission controller 401 are outputted from the transmission data buffer 101 to the data assigner 403. The data assigner 403 assigns the data blocks outputted from the transmission data buffer 101 to the first mapping block 103a and the second mapping block 103b, on the basis of the notification from the transmission controller.

The first mapping block 103a and/or the second mapping block 103b attach CRC bits to each of the inputted data blocks, and the retransmission controller 402 determines whether retransmission is needed, block by block, on the basis of the ACK/NAK signals respectively corresponding to the inputted data blocks.

Alternatively, the first mapping block 103a and/or the second mapping block 103b may combine inputted data blocks to form a combined data block, and attach CRC bits to the combined data block. The number of CRC bits attached to the combined data block is increased or reduced according to the size of the combined data block. The retransmission controller 402 receives the ACK/NAK signal for each combined data block, and determines whether retransmission is needed for each combined data block.

Seventh Preferred Embodiment

In this preferred embodiment, when the ACK signal corresponding to the nth data (n is an integer of 1 or more) transmitted from the base station 1 to the mobile station 2 is not received in the base station 1 even after the mth data (m is an integer of n or more) has been transmitted from the base station 1 to the mobile station 2, then the transmission of the (m+1)th and following data from the base station 1 to the mobile station 2 is stopped until the ACK signal for the nth data is received in the base station 1.

After the stop of transmission, when the ACK signal corresponding to the nth data is received in the base station 1 and data transmission from the base station 1 is to be restarted, then the transmission may be restarted from the (n+1)th data that follows the nth data, i.e. retransmission of (n+1)th to mth data, or the transmission may be restarted from the (m+1)th data.

When the transmission is restarted from the (n+1)th data after the stop of transmission, the mobile station 2 does not necessarily have to buffer the (n+1)th and following received data, during the stop of transmission.

When the transmission is restarted from the (m+1)th data after the stop of transmission, the base station 1 does not have to transmit already correctly received data to the mobile station 2 after the restart of transmission.

Also, even during the stop of transmission, transmission operation only for retransmission of the nth data, or retransmission of the nth to (m+1)th data, may be performed.

Also, for the representation of the nth and mth, the value may be counted up for n and m each time new data is transmitted, and the counting up operation may be performed or stopped during the retransmission.

More specifically, for example, among pieces of data outputted from the transmission data buffer 101, the retransmission controller 402 of FIG. 22 compares the serial number of the data piece for which ACK signal is absent, and the serial number of new piece of data to be next outputted from the transmission data buffer 101. Then, when the comparison indicates that the difference between the two serial numbers exceeds a threshold diff1, the retransmission controller 402 stops the request for output.

When the ACK signal for the data piece for which ACK signal was absent is received after stopping the request for output, the retransmission controller 402 restarts the request for output.

The threshold diff1 may be informed from a higher layer or a higher device, or may be previously stored in the retransmission controller 402.

Preferably, the threshold diff1 is determined on the basis of the reception buffer size of the mobile station 2, and the threshold diff1 may take different values for different mobile stations 2.

When the serial numbers added to the data pieces are cyclic numbers from 0 to 63, as 0, 1, 2, . . . , 62, 63, 0, 1, . . . , then the difference between two serial numbers is calculated, e.g. by Modulo64 (64+the next serial number−the serial number of NAK occurrence).

Eighth Preferred Embodiment

In this preferred embodiment, a comparison is made between "the amount of data transmitted from the base station 1 to the mobile station 2" and "the amount of data for which corresponding ACK signals have been received in the base station 1"; when the difference exceeds a given value, the transmission from the base station 1 to the mobile station 2 is stopped until the difference becomes less than the given value. In this period, retransmission from the base station 1 to the mobile station 2 may also be stopped, or may be performed.

For example, when the base station 1 has transmitted 640 bytes of data to the mobile station 2 eight times and the corresponding ACK signal was received once in the base station 1, then "the amount of data transmitted from the base station 1 to the mobile station 2" is 640×8 (=5120) bytes, and "the amount of data for which corresponding ACK signals have been received in the base station 1" is 640×1 (=640) bytes. Accordingly, the difference between "the amount of data transmitted from the base station 1 to the mobile station 2" and "the amount of data for which corresponding ACK signals have been received in the base station 1" is 5120−640 (=4480) bytes.

Specifically, in FIG. 11, the retransmission controller 402 makes a comparison between the amount of data outputted from the transmission data buffer 101 and the amount of data for which corresponding ACK signals have been received, and the retransmission controller 402 stops requesting the transmission data buffer 101 to output new data when the difference exceeds a threshold diff2. When the difference becomes below the threshold diff2 after stopping the request for output, the retransmission controller 402 restarts requesting the transmission data buffer 101 to output new data.

The threshold diff2 may be informed from a higher layer or higher device, or previously stored in the retransmission controller 402.

Preferably, the threshold diff2 is determined on the basis of the reception buffer size of the mobile station 2, and the threshold diff2 may take different values for different mobile stations 2.

Ninth Preferred Embodiment

For the CDMA radio communications system shown in FIGS. 15 and 16, this preferred embodiment exemplifies the method of transmitting the ACK/NAK signals from the mobile station 2 of FIG. 16 to the base station 1 of FIG. 15.

Figure 25:
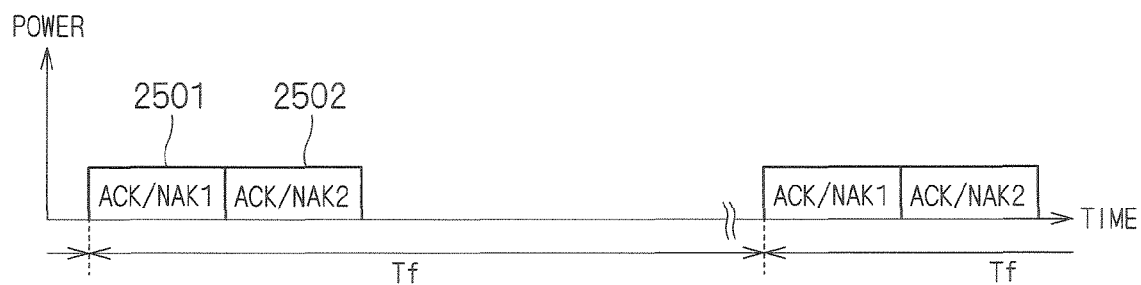
FIG. 25 A diagram illustrating a method of transmitting ACK/NAK signals according to a ninth preferred embodiment.

FIG. 25 is a diagram showing a first example of the method of transmitting the ACK/NAK signals from the mobile station 2 to the base station 1 in the CDMA radio communications system shown in FIGS. 15 and 16.

In FIG. 25, 2501 is an ACK/NAK signal corresponding to the result of error detection in the first error detecting block 205a shown in FIG. 16, and 2502 is an ACK/NAK signal corresponding to the result of error detection in the second error detecting block 205b shown in FIG. 16. That is, 2501 is a signal that corresponds to the result of error detection in the mobile station 2 about data transmitted on the first radio frequency from the base station 1, and 2502 is a signal that corresponds to the result of error detection in the mobile station 2 about data transmitted on the second radio frequency from the base station 1. In FIG. 25, the horizontal axis shows time base, the vertical axis shows the power on a third radio frequency utilized for transmission from the mobile station 2 to the base station 1, and Tf is the time length of one unit (frame, subframe, slot, or the like). In this example, the ACK/NAK signal 2501 and the ACK/NAK signal 2502 are transmitted with predetermined different timings on the same physical channel.

In the ACK/NAK signal transmitting method shown in FIG. 25, the timings of transmission of ACK/NAK signals from the mobile station 2 to the base station 1 can be determined on the basis of whether the data piece corresponding to that ACK/NAK signal was transmitted on the first radio frequency or the second radio frequency. Accordingly, the mobile station 2 does not have to transmit information for identification of the radio frequency corresponding to the ACK NAK signal every time it transmits the ACK NAK signal. FIG. 25 does not show signals corresponding to the radio quality information signals outputted from the radio quality measuring blocks 208a and 208b shown in FIG. 16.

Figure 26:
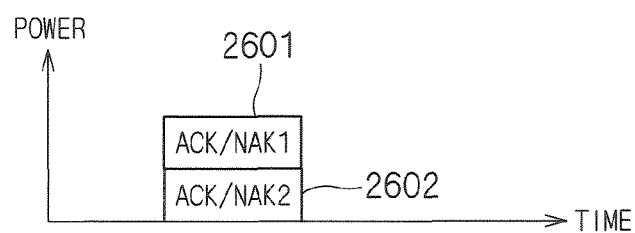
FIG. 26 A diagram illustrating another method of transmitting ACK/NAK signals according to the ninth preferred embodiment.

FIG. 26 is a diagram showing a second example of the method of transmitting the ACK/NAK signals from the mobile station 2 to the base station 1 in the CDMA radio communications system shown in FIGS. 15 and 16.

In FIG. 26, 2601 is an ACK/NAK signal corresponding to the result of error detection in the first error detecting block 205a shown in FIG. 16, and 2602 is an ACK/NAK signal corresponding to the result of error detection in the second error detecting block 205b shown in FIG. 16. In FIG. 26, the ACK/NAK signal 2601 and the ACK/NAK signal 2602 are code-multiplexed to different physical channels on the same radio frequency. In FIG. 26, the timing of transmission of the ACK/NAK signal 2601 and the timing of transmission of the ACK/NAK signal 2602 may be the same or different. FIG. 26 does not show signals corresponding to the radio quality information signals outputted from the radio quality measuring blocks 208a and 208b shown in FIG. 16.

Tenth Preferred Embodiment

Figure 27:
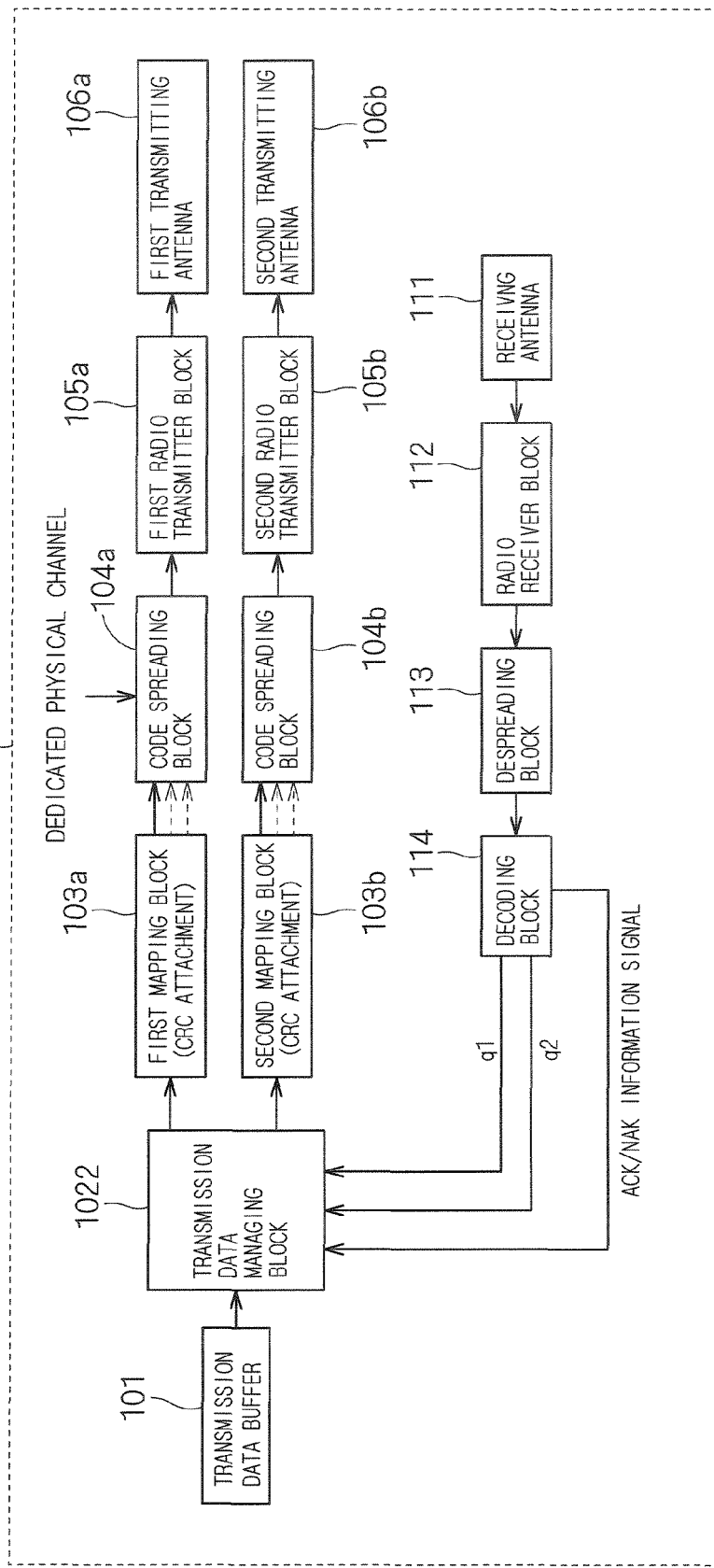
FIG. 27 A diagram illustrating the configuration of a base station according to a tenth preferred embodiment.
Figure 28:
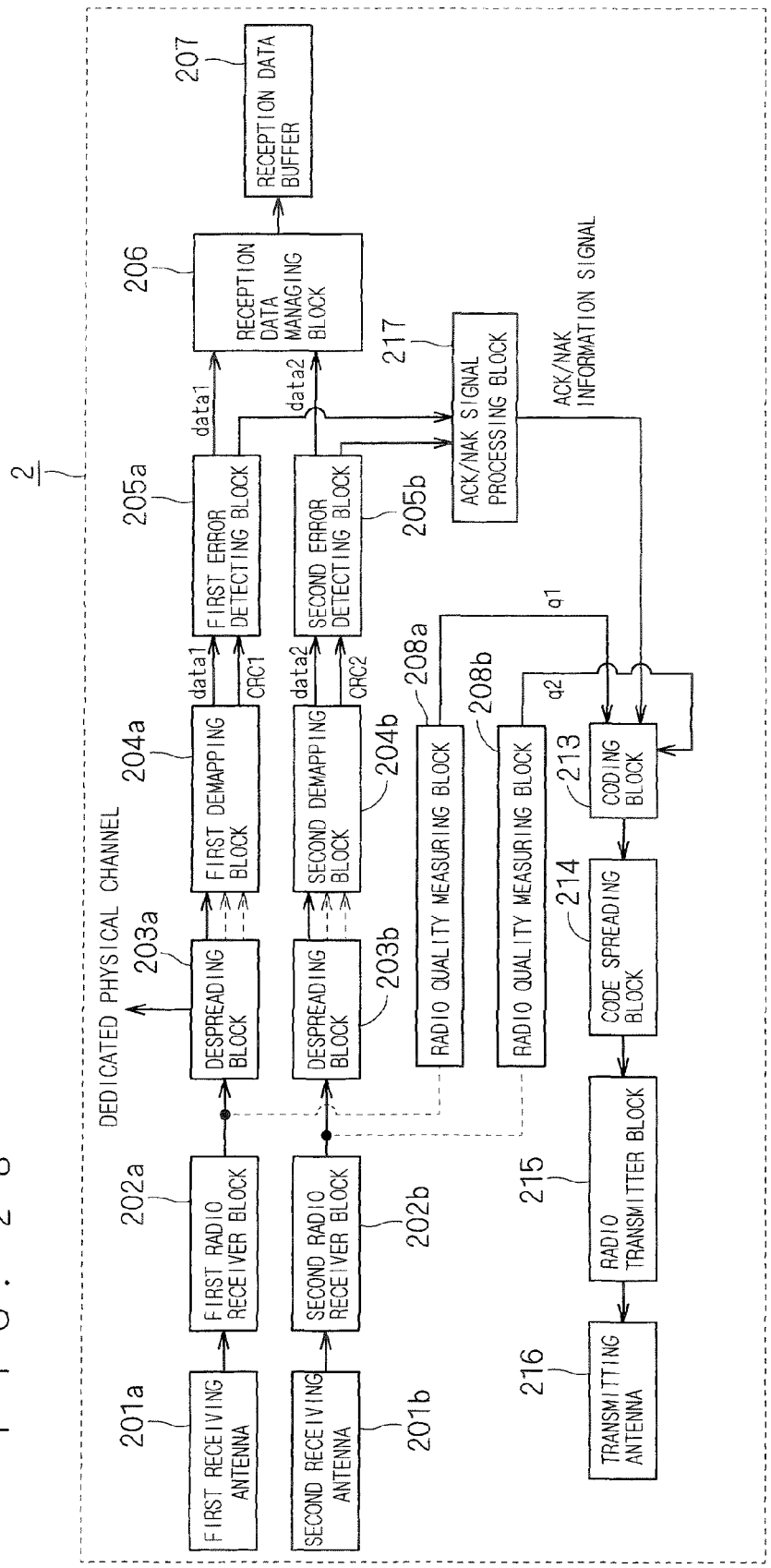
FIG. 28 A diagram illustrating the configuration of a mobile station according to the tenth preferred embodiment.

This preferred embodiment illustrates a method of transmitting the ACK/NAK signals that is different from the examples shown in the ninth preferred embodiment. In this tenth preferred embodiment, the base station 1 and the mobile station 2 have the configurations shown in FIGS. 27 and 28, respectively. In FIGS. 27 and 28, the same reference characters as those of FIGS. 15 and 16 indicate the same or corresponding components.

In FIG. 28, the result of error detection outputted from the first error detecting block 205a of the mobile station 2, and the result of error detection outputted from the second error detecting block 205b, are converted to a given signal in an ACK/NAK signal processing block 217, and inputted to the coding block 213 as an ACK/NAK information signal. The ACK/NAK information signal is outputted from the decoding block 114 shown in FIG. 27, and provided to a transmission data managing block 1022. On the basis of the radio quality information signals q1 and q2 and the ACK/NAK information signal outputted from the decoding block 114, the transmission data managing block 1022 controls the data reading from the transmission data buffer 101 and the assignment of read data between the first mapping block 103a and the second mapping block 103b.

Figure 29:
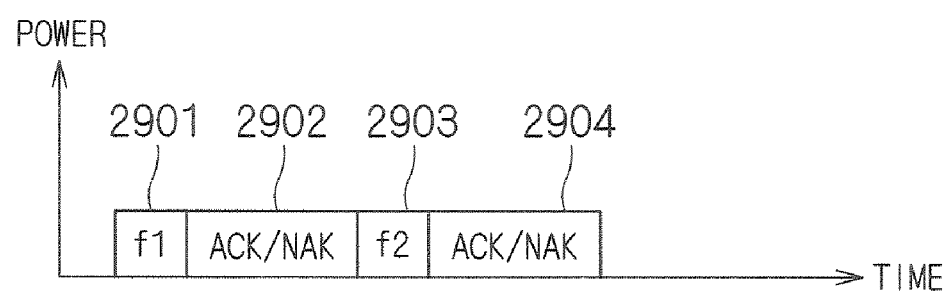
FIG. 29 A diagram illustrating an ACK/NAK information signal according to the tenth preferred embodiment.

FIG. 29 is a diagram showing a first example of the ACK/NAK information signal transmitted from the mobile station 2 to the base station 1 in the CDMA radio communications system shown in FIGS. 27 and 28.

In this first example, in the CDMA radio communications system shown in FIGS. 27 and 28, different frequency numbers are previously assigned respectively to all radio frequencies that can be adopted as a first radio frequency used in the first radio transmitter block 105a and a second radio frequency used in the second radio transmitter block 105b, and the ACK/NAK signal processing block 217 shown in FIG. 28 outputs an ACK/NAK information signal in which a frequency identification signal indicating the frequency number of the first or second radio frequency is added to the corresponding ACK/NAK signal transmitted from the mobile station 2 to the base station 1.

In FIG. 29, 2901 is a frequency identification signal indicating the frequency number of the first radio frequency, 2902 is an ACK/NAK signal corresponding to the result of error detection in the first error detecting block 205a, 2903 is a frequency identification signal indicating the frequency number of the second radio frequency, and 2904 is an ACK/NAK signal corresponding to the result of error detection in the second error detecting block 205b. FIG. 29 does not show signals corresponding to the radio quality information signals outputted from the radio quality measuring blocks 208a and 208b shown in FIG. 28.

More specifically, the ACK/NAK signal processing block 217 of FIG. 28 outputs an ACK/NAK information signal to the coding block 213 in which the frequency identification signal indicating the frequency number of the first radio frequency is added to the ACK/NAK signal outputted from the first error detecting block 205a. Also, the ACK/NAK signal processing block 217 outputs an ACK/NAK information signal to the coding block 213 in which the frequency identification signal indicating the frequency number of the second radio frequency is added to the ACK/NAK signal outputted from the second error detecting block 205b. The signal inputted to the coding block 213 is outputted from the decoding block 114 of the base station 1 of FIG. 27, and provided to the transmission data managing block 1022. On the basis of the frequency identification signals in the ACK/N k information signal, the transmission data managing block 1022 identifies the data corresponding to the ACK/NAK signals in the ACK/N information signal.

According to the ACK/NAK information signal transmitting method, the transmission of each ACK/NAK signal carries a frequency identification signal for identification of the radio frequency of the first radio frequency or the second radio frequency on which the data corresponding to that ACK/NAK signal was transmitted; accordingly, the overhead of each ACK/NAK signal is increased, but, when the first radio frequency and the second radio frequency are variable, it is possible to certainly inform the base station 1 about which radio frequency was used to transmit the data that corresponds to the ACK/NAK signal.

In this example, the frequency numbers are assigned respectively to the radio frequencies, but one identification symbol may be assigned to a set of a radio frequency used as the first radio frequency and a radio frequency used as the second radio frequency, in which case the identification symbol can be added to at least one ACK/NAK signal in transmission.

Also, FIG. 29 shows an example in which the entire ACK/NAK information signal is transmitted from the mobile station 2 to the base station 1 by using the same physical channel on the same radio frequency, but part of the ACK/NAK information signal may be transmitted by using another physical channel code-multiplexed on the same radio frequency.

Eleventh Preferred Embodiment

Figure 30:
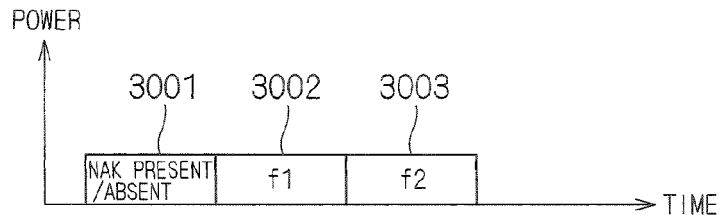
FIG. 30 A diagram illustrating an ACK NAK information signal according to an eleventh preferred embodiment.

FIG. 30 is a diagram showing a second example of the ACK/NAK information signal transmitted from the mobile station 2 to the base station 1 in the CDMA radio communications system shown in FIGS. 27 and 28.

In this second example, the ACK/NAK signal processing block 217 shown in FIG. 28 outputs an ACK/NAK information signal in which a NAK present/absent information signal indicating whether reception errors are present or absent in the mobile station 2 (which is hereinafter referred to as NAK present/absent) is followed by frequency identification signals indicating the frequency numbers of radio frequencies on which the reception errors occurred. Receiving the ACK/NAK information signal, the base station 1 first checks the NAK present/absent information signal contained in the ACK/NAK information signal; when the NAK present/absent information signal indicates the presence of reception errors (which is hereinafter referred to as NAK present), the base station 1 performs predetermined processing using the frequency identification signals added behind the NAK present/absent information signal. On the other hand, when the NAK present/absent information signal indicates the absence of reception errors (hereinafter referred to as NAK absent), the base station 1 skips all or part of the processing using the frequency identification signals added behind the NAK present/absent information signal.

In FIG. 30, 3001 is a NAK present/absent information signal indicating NAK present/absent, and 3002 and 3003 are frequency identification signals indicating the frequency numbers of NAK-present radio frequencies. FIG. 30 does not show signals corresponding to the radio quality information signals outputted from the radio quality measuring blocks 208a and 208b shown in FIG. 28.

More specifically, when neither of the first error detecting block 205a and the second error detecting block 205b detected errors in the time of one unit (frame, subframe, slot, or the like), the ACK/NAK signal processing block 217 shown in FIG. 28 outputs a NAK present/absent information signal indicating NAK absent, as the ACK/NAK information signal. On the other hand, when at least one of the first error detecting block 205a and the second error detecting block 205b detected errors in the time of one unit (frame, subframe, slot, or the like), the ACK/NAK signal processing block 217 outputs an ACK/NAK information signal in which a NAK present/absent information signal indicating NAK present is followed by frequency identification signals indicating the frequency numbers of error-detected radio frequencies.

Preferably, when the mobile station 2 transmits the ACK/NAK information signal to the base station 1, the mobile station 2 does not perform error correction coding of the NAK present/absent information signal, and performs error correction coding of the frequency identification signal. The error coding can use an error correction coding scheme such as reed-muller, for example.

In this way, in transmission of the ACK/NAK information signal from the mobile station 2 to the base station 1, the mobile station 2 does not perform error correction coding of the NAK present/absent information signal in the ACK/NAK information signal, and performs error correction coding of the frequency identification signal in the ACK/NAK information signal, which allows the base station 1 to skip processing for error correction of the frequency identification signal when the NAK present/absent information signal indicates NAK absent.

Twelfth Preferred Embodiment

Figure 31:
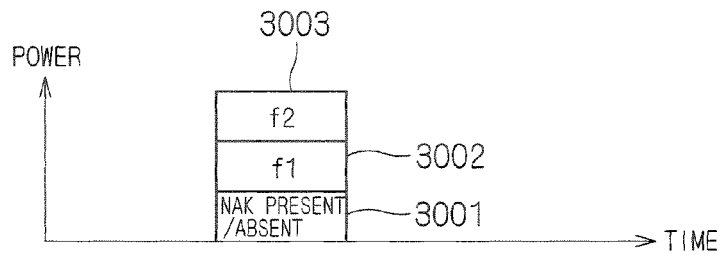
FIG. 31 A diagram illustrating an ACK/NAK information signal according to a twelfth preferred embodiment.

FIG. 31 is a diagram showing a third example of the ACK/NAK information signal transmitted from the mobile station 2 to the base station 1 in the CDMA radio communications system shown in FIGS. 27 and 28.

In the second example shown in FIG. 30, in the transmission from the mobile station 2 to the base station 1, the entire ACK/NAK information signal is code-multiplexed on the same physical channel of the same radio frequency. In the third example, the ACK/NAK information signal as illustrated in FIG. 30 is transmitted by using a plurality of different physical channels on the same radio frequency. In FIG. 31, the same reference characters as those of FIG. 30 indicate the same or corresponding components.

In FIG. 31, a NAK present/absent information signal 3001, a frequency identification signal 3002, and a frequency identification signal 3003, are transmitted by using different physical channels that are code-multiplexed on the same radio frequency.

According to the ACK/NAK information signal transmitting method, when the NAK present/absent information signal 3001 indicates NAK absent, the mobile station 2 can skip the transmission of the frequency identification signal 3002 and the frequency identification signal 3003, which reduces the consumption power in the mobile station 2.

Also, according to the ACK/NAK information signal transmitting method, when the base station 1 despread the physical channel that contains the NAK present/absent information signal 3001 of FIG. 31 and found it indicating NAK absent, the base station 1 can skip the despreading of the other physical channels that contain the frequency identification signal 3002 and frequency identification signal 3003, which reduces the consumption power in the base station 1.

Thirteenth Preferred Embodiment

Figure 32:
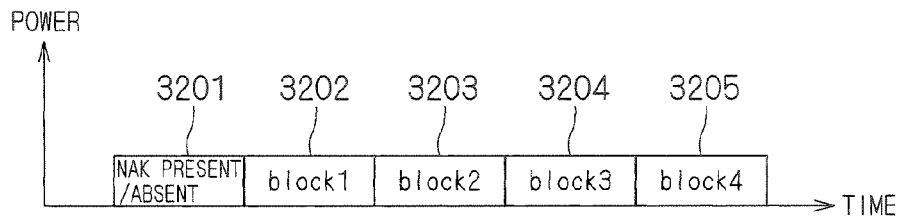
FIG. 32 A diagram illustrating an ACK/NAK information signal according to a thirteenth preferred embodiment.

FIG. 32 is a diagram showing a fourth example of the ACK/NAK information signal transmitted from the mobile station 2 to the base station 1 in the CDMA radio communications system shown in FIGS. 27 and 28.

The fourth example assumes that the base station 1 adds the CRC code for each data block and the mobile station 2 performs the error detection for each data block, and the ACK/NAK information signal is formed of a NAK present/absent signal and data block identification signals.

In FIG. 32, 3201 is a NAK present/absent information signal indicating NAK present/absent, and 3202 to 3205 are frequency identification signals respectively indicating the identification numbers of NAK-present data blocks.

In the fourth example, the ACK/NAK signal processing block 217 shown in FIG. 28 outputs an ACK/NAK information signal in which a NAK present/absent information signal indicating NAK present/absent in the mobile station 2 is followed by data block identification signals indicating the identification numbers of data blocks with reception errors. Receiving the ACK/NAK information signal, the base station 1 first checks the NAK present/absent information signal contained in the ACK/NAK information signal; when the NAK present/absent information signal indicates NAK present, the base station 1 performs given processing using the data block identification signals added behind the NAK present/absent information signal. On the other hand, when the NAK present/absent information signal indicates NAK absent, the base station 1 skips all or part of the processing using the data block identification signals added behind the NAK present/absent information signal.

More specifically, when neither of the first error detecting block 205$a$ and the second error detecting block 205$b$ detected errors in the time of one unit (frame, subframe, slot, or the like), the ACK/NAK signal processing block 217 shown in FIG. 28 outputs a NAK present/absent information signal indicating NAK absent as the ACK/NAK information signal. On the other hand, when at least one of the first error detecting block 205$a$ and the second error detecting block 205$b$ detected errors in the time of one unit (frame, subframe, slot, or the like), the ACK/NAK signal processing block 217 outputs an ACK/NAK information signal in which a NAK present/absent information signal indicating NAK present is followed by data block identification signals indicating the identification numbers of error-detected data blocks.

Preferably, when the mobile station 2 transmits the ACK/NAK information signal to the base station 1, the mobile station 2 does not perform error correction coding of the NAK present/absent information signal, and performs error correction coding of the data block identification numbers. The error coding may use an error correction coding scheme such as reed-muller, for example.

In this way, when the ACK/NAK information signal is transmitted from the mobile station 2 to the base station 1, error correction coding is not applied to the NAK present/absent information signal in the ACK/NAK information signal, and error correction coding is applied to the data block identification signals in the ACK/NAK information signal, which allows the base station 1 to skip the processing for error correction of the data block identification signals when the NAK present/absent information signal indicates NAK absent.

In the example of transmission from the mobile station 2 to the base station 1 of FIG. 32, the entire ACK/NAK information signal is transmitted by using the same physical channel on the same radio frequency, but part of the ACK/NAK information signal may be transmitted by using another physical channel code-multiplexed on the same radio frequency.

Fourteenth Preferred Embodiment

Figure 33:
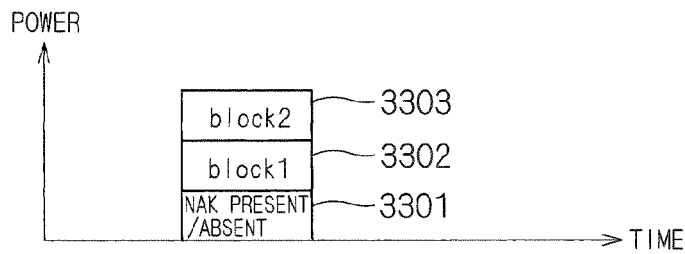
FIG. 33 A diagram illustrating an ACK/NAK information signal according to a fourteenth preferred embodiment.

FIG. 33 is a diagram showing a fifth example of the ACK/NAK information signal transmitted from the mobile station 2 to the base station 1 in the CDMA radio communications system shown in FIGS. 27 and 28.

In the fourth example, the NAK present/absent information signal indicates two states: NAK present and NAK absent. In the fifth example, the NAK present/absent information signal indicates three states: NAK absent, NAK present, and all NAK.

In FIG. 33, 3301 is a NAK present/absent information signal, and 3302 and 3303 are data block identification signals indicating the identification numbers of NAK-present data blocks.

In this fifth example, when neither of the first error detecting block 205$a$ and the second error detecting block 205$b$ detected errors during the time of one unit (frame, subframe, slot, or the like), the ACK/NAK signal processing block 217 of FIG. 28 outputs a NAK present/absent information signal indicating NAK absent, as the ACK/NAK information signal.

On the other hand, when at least one of the first error detecting block 205$a$ and the second error detecting block 205$b$ detected errors during the time of one unit (frame, subframe, slot, or the like) and the number of error-detected data blocks is not more than a given number (e.g. 2 or less), the ACK/NAK signal processing block 217 outputs an ACK/NAK information signal in which a NAK present/absent information signal indicating NAK present is immediately followed by data block identification signals indicating the identification numbers of error-detected data blocks.

Also, when at least one of the first error detecting block 205$a$ and the second error detecting block 205$b$ detected errors during the time of one unit (frame, subframe, slot, or the like) and the number of error-detected data blocks is more than the given number (e.g. 2), the ACK/NAK signal processing block 217 outputs a NAK present/absent information signal indicating all NAK, as the ACK/NAK information signal.

Receiving the ACK/NAK information signal, the base station 1 first checks the NAK present/absent information signal contained in the ACK/NAK information signal; when it indicates NAK absent, the base station 1 skips all or part of the processing based on the following data block identification signals. On the other hand, when the NAK present/absent information signal contained in the ACK/NAK information signal indicates NAK present, the base station 1 performs processing based on the data block identification signals contained in the ACK/NAK information signal. Also, when the NAK present/absent information signal contained in the ACK/NAK information signal indicates all NAK, the base station 1 performs processing recognizing that the blocks transmitted from the base station 1 to the mobile station 2 during the time of one unit have all been erroneously received in the mobile station 2.

For example, the NAK present/absent information signal indicating NAK present may be a signal with successive 10 bits of all "−1", i.e. −1, −1, −1, −1, −1, −1, −1, −1, −1, −1, the present/absent information signal indicating all NAK may be a signal with successive 10 bits of all "+1", i.e. +1, +1, +1, +1, +1, +1, +1, +1, +1, +1, and the NAK present/absent information signal indicating NAK absent may be a signal not NAK present nor all NAK, e.g. a signal with successive 10 bits of all "0". Successive bits of all "0" can be transmitted to the base station 1 with zero transmission power from the mobile station 2, and using successive bits of all "0" as the NAK present/absent information signal indicating NAK absent, which has the highest possibility of occurrence, reduces the consumption power in the mobile station 2.

The NAK present/absent information signal of NAK present may be successive bits of all "0", the NAK present/absent information signal of NAK absent may be successive bits of all "+1 or −1", and the NAK present/absent information signal of all NAK may be successive bits of all "−1 or +1", in which case it is possible to reduce the possibility that the base station 1 erroneously receives and misidentifies the NAK present/absent information signal of NAK absent as the NAK present/absent information signal of all NAK.

In FIG. 33, in the transmission from the mobile station 2 to the base station 1, the NAK present/absent information signal 3301 of the ACK/NAK information signal, the data block identification signal 3302 and the data block identification signal 3303 of the ACK/NAK information signal, are transmitted using different physical channels on the same radio frequency, but the entire ACK/NAK information signal may be transmitted using the same physical channel on the same radio frequency.

Fifteenth Preferred Embodiment

Figure 34:
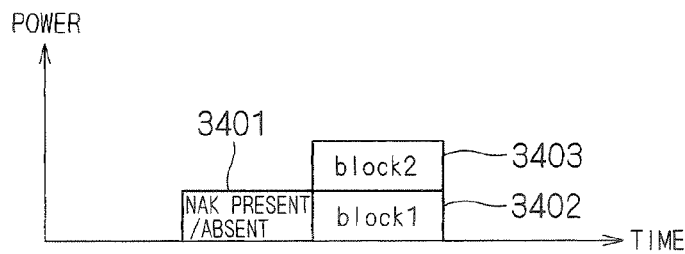
FIG. 34 A diagram illustrating an ACK/NAK information signal according to a fifteenth preferred embodiment.

FIG. 34 is a diagram showing a sixth example of the ACK/NAK information signal transmitted from the mobile station 2 to the base station 1 in the CDMA radio communications system shown in FIGS. 27 and 28.

In the sixth example, all data block identification signals of the ACK/NAK information signal are transmitted after the transmission of the NAK present/absent information signal of the ACK/NAK information signal.

In FIG. 34, 3401 is a NAK present/absent information signal indicating NAK present/absent, and 3402 and 3403 are data block identification signals indicating the identification numbers of NAK-present data blocks.

More specifically, when neither of the first error detecting block 205a and the second error detecting block 205b detected errors during the time of one unit (frame, subframe, slot, or the like), the ACK/NAK signal processing block 217 shown in FIG. 28 outputs a NAK present/absent information signal of NAK absent as the ACK/NAK information signal. On the other hand, when at least one of the first error detecting block 205a and the second error detecting block 205b detected errors during the time of one unit (frame, subframe, slot, or the like), the ACK/NAK signal processing block 217 outputs an ACK/NAK information signal in which a NAK present/absent information signal indicating NAK present is followed by data block identification signals indicating the identification numbers of error-detected data blocks.

As shown in FIG. 34, with the ACK/NAK information signal thus generated, the NAK present/absent information signal and the data block identification signals are transmitted with different timings.

Receiving the ACK/NAK information signal, the base station 1 first checks the NAK present/absent information signal contained in the ACK/NAK information signal; when it indicates NAK absent, the base station 1 skips all or part of the processing based on the following data block identification signals.

Sixteenth Preferred Embodiment

Figure 35:
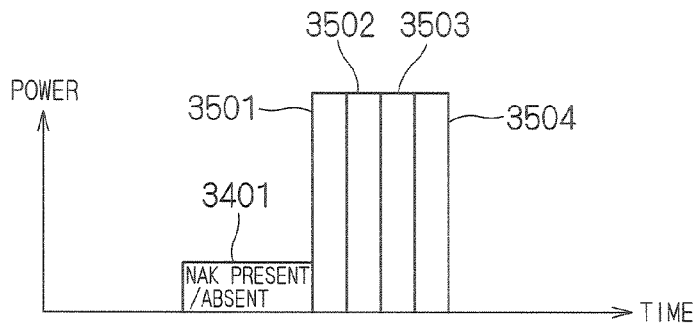
FIG. 35 A diagram illustrating an ACK/NAK information signal according to a sixteenth preferred embodiment.

FIG. 35 is a diagram showing a seventh example of the ACK/NAK information signal transmitted from the mobile station 2 to the base station 1 in the CDMA radio communications system shown in FIGS. 27 and 28.

In the seventh example, the spreading factor and transmission power used to transmit the NAK present/absent information signal in the ACK/NAK information signal differ from the spreading factor and transmission power used to transmit the data block identification signals in the ACK/NAK information signal.

In FIG. 35, 3401 is a NAK present/absent information signal indicating NAK present/absent, and 3501 to 3504 are data block identification signals indicating the identification numbers of NAK-present data blocks.

More specifically, when neither of the first error detecting block 205a and the second error detecting block 205b detected errors during the time of one unit (frame, subframe, slot, or the like), the ACK/NAK signal processing block 217 shown in FIG. 28 outputs a NAK present/absent information signal of NAK absent as the ACK/NAK information signal. On the other hand, when at least one of the first error detecting block 205a and the second error detecting block 205b detected errors during the time of one unit (frame, subframe, slot, or the like), the ACK/NAK signal processing block 217 outputs an ACK/NAK information signal in which a NAK present/absent information signal indicating NAK present is followed by data block identification signals indicating the identification numbers of error-detected data blocks.

The ACK/NAK information signal thus generated is transmitted from the mobile station 2 with spreading factors and transmission powers as shown in FIG. 35. That is, the spreading factor used to transmit the data block identification signals in the ACK/NAK information signal is lower than the spreading factor used to transmit the NAK present/absent information signal of the ACK/NAK information signal. On the other hand, the transmission power of the data block identification signals is increased, in order to prevent the base station 1 from being more susceptible to reception errors of the data block identification signals than the NAK present/absent information signal because of the lower spreading factor of the data block identification signals.

Receiving the ACK/NAK information signal, the base station 1 first checks the NAK present/absent information signal contained in the ACK/NAK information signal; when it indicates NAK absent, the base station 1 skips all or part of the processing with the following data block identification signals.

Seventeenth Preferred Embodiment

Figure 36:
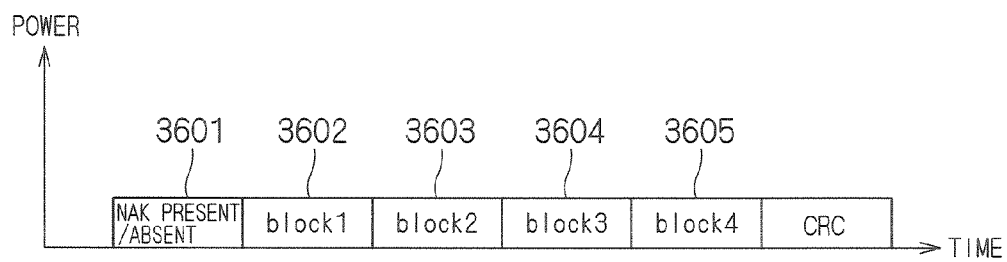
FIG. 36 A diagram illustrating an ACK/NAK information signal according to a seventeenth preferred embodiment.

FIG. 36 is a diagram showing an eighth example of the ACK/NAK information signal transmitted from the mobile station 2 to the base station 1 in the CDMA radio communications system shown in FIGS. 27 and 28.

In the eighth example, the ACK/NAK signal processing block 217 of FIG. 28 outputs an ACK/NAK information signal in which a NAK present/absent information signal indicating NAK present/absent is followed by data block identification signals indicating the identification numbers of NAK-present data blocks, and the data block identification signals are further followed by a CRC code for the data block identification signals.

This allows the base station 1 to perform error detection of the data block identification signals from the mobile station 2 by using the CRC code, when the data block identification signals are more susceptible to reception errors than the NAK present/absent information signal. When the error detection of the data block identification signals with the CRC code indicates erroneous reception of the data block identification signals, the base station 1 retransmits, to the mobile station, all data blocks transmitted during the time of one unit (frame, subframe, slot, or the like) corresponding to the ACK AK information signal.

This example illustrates the CRC attachment for data block identification signals, but the data block identification signals may be transmitted in error-correction-coded form.

Eighteenth Preferred Embodiment

In this preferred embodiment, the mobile station intermittently transmits to the mobile station a radio quality information signal such as CQI, and transmits data block identification signals by utilizing periods in which the radio quality information signal transmission is absent.

In particular, when transmission of a data block identification signal from the mobile station to the base station is needed, the data block identification signal is given priority over the radio quality information signal and preferentially transmitted from the mobile station to the base station. That is, the throughput is more likely to deteriorate when the data block identification signal 3705, indicating a NAK-present data block, is not transmitted to the base station, than when the radio quality information signal is not transmitted to the base station. Accordingly, in this preferred embodiment, when a transmission request for the radio quality information signal and a transmission request for the data block identification signal simultaneously take place, the data block identification signal is transmitted to the base station, without the radio quality information signal transmitted.

Figure 37:
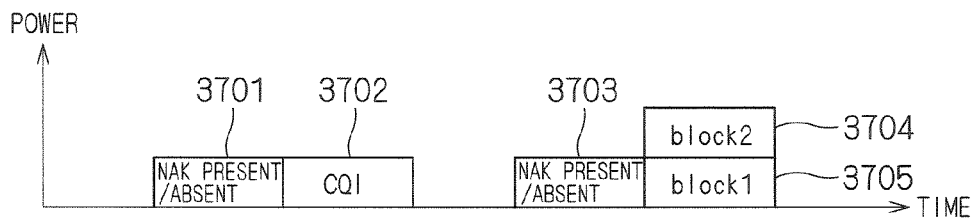
FIG. 37 A diagram illustrating ACK/NAK information signals according to an eighteenth preferred embodiment.

FIG. 37 is a diagram illustrating a ninth example of the ACK/NAK information signal transmitted from the mobile station 2 to the base station 1 in the CDMA radio communications system shown in FIGS. 27 and 28. In FIG. 37, a NAK present/absent information signal 3701 indicating NAK absent, a radio quality information signal 3702, a NAK present/absent information signal 3703 indicating NAK present, and the data block identification signal 3705 indicating the identification number of a NAK-present data block, are transmitted using the same physical channel.

Nineteenth Preferred Embodiment

Figure 38:
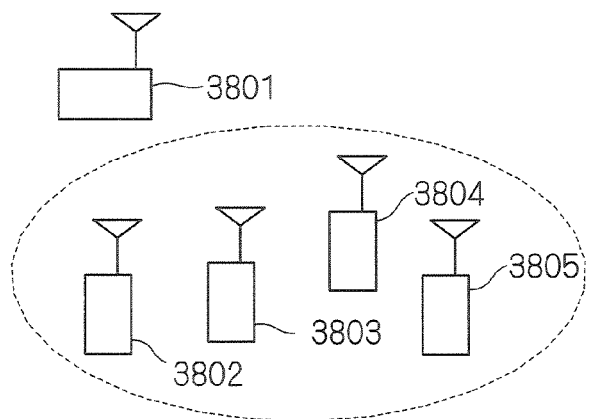
FIG. 38 A diagram illustrating a CDMA radio communications system according to a nineteenth preferred embodiment.

This preferred embodiment illustrates communication between one base station and a plurality of mobile stations. FIG. 38 is a diagram that illustrates a CDMA radio communications system of this preferred embodiment. In the diagram, 3801 is a base station, 3802 to 3804 are mobile stations that communicate with the base station 3801 by using shared physical channels, and 3805 is a mobile station that communicates with the base station 3801 by using a dedicated physical channel.

FIG. 39 is a diagram illustrating transmission powers in the base station 3801 on different radio frequencies. FIG. 39($a$) to FIG. 39($c$) illustrate the transmission powers from the base station 3801 on a first radio frequency, a second radio frequency, and a third radio frequency, respectively. In FIG. 39, 3921 to 3924 indicate transmission powers of shared physical channels used for the mobile station 3802 shown in FIG. 38, 3931 and 3932 indicate transmission powers of shared physical channels used for the mobile station 3803 shown in FIG. 38, 3941 to 3943 indicate transmission powers of shared physical channels used for the mobile station 3804 shown in FIG. 38, and 3951 indicates the transmission power of the dedicated physical channel used for the mobile station 3805 shown in FIG. 38. Also, 3961 to 3963 indicate other transmission powers transmitted from the base station 3801. Also, 3971 to 3973 indicate the maximum transmission powers that the base station 3801 can transmit on the respective radio frequencies.

It is possible to prevent concentration of transmission powers on a particular radio frequency by using different combinations of radio frequencies for a plurality of shared physical channels used for individual mobile stations.

Figure 40:
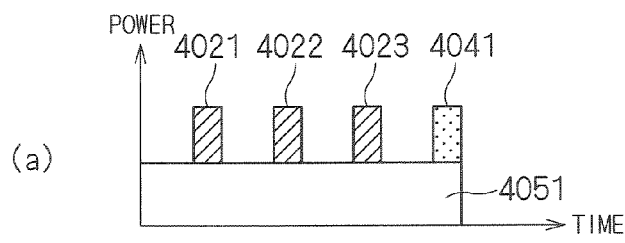
FIG. 40 A diagram illustrating reception power in the base station 3801 shown in FIG. 38.

FIG. 40 is a diagram illustrating reception powers in the base station 3801 on different radio frequencies. FIG. 40($a$) to FIG. 40($c$) are diagrams illustrating the reception powers in the base station 3801 on a fourth radio frequency, a fifth radio frequency, and a sixth radio frequency, respectively. In FIG. 40, 4021 to 4023 indicate the reception powers of control signals such as the ACK/NAK signal from the mobile station 3802 received in the base station 3801 shown in FIG. 38, 4031 indicates the reception power of control signals such as the ACK/NAK signal from the mobile station 3803 received in the base station 3801 shown in FIG. 38, and 4041 indicates the reception power of control signals such as the ACK/NAK signal from the mobile station 3804 received in the base station 3801 shown in FIG. 38. Also, 4051 to 4053 indicate other reception powers received in the base station 3801 shown in FIG. 38.

In FIG. 40, if the mobile station 3802 and the mobile station 3803 transmit respective control signals to the base station 3801 using the same radio frequency, then the reception power 4021 and the reception power 4031 are received on the same radio frequency, i.e. the fourth radio frequency, which will deteriorate the radio propagation environment on that fourth radio frequency. However, in FIG. 40, the mobile station 3802 and the mobile station 3803 transmit their respective control signals by using different radio frequencies, which prevents the deterioration of the radio propagation environment on the fourth radio frequency.

In this way, it is possible to suppress the deterioration of radio propagation environment on a particular radio frequency by allowing the mobile stations to transmit control signals like ACK/NAK signals by using different radio frequencies.

The other reception powers 4051 to 4053 shown in FIG. 40 usually vary every moment. It is therefore effective that the mobile stations 3802 to 3804 change the radio frequencies for transmission of control signals during the communication. In particular, it is effective to simultaneously change the radio frequency in the base station and mobile station by previously informing the base station and mobile station about the timing of change of the radio frequency for control signal transmission, from a higher device such as a base station controller. As to the timing, a counter of the base station and a counter of the mobile station may be synchronized in the communication between the base station and mobile station, or the synchronization may be established by using GPS equipment of the mobile station.

Twentieth Preferred Embodiment

In the first preferred embodiment, data to be transmitted to a mobile station is assigned between first and second groups, and subjected to processes such as FEC operation and CRC attachment to add CRCs to the first group of data and second group of data; then, the first group of data thus processed is mapped to one or a plurality of shared physical channel(s) that are code-multiplexed on a first radio frequency, and the second group of data thus processed is mapped to one or a plurality of shared physical channel(s) that are code-multiplexed on a second radio frequency.

This preferred embodiment shows an example in which, when the base station and mobile station communicate by OFDM (Orthogonal Frequency Division Multiplex), the one or plurality of shared physical channel(s) to which the first group of data with added CRC are mapped, are transmitted on one or a plurality of sub-carriers provided on a first radio frequency, and the one or plurality of shared physical channel(s) to which the second group of data with added CRC are mapped, are transmitted on one or a plurality of sub-carriers provided on a second radio frequency.

Figure 41:
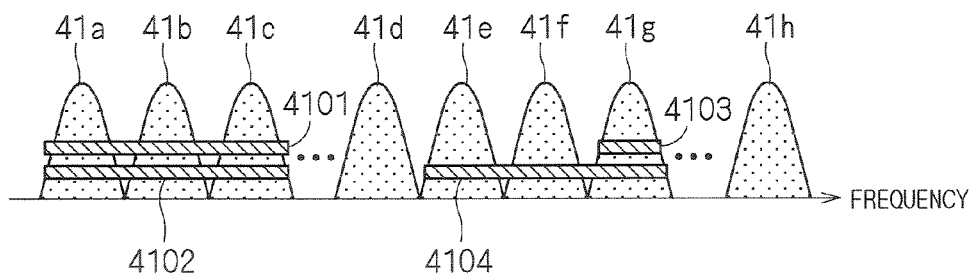
FIG. 41 A diagram illustrating a radio communications method using OFDM according to the twentieth preferred embodiment.

FIG. 41 is a diagram illustrating sub-carriers in OFDM. In FIGS. 41, 41a to 41n each indicate one sub-carrier. In FIG. 41, a plurality of shared physical channels 4101 and 4102 to which the first group of data is mapped are transmitted with a plurality of sub-carriers 41a to 41c, and a plurality of shared physical channels 4103 and 4104 to which the second group of data is mapped are transmitted with a plurality of sub-carriers 41e to 41g.

One shared physical channel may be transmitted by using one sub-carrier, or by simultaneously using a plurality of sub-carriers. In the example of FIG. 41, the shared physical channels 4101 and 4102 are each transmitted using three sub-carriers 41a to 41c, the shared physical channel 4104 is transmitted using three sub-carriers 41e to 41g, and the shared physical channel 4103 is transmitted using one sub-carrier 41g.

When such OFDM is used, it is effective to reduce the amount of data transmitted by using a sub-carrier with higher interference and to apply repetition (bit repetition) to the data transmitted by that sub-carrier.

This example illustrates an application of the present invention to OFDM where sub-carriers overlap, but the invention is applicable also to IFDMA (Interleaved FDMA) where sub-carriers do not overlap.

While the preferred embodiments of the present invention have been described referring to the drawings, the preferred embodiments are illustrative and not restrictive, and the present invention includes all embodiments including modifications, omissions, combinations (e.g. of aspects across various embodiments), applications and/or variations that those skilled in the art can devise on the basis of the disclosure herein. The scope of the invention defined by claims should be broadly interpreted on the basis of the terms used in claims, and it is understood that the specific embodiments described in the specification and those referred to during the prosecution of the present application are not exclusive and not intended to limit the present invention.

INDUSTRIAL APPLICABILITY

The radio communications method of the present invention is applicable to cellular phones, for example.

What is claimed is:

1. A transmitting station comprising:
an error detecting code attachment block that attaches error detecting codes respectively to a plurality of data pieces;
a transmitter block that transmits the plurality of data pieces with the error detecting codes attached thereto to a receiving station by using a plurality of radio frequencies, respectively;
a receiver block that receives, from the receiving station, results of error detections that the receiving station applies respectively to the plurality of data pieces on the basis of the error detecting codes attached respectively to the plurality of data pieces including information about a radio frequency from the plurality of radio frequencies on which at least one data packet was erroneously received; and
a transmission data managing block that controls retransmission of the at least one data pieces to the receiving station on a different radio frequency than the radio frequency on which the at least one data packet was erroneously received.

2. A receiving station comprising:
a receiver block that receives a plurality of data pieces transmitted by respectively using a plurality of radio frequencies from one transmitting station, with error detecting codes attached respectively to the plurality of data pieces;
an error detecting block that applies error detections respectively to the plurality of data pieces on the basis of the error detecting codes attached respectively to the plurality of data pieces; and
a transmitter block that transmits, to the transmitting station, results of the error detections respectively about the plurality of data pieces including information about a radio frequency from the plurality of radio frequencies on which at least one data packet was erroneously received, the receiver block receiving the at least one data block on a different radio frequency than the radio frequency on which the at least one data packet was erroneously received.

3. A radio communications method comprising the steps of:
attaching, in a transmitting station, error detecting codes respectively to a plurality of data pieces;
transmitting the plurality of data pieces with the error detecting codes attached thereto, from the transmitting station to a receiving station by using a plurality of radio frequencies, respectively;
applying, in the receiving station, error detections respectively to the plurality of data pieces on the basis of the error detecting codes attached respectively to the plurality of data pieces;
transmitting results of the error detections respectively about the plurality of data pieces, from the receiving station to the transmitting station including information about a radio frequency from the plurality of radio frequencies on which at least one data packet was erroneously received;
and retransitting from the transmitting station to the receiving station the at least one data packet on a different radio frequency than the radio frequency on which the at least one data packet was erroneously received.

4. The radio communications method according to claim 3, wherein, in the transmitting step, the plurality of data pieces have different amounts of data from each other.

5. The radio communications method according to claim 3, wherein each of the plurality of data pieces is composed of one or a plurality of data block(s), and the radio communications method further comprises the step of controlling the number of data block(s) contained in each of the plurality of data pieces.

6. The radio communications method according to claim 3, wherein, in the step of transmitting the results of the error detection, an ACK/NAK signal is transmitted to the transmitting station about each of the plurality of data pieces transmitted from the transmitting station, and the transmitting station stops transmission of new data on the basis of a difference between the total amount of the plurality of data pieces transmitted from the transmitting station and the total amount of data of the plurality of data pieces for which an ACK signal has been received from the receiving station.

7. The radio communications method according to claim 3, wherein, when an ACK signal corresponding to nth data (n is an integer of 1 or more) transmitted from the transmitting station to the receiving station is not received even after mth data (m is an integer larger than n) has been transmitted from the transmitting station to the receiving station, the transmitting station stops transmission of (m+1)th and following new data.

8. The radio communications method according to claim 6 or 7, wherein, after stopping the new data transmission, the transmitting station performs retransmission by SR (selective-Repeat) or GTN (Go-to-N).

9. The radio communications method according to claim 3, wherein, in the step of transmitting the results of the error detection to the transmitting station, the results of the error detection respectively about the plurality of data pieces, which are transmitted from the transmitting station to the receiving station by using different radio frequencies, are transmitted by using a same radio frequency from the receiving station to the transmitting station.

10. The radio communications method according to claim 3, wherein, in the step of transmitting the results of the error detection to the transmitting station, a signal indicating presence/absence of erroneously received data is transmitted from the receiving station to the transmitting station.

11. The radio communications method according to claim 3, wherein, in the step of transmitting the results of the error detection to the transmitting station, a signal indicating presence/absence of erroneously received data, and a signal including information for allowing the transmitting station to specify erroneously received data, are transmitted from the receiving station to the transmitting station.

12. The radio notification method according to claim 11, wherein the information for allowing the transmitting station to specify erroneously received data includes information for allowing the transmitting station to specify data that was transmitted earliest among a plurality of erroneously received data.

13. The radio communications method according to claim 3, wherein, in the step of transmitting the results of the error detection to the transmitting station, a plurality of ACK/NAK signals, or a plurality of control signals corresponding to ACK/NAK signals, are transmitted in code-multiplex with different spreading codes.

14. The radio communications method according to claim 3, wherein, in the step of transmitting the results of the error detection to the transmitting station, when any data was erroneously received in the receiving station, a signal indicating the presence of the erroneously received data, and a signal indicating information about the erroneously received data or information about the radio frequency on which the data was erroneously received, are transmitted from the receiving station to the transmitting station, and when no data was erroneously received in the receiving station, a signal indicating the absence of erroneously received data, and another signal in place of the signal indicating the erroneously received information, are transmitted from the receiving station to the transmitting station.

15. The radio communications method according to claim 3, wherein, in the step of transmitting the results of the error detection to the transmitting station, a signal indicating presence/absence of erroneously received data, and a signal indicating information about erroneously received data or information about a radio frequency on which data was erroneously received, are spread with different spreading factors and transmitted from the receiving station to the transmitting station.

16. The radio communications method according to claim 3, wherein, in the step of transmitting the results of the error detection to the transmitting station, a plurality of ACK/NAK signals, or a plurality of control signals corresponding to ACK/NAK signals, are transmitted with an error detecting code attached thereto.

17. The radio communications method according to claim 16, wherein, when an error is detected with the error detecting code attached to the plurality of ACK/NAK signals, or with the error detecting code attached to the plurality of control signals corresponding to ACK/NAK signals, then the transmitting station retransmits all data corresponding to the plurality of ACK/NAK signals, or all data corresponding to the plurality of control signals, to the receiving station.

18. The radio communications method according to claim 3, wherein each receiving station is configured to select a radio frequency used to transmit the results of the error detection to the transmitting station.

19. The radio communications method according to claim 3, wherein the transmitting station changes at least one radio frequency of the plurality of radio frequencies used to transmit the plurality of data pieces to the receiving station, on the basis of an ACK/NAK signal, a control signal corresponding to an ACK/NAK signal, or another signal which is transmitted from the receiving station.

* * * * *